(12) United States Patent
Ouchi et al.

(10) Patent No.: US 9,801,143 B2
(45) Date of Patent: Oct. 24, 2017

(54) TERMINAL APPARATUS, BASE STATION APPARATUS, AND COMMUNICATION METHOD OF DETERMINING APPROPRIATE UPLINK TRANSMIT POWER OF PHYSICAL UPLINK SHARED CHANNEL CORRESPONDING TO A SUBFRAME SET

(75) Inventors: Wataru Ouchi, Osaka (JP); Kimihiko Imamura, Osaka (JP); Yosuke Akimoto, Osaka (JP); Toshizo Nogami, Osaka (JP); Daiichiro Nakashima, Osaka (JP); Kazuyuki Shimezawa, Osaka (JP); Shoichi Suzuki, Osaka (JP); Yasuyuki Kato, Osaka (JP); Katsunari Uemura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/236,541

(22) PCT Filed: Aug. 2, 2012

(86) PCT No.: PCT/JP2012/069672
§ 371 (c)(1),
(2), (4) Date: Jan. 31, 2014

(87) PCT Pub. No.: WO2013/018856
PCT Pub. Date: Feb. 7, 2013

(65) Prior Publication Data
US 2014/0177584 A1 Jun. 26, 2014

(30) Foreign Application Priority Data
Aug. 2, 2011 (JP) .................................. 2011-169318

(51) Int. Cl.
*H04W 52/18* (2009.01)
*H04W 52/14* (2009.01)
(Continued)

(52) U.S. Cl.
CPC .......... *H04W 52/18* (2013.01); *H04W 52/146* (2013.01); *H04W 52/242* (2013.01); *H04W 24/10* (2013.01)

(58) Field of Classification Search
CPC . H04W 52/146; H04W 52/54; H04W 52/242; H04W 24/10; H04W 52/18; H04L 5/0073
See application file for complete search history.

(56) References Cited

U.S. PATENT DOCUMENTS 8,041,308 B2 10/2011 Yun et al.
8,755,286 B2 6/2014 Tamura et al.
(Continued)

FOREIGN PATENT DOCUMENTS

EP 2 523 510 A1 11/2012
JP 2009-529252 A 8/2009
(Continued)

OTHER PUBLICATIONS

Kim et al., Pathloss Estimation Method, U.S. Appl. No. 61/546,566, filed Oct. 2011.*
(Continued)

*Primary Examiner* — Ian N Moore
*Assistant Examiner* — Justin T Van Roie
(74) *Attorney, Agent, or Firm* — Birch, Stewart, Kolasch & Birch, LLP

(57) ABSTRACT

A terminal apparatus includes a receiving circuit and a transmitting circuit. The receiving circuit receives a higher layer signal including a first parameter concerning uplink power control, and receives a higher layer signal including a configuration of first and second subframe sets and a second parameter concerning uplink power control. The transmitting circuit sets a transmit power for a physical uplink shared channel transmitted on a subframe, the transmit power being based on the first parameter, in a case where (Continued)

the first and second subframe sets are configured and the subframe belongs to the first subframe set, and sets a transmit power for a physical uplink shared channel transmitted on a subframe, the transmit power being based on the second parameter, in a case where the first and second subframe sets are configured and the subframe belongs to the second subframe set.

3 Claims, 32 Drawing Sheets

(51) Int. Cl.
*H04W 52/24* (2009.01)
*H04W 24/10* (2009.01)

(56) References Cited

U.S. PATENT DOCUMENTS

| | | | |
|---|---|---|---|
| 8,938,247 | B2 | 1/2015 | Gorokhov et al. |
| 9,100,924 | B2 | 8/2015 | Suzuki et al. |
| 9,264,197 | B2 | 2/2016 | Suzuki et al. |
| 2008/0280638 | A1 | 11/2008 | Malladi et al. |
| 2009/0130986 | A1 | 5/2009 | Yun et al. |
| 2010/0323720 | A1 | 12/2010 | Jen |
| 2010/0331037 | A1 | 12/2010 | Jen |
| 2011/0081936 | A1 | 4/2011 | Haim et al. |
| 2011/0098054 | A1 | 4/2011 | Gorokhov et al. |
| 2011/0176634 | A1 | 7/2011 | Yoon et al. |
| 2011/0195735 | A1 | 8/2011 | Irmer et al. |
| 2011/0275396 | A1 | 11/2011 | Nishio et al. |
| 2012/0106388 | A1 | 5/2012 | Shimezawa et al. |
| 2012/0127911 | A1 | 5/2012 | Nishikawa et al. |
| 2012/0182879 | A1 | 7/2012 | Tamura et al. |
| 2012/0250558 | A1 | 10/2012 | Chung et al. |
| 2012/0281654 | A1 | 11/2012 | Aiba et al. |
| 2012/0314667 | A1 | 12/2012 | Taoka et al. |
| 2013/0012252 | A1 | 1/2013 | Suzuki et al. |
| 2013/0077569 | A1 | 3/2013 | Nam et al. |
| 2013/0078913 | A1* | 3/2013 | Lee ............... H04L 5/0007 455/39 |
| 2013/0121279 | A1* | 5/2013 | Noh ............ H04L 27/2611 370/329 |
| 2013/0265981 | A1 | 10/2013 | Yang et al. |
| 2013/0272158 | A1* | 10/2013 | Park et al. ............ 370/252 |
| 2014/0064201 | A1 | 3/2014 | Zhu et al. |
| 2014/0113677 | A1 | 4/2014 | Parkvall et al. |
| 2014/0133337 | A1* | 5/2014 | Lee et al. ............ 370/252 |
| 2014/0153536 | A1 | 6/2014 | Ouchi et al. |
| 2014/0161003 | A1* | 6/2014 | Han ............... H04W 52/146 370/280 |
| 2014/0169209 | A1 | 6/2014 | Imamura et al. |
| 2014/0169321 | A1 | 6/2014 | Imamura et al. |
| 2014/0169322 | A1 | 6/2014 | Ouchi et al. |
| 2014/0177467 | A1* | 6/2014 | Kim et al. ............ 370/252 |
| 2014/0177531 | A1 | 6/2014 | Imamura et al. |
| 2014/0221038 | A1 | 8/2014 | Nakashima et al. |
| 2014/0226551 | A1 | 8/2014 | Ouchi et al. |
| 2014/0241301 | A1 | 8/2014 | Nakashima et al. |
| 2014/0247796 | A1 | 9/2014 | Ouchi et al. |
| 2014/0329553 | A1 | 11/2014 | Nakashima et al. |
| 2015/0043465 | A1* | 2/2015 | Ouchi ............... H04W 16/28 370/329 |

FOREIGN PATENT DOCUMENTS

| | | | | |
|---|---|---|---|---|
| JP | 2011-004161 A | | 1/2011 | |
| JP | 2011-9866 A | | 1/2011 | |
| JP | 2011061706 A | * | 3/2011 | ............ H04W 52/24 |
| JP | 2011-142454 A | | 7/2011 | |
| JP | 2012-34145 A | | 2/2012 | |
| JP | 2013-505602 A | | 2/2013 | |
| WO | WO 2010/022773 A1 | | 3/2010 | |
| WO | 2010/087176 A1 | | 8/2010 | |
| WO | WO 2011/031059 A2 | | 3/2011 | |
| WO | 2011/047462 A2 | | 4/2011 | |
| WO | WO 2011/039969 A1 | | 4/2011 | |
| WO | WO 2011/044171 A2 | | 4/2011 | |
| WO | WO 2011/078582 A2 | | 6/2011 | |
| WO | WO 2011/083706 A1 | | 7/2011 | |
| WO | WO 2011/083746 A1 | | 7/2011 | |

OTHER PUBLICATIONS

Lee et al., Methods to Support Extension Carrier, U.S. Appl. No. 61/522,253, filed Aug. 2011.*
Lee et al., Aperiodic SRS Design for LTE-Advanced, U.S. Appl. No. 61/369,654, filed Jul. 2010.*
JP 2011061706 Machine Translation, p. 3, Mar. 2011.*
3GPP TR 36.814 V9.0.0 (Mar. 2010) 3rd Generation Partnership Project; Technical Specification Group Radio Access Network; Evolved Universal Terrestrial Radio Access (E-UTRA); Further advancements for E-UTRA physical layer aspects (Release 9), pp. 1-104.
3GPP TS 36.212 V10.1.0 (Mar. 2011), 3rd Generation Partnership Project; Technical Specification Group Radio Access Network; Evolved Universal Terrestrial Radio Access (E-UTRA); Multiplexing and channel coding (Release 10), pp. 1-76.
InterDigital Communications Corporation, "Combined Open Loop/Closed Loop Uplink Power Control with Interference Mitigation for E-UTRA," 6.11, 3GPP TSG RAN WG1 #48, R1-071100, St. Louis, USA, Feb. 12-16, 2007, pp. 1-7.
Panasonic, "Flexible CoMP Operation based on Dedicated CSI-RS Configuration," 3GPP TSG RAN WG1 Meeting #65 R1-111587, Barcelona, Spain, May 9-13, 2011, pp. 1-5.
3 GPP TSG RAN WG1 Meeting #64 R1-110756, "Feedback issues for Macro site CoMp", Pantech, Feb. 25, 2011.
Intel Corporation: "Uplink Power Control Discussion for CoMP Scenario 4," 3GPP Draft; R1-111598, 3rd Generation Partnership Project (3GPP). Route Des Lucioles; F-06921 Sophia-Antipolis Cedex; France, vol. RAN WGI, No. Barcelona, Spain; 20110509, May 3, 2011, XP050491244.
Leumaleu Djikeussi Cedric Anthony, LTE: der Mobilfunk der Zukunft Reference Signals and Channel Estimation, Nov. 25, 2009.
Nam et al., Methods and Apparatus on Uplink Transmissions in Wireless Communications Systems, U.S. Appl. No. 61/538,021, filed Sep. 2011.
U.S. Office Action for corresponding U.S. Appl. No. 14/236,481 dated Mar. 23, 2015.
U.S. Office Action for corresponding U.S. Appl. No. 14/236,540 dated Apr. 3, 2015.
U.S. Office Action for corresponding U.S. Appl. No. 14/236,560 dated Mar. 13, 2015.
Jacek Gora et al., "Cell-Specific Uplink Power Control for Heterogeneous Networks in LTE" Vehicular Technology Conference Fall (VTC 2010-Fall), 2010 IEEE 72nd, IEEE, Piscataway, NJ, USA, Sep. 6, 2010, pp. 1-5, XP031770394 ISBN: 978-1-4244-3573-9.
U.S. Office Action, dated Oct. 26, 2016, for U.S. Appl. No. 14/236,540.
Catt, SRS enhancement for CoMP [online], 3GPP TSG-RAN WG1#68 R1-120107, Internet <URL:http://www.3gpp.org/ftp/tsg_ran/WG1_RL1/TSGR1_68/Docs/R1-120107.zip>, Jan. 31, 2012 (2 pages).
U.S. Office Action for U.S. Appl. No. 14/236,481, dated Oct. 8, 2015.
U.S. Office Action for U.S. Appl. No. 14/236,560, dated Sep. 25, 2015.
U.S. Office Action for U.S. Appl. No. 14/236,540, dated Mar. 30, 2016.
U.S. Office Action for U.S. Appl. No. 14/236,560, dated Feb. 12, 2016.
U.S. Office Action, dated Oct. 26, 2015, for U.S. Appl. No. 14/236,540.
U.S. Office Action for Copending U.S. Appl. No. 14/236,560, dated Sep. 2, 2016.

(56) References Cited

OTHER PUBLICATIONS

Pantech, "Inter-cell CSI-RS Pattern Design for LTE-A", 3GPP TSG RAN WG1 Meeting #60, R1-100990, San Francisco, USA, Feb. 22-26, 2010. (accessible Feb. 16, 2010).
U.S. Office Action for copending U.S. Appl. No. 14/236,560, dated Feb. 10, 2017.
U.S. Office Action for U.S. Appl. No. 14/236,540, dated Dec. 21, 2016.

* cited by examiner

FIG. 14
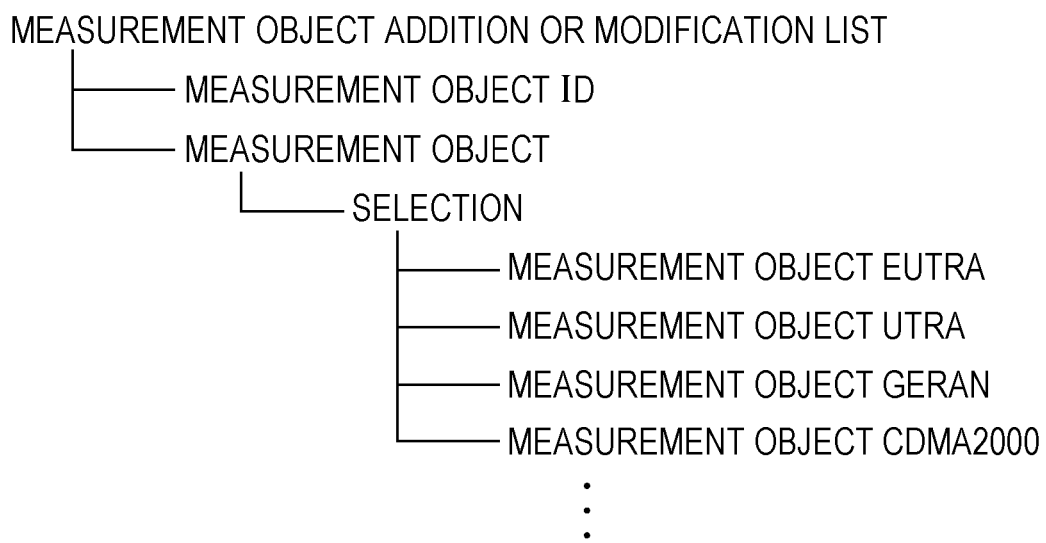
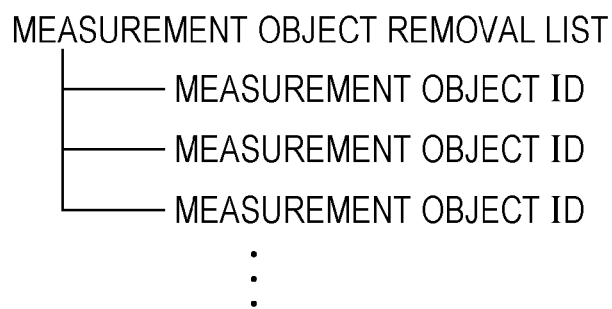

FIG. 22

CONFIGURATION OF ONE OR MORE PARAMETERS RELATED TO (FIRST)
UPLINK POWER CONTROL

- CONFIGURATION OF ONE OR MORE CELL-SPECIFIC PARAMETERS RELATED TO (FIRST) UPLINK POWER CONTROL (FOR PRIMARY CELL)
  - p0-NominalPUSCH
  - α
  - p0-NominalPUCCH
  - deltaFList-PUCCH
  - deltaPreambleMsg3
- CONFIGURATION OF ONE OR MORE CELL-SPECIFIC PARAMETERS RELATED TO (FIRST) UPLINK POWER CONTROL FOR SECONDARY CELL
  - p0-NominalPUSCH
  - α
- CONFIGURATION OF ONE OR MORE UE SPECIFIC PARAMETERS RELATED TO (FIRST) UPLINK POWER CONTROL (FOR PRIMARY CELL)
  - p0-UE-PUSCH
  - deltaMCS-Enabled
  - accumulation-Enabled
  - p0-UE-PUCCH
  - pSRS-Offset
  - filterCoeffcient
  - pSRS-Offset-Ap
  - deltaTxD-OffsetListPUCCH
- CONFIGURATION OF ONE OR MORE UE SPECIFIC PARAMETERS RELATED TO (FIRST) UPLINK POWER CONTROL FOR SECONDARY CELL
  - p0-UE-PUSCH
  - deltaMCS-Enabled
  - accumulation-Enabled
  - p0-UE-PUCCH
  - pSRS-Offset
  - pSRS-Offset-Ap
  - filterCoeffcient
  - pathlossReference(-r10)

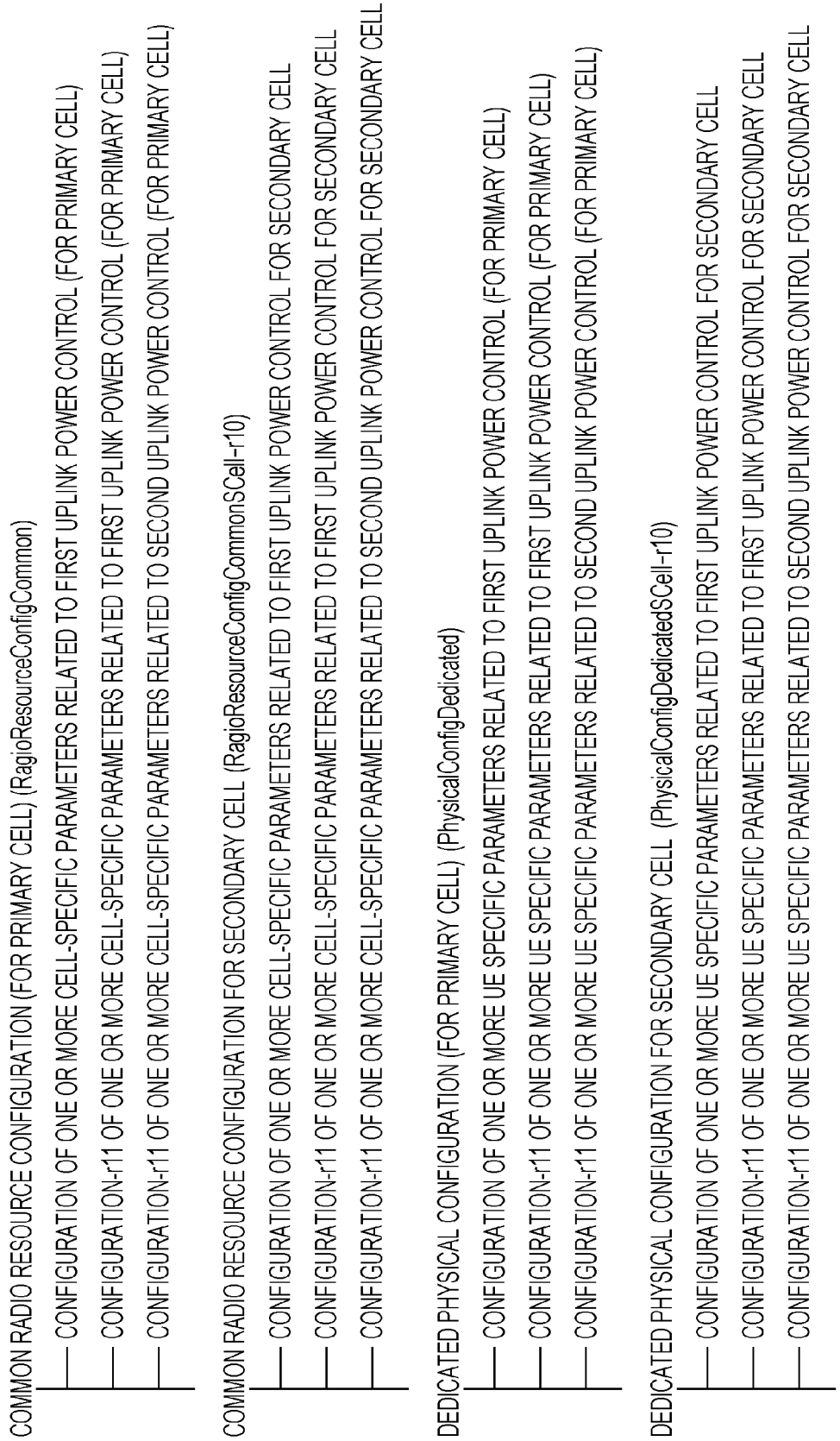

FIG. 29

EXAMPLE OF CONFIGURATION-r11 OF ONE OR MORE PARAMETERS RELATED TO SECOND UPLINK POWER CONTROL (FOR PRIMARY CELL)

- RELEASE
- SETUP
  - p0-NominalPUSCH
  - α
  - p0-NominalPUCCH
  - deltaFList-PUCCH
  - deltaPreambleMsg3

- INCLUDING ALL INFORMATION ELEMENTS
- INCLUDING AT LEAST ONE ELEMENT
- INCLUDING NONE OF THE ELEMENTS (RELEASE)

EXAMPLE OF CONFIGURATION-r11 OF ONE OR MORE PARAMETERS RELATED TO SECOND UPLINK POWER CONTROL FOR SECONDARY CELL

- RELEASE
- SETUP
  - p0-NominalPUSCH
  - α

- INCLUDING ALL INFORMATION ELEMENTS
- INCLUDING AT LEAST ONE ELEMENT
- INCLUDING NONE OF THE ELEMENTS (RELEASE)

FIG. 30

EXAMPLE OF CONFIGURATION-r11 OF ONE OR MORE CELL-SPECIFIC PARAMETERS RELATED TO FIRST UPLINK POWER CONTROL (FOR PRIMARY CELL)
- PATH LOSS REFERENCE RESOURCE

EXAMPLE OF CONFIGURATION-r11 OF ONE OR MORE UE SPECIFIC PARAMETERS RELATED TO FIRST UPLINK POWER CONTROL FOR SECONDARY CELL
- PATH LOSS REFERENCE RESOURCE

EXAMPLE OF CONFIGURATION-r11 OF ONE OR MORE UE SPECIFIC PARAMETERS RELATED TO SECOND UPLINK POWER CONTROL (FOR PRIMARY CELL)
- RELEASE
- SETUP
  - p0-UE-PUSCH
  - deltaMCS-Enabled
  - accumulation-Enabled
  - p0-UE-PUCCH
  - pSRS-Offset
  - filterCoefficient
  - pSRS-Offset-Ap
  - deltaTxD-OffsetListPUCCH
  - PATH LOSS REFERENCE RESOURCE

• INCLUDING ALL INFORMATION ELEMENTS
• INCLUDING AT LEAST ONE ELEMENT
• INCLUDING NONE OF THE ELEMENTS (RELEASE)

EXAMPLE OF CONFIGURATION-r11 OF ONE OR MORE UE SPECIFIC PARAMETERS RELATED TO SECOND UPLINK POWER CONTROL FOR SECONDARY CELL
- RELEASE
- SETUP
  - p0-UE-PUSCH
  - deltaMCS-Enabled
  - accumulation-Enabled
  - p0-UE-PUCCH
  - pSRS-Offset
  - pSRS-Offset-Ap
  - filterCoefficient
  - pathlossReference(-r11)
  - PATH LOSS REFERENCE RESOURCE

• INCLUDING ALL INFORMATION ELEMENTS
• INCLUDING AT LEAST ONE ELEMENT
• INCLUDING NONE OF THE ELEMENTS (RELEASE)

FIG. 31

PATH LOSS REFERENCE RESOURCE
└── MEASUREMENT TARGET ─── INDEX RELATED TO CELL-SPECIFIC REFERENCE SIGNAL ANTENNA PORT 0 OR CSI-RS ANTENNA PORT INDEX (OR CSI-RS MEASUREMENT INDEX)

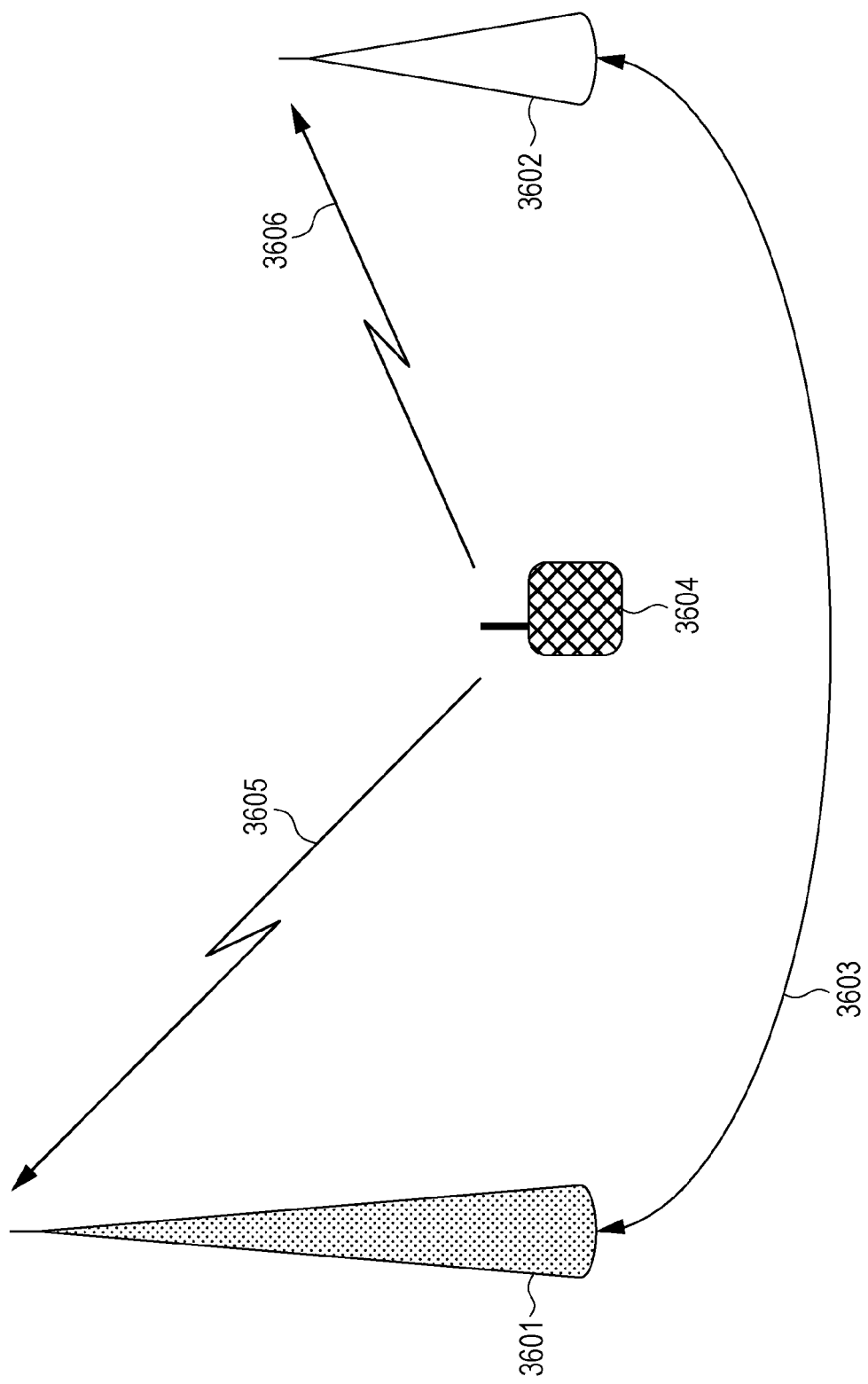

TERMINAL APPARATUS, BASE STATION APPARATUS, AND COMMUNICATION METHOD OF DETERMINING APPROPRIATE UPLINK TRANSMIT POWER OF PHYSICAL UPLINK SHARED CHANNEL CORRESPONDING TO A SUBFRAME SET

TECHNICAL FIELD

The present invention relates to a terminal, a communication system, and a communication method.

BACKGROUND ART

In radio communication systems such as WCDMA (Wideband Code Division Multiple Access), LTE (Long Term Evolution), and LTE-A (LTE-Advanced) by 3GPP (Third Generation Partnership Project), and Wireless LAN, and WiMAX (Worldwide Interoperability for Microwave Access) by IEEE (The Institute of Electrical and Electronics engineers), each of the base stations (cell, transmitting station, transmitter apparatus, eNodeB) and the terminals (mobile terminal, receiving station, mobile station, receiver apparatus, UE (User Equipment)) comprises a plurality of transmit and receive antennas and spatial-multiplexes data signals, and performs high-speed data communication using MIMO (Multi Input and Multi Output) technique.

In order to perform data communications between a base station and a terminal in a radio communication system, the base station needs to perform a variety of control processes for the terminal. To this end, the base station performs data communications with the terminal in a downlink and an uplink by notifying the terminal of control information using a predetermined resource. For example, the base station performs data communications by notifying the terminal of resource allocation information, modulation and encoding information of a data signal, spatial multiplexing count information of the data signal, transmission power control information, and the like. The method described in Non-Patent Literature may be used to notify the control information.

A variety of methods may be used as a communication method based on the MIMO technique in the downlink. For example, the communication methods that may be used comprise the multi-user MIMO scheme that allocates the same resource to different terminals, and the CoMP (Cooperative Multipoint or Coordinated Multipoint) scheme that performs data communications with a plurality of base stations in cooperation with each other.

FIG. 34 illustrates an example of the multi-user MIMO scheme. As illustrated in FIG. 34, a base station 3401 performs data communications with a terminal 3402 in a downlink 3404, and performs data communications with a terminal 3403 in a downlink 3405. The terminal 3402 and the terminal 3403 perform data communications using the multi-user MIMO. The same resource is used in the downlink 3404 and the downlink 3405. The resource comprises a resource in the frequency domain and the time domain. By using the precoding technique and the like, the base station 3401 controls a beam forming toward each of the downlink 3404 and the downlink 3405, thereby maintaining mutual orthogonality or reducing the interference between the same type of channels. In this way, the base station 3401 performs data communications with the terminal 3402 and the terminal 3403 using the same resource.

FIG. 35 illustrates an example of the downlink CoMP scheme. As illustrated in FIG. 35, a radio communication system is constructed using a heterogeneous network comprising a macro base station 3501 having a wide coverage area, and an RRH (Remote Radio Head) 3502 having a coverage area narrower than the coverage area of the macro base station 3501. The following discussion is based on the assumption that the coverage area of the macro base station 3501 comprises whole or part of the coverage area of the RRH 3502. In the example of FIG. 35, the macro base station 3501 and the RRH 3502 form a heterogeneous network, and coordinate with each other, thereby performing data communications with a terminal 3504 in a downlink 3505 and a downlink 3506. The macro base station 3501 is connected with the RRH 3502 via a communication line 3503 and exchanges the control signal and the data signal with the RRH 3502. A wired line, such as an optical fiber, or a wireless line based on relay technique may be used for the communication line 3503. Whole or part of each of the macro base station 3501 and the RRH 3502 may use the same frequency (resource), and overall frequency usage efficiency (transmission capacity) in the coverage area of the macro base station 3501 may increase.

The terminal 3504, if located closer to the macro base station 3501 or the RRH 3502, may communicate with the macro base station 3501 or the RRH 3502 in single cell communication. If the terminal 3504 is located in the vicinity of the edge of the coverage area (cell edge) of the RRH 3502, a corrective step to the same channel interference from the macro base station 3501 becomes necessary. Currently under study is a method of reducing or suppressing interference to the terminal 3504 at the cell edge by using the CoMP scheme. In the CoMP scheme, the macro base station 3501 and the RRH 3502 cooperate with each other in multi-cell communication (coordinated communication) between the macro base station 3501 and the RRH 3502. The method described in Non-Patent Literature 2 is currently under study as the CoMP scheme.

FIG. 36 is an example of the uplink CoMP scheme. As illustrated in FIG. 36, a radio communication system is constructed using a heterogeneous network comprising a macro base station 3601 having a wide coverage area, and an RRH (Remote Radio Head) 3602 having a coverage area narrower than the coverage area of the macro base station 3601. The following discussion is based on the assumption that the coverage area of the macro base station 3601 comprises whole or part of the coverage area of the RRH 3602. In the example of FIG. 36, the macro base station 3601 and the RRH 3602 form a heterogeneous network, and coordinate with each other, thereby performing data communications with a terminal 3604 in an uplink 3605 and an uplink 3606. The macro base station 3601 is connected with the RRH 3602 in a communication line 3603 and exchanges the control signal and the data signal with the RRH 3602. A wired line, such as an optical fiber, or a wireless line based on relay technique may be used for the communication line 3603. Whole or part of each of the macro base station 3601 and the RRH 3602 may use the same frequency (resource), and overall frequency usage efficiency (transmission capacity) in the coverage area of the macro base station 3601 may increase.

The terminal 3604, if located closer to the macro base station 3601 or the RRH 3602, may communicate with the macro base station 3601 or the RRH 3602 in single cell communication. In this case, with the terminal 3604 located closer to the macro base station 3601, the macro base station 3601 receives and demodulates a signal received in the uplink 3605. With the terminal 3604 located closer to the RRH 3602, the RRH 3602 receives and demodulates a signal received in the uplink 3606. With the terminal 3604 located at the edge (cell edge) of the coverage area of the RRH 3602 or located at the midpoint between the macro base station 3601 and the uplink 3605, the macro base station 3601 receives a signal passing through the uplink 3605 and the RRH 3602 receives a signal passing through the uplink 3606. Using the communication line 3603, the macro base station 3601 and the RRH 3602 then transmit and receive the signals received from the terminal 3604, and combine the signals received from the terminal 3604, and demodulate a combined signal. Through these operations, performance improvements are expected. This method is referred to as Joint Reception. The CoMP scheme with the macro base station 3601 and the RRH 3602 in cooperation is used as an uplink multi-cell (multipoint) communication (also referred to as coordinated communication). As a result, performance improvements are possible in data communications in the cell edge area, or at the midpoint area between the macro base station 3601 and the RRH 3602.

CITATION LIST

Non Patent Literature

NPL 1: 3rd Generation Partnership Project; Technical Specification Group Radio Access Network; Evolved Universal Terrestrial Radio Access (E-UTRA); Multiplexing and channel coding (Release 10), March 2011, 3GPP TS 36.212 V10.1.0 (2011-03).

NPL 2: 3rd Generation Partnership Project; Technical Specification Group Radio Access Network; Evolved Universal Terrestrial Radio Access (E-UTRA); Further advancements for E-UTRA physical layer aspects (Release 9), March 2010, 3GPP TR 36.814 v9.0.0 (2010-3).

SUMMARY OF INVENTION

Technical Problem

In the radio communication system where the coordinated communication such as the CoMP scheme is performed, appropriate uplink transmission power of a signal transmitted by a terminal differs depending on which of a base station, an RRH station, or both the base station and the RRH station receives the signal from the terminal. For example, a signal is transmitted at excessively higher power, interference to another base station becomes larger. If a signal is transmitted at lower power, reception quality becomes more difficult to maintain, leading to a decrease in a system overall throughput.

The present invention has been developed in view of the above problem, and the object of the present invention is to provide a terminal, a communication system, and a communication method to enable downlink reception power to be measured and to enable appropriate uplink transmission power to be configured in a radio communication system comprising a base station and a terminal in communication with the base station so that the terminal configures the appropriate uplink transmission power.

Solution to Problem (1) The present invention has been developed to solve the above problem, and is related to a terminal in communication with a base station. The terminal comprises a receiver configured to receive information related to a configuration of one or more parameters of uplink power control using a radio resource control signal, and configured to receive information related to a first measurement target configuration and information related to a second measurement target configuration using the radio resource control signal, and a transmission power controller configured to configure a first path loss and first uplink transmission power in accordance with a first measurement target configured in the information related to the first measurement target configuration and the information related to the configuration of one or more parameters of the uplink power control, and configured to a second path loss and second uplink transmission power in accordance with a second measurement target configured in the information related to the second measurement target configuration and the information related to the configuration of one or more parameters of the uplink power control.

(2) In the terminal of the present invention, the first measurement target comprises information related to an index related to a cell-specific reference signal antenna port 0.

(3) In the terminal of the present invention, the second measurement target comprises information related to an index related to an antenna port index for a channel state information reference signal.

(4) In the terminal of the present invention, the second measurement target comprises information related to an index that is determined by information related to a third reference signal configuration.

(5) The terminal of the present invention transmits an uplink signal at the first uplink transmission power in a case that a physical downlink control channel is detected in a control channel region of a primary cell, and transmits the uplink signal at the second uplink transmission power in a case that the physical downlink control channel is detected in a control channel region of a secondary cell.

(6) The terminal of the present invention receives information related to a carrier indicator using a physical downlink control channel, transmits, to the base station, an uplink signal at the first uplink transmission power in a case that the information related to the carrier indicator indicates a primary cell, and transmits, to the base station, the uplink signal at the second uplink transmission power in a case that the information related to the carrier indicator indicates a secondary cell.

(7) The terminal of the present invention receives using a physical downlink control channel, transmits, to the base station, an uplink signal at the first uplink transmission power in a case that the physical downlink control channel is detected in a downlink subframe comprised in a first subframe subset, and transmits, to the base station, the uplink signal at the second uplink transmission power in a case that the physical downlink control channel is detected in a downlink subframe comprised in a second subframe subset.

(8) The terminal of the present invention transmits an uplink signal at the first uplink transmission power in a case that a physical downlink control channel is detected in a first control channel region, and transmits the uplink signal at the second uplink transmission power in a case that the physical downlink control channel is detected in a second control channel region.

(9) A communication system of the present invention comprises a base station and a terminal. The base station notifies the terminal of information related to a first measurement target configuration and information related to a second measurement target configuration using a radio resource control signal, and notifies the terminal of information related to a configuration of one or more parameters of uplink power control using the radio resource control signal. The terminal configures a first path loss and first uplink transmission power in accordance with a first measurement target comprised in the information related to the first measurement target configuration and the information related to the configuration of one or more parameters of the uplink power control, and configures a second path loss and second uplink transmission power in accordance with a second measurement target comprised in the information related to the second measurement target configuration and the information related to the configuration of one or more parameters of the uplink power control.

(10) In the communication system of the present invention, the base station transmits to the terminal using a physical downlink control channel. The terminal transmits, to the base station, an uplink signal at the first uplink transmission power in a case that the physical downlink control channel is detected in a control channel region of a primary cell, and transmits, to the base station, the uplink signal at the second uplink transmission power in a case that the physical downlink control channel is detected in a control channel region of a secondary cell.

(11) In the communication system of the present invention, the base station notifies the terminal of information related to a carrier indicator using a physical downlink control channel. The terminal transmits, to the base station, an uplink signal at the first uplink transmission power in a case that the information related to the carrier indicator indicates a primary cell (first cell), and transmits, to the base station, the uplink signal at the second uplink transmission power in a case that the information related to the carrier indicator indicates a secondary cell (second cell).

(12) In the communication system of the present invention, the base station performs, for the terminal, a physical downlink control channel transmission. The terminal transmits, to the base station, an uplink signal at the first uplink transmission power in a case that the physical downlink control channel is detected in a downlink subframe comprised in a first subframe subset, and transmits to the base station the uplink signal at the second uplink transmission power in a case that the physical downlink control channel is detected in a downlink subframe comprised in a second subframe subset constructed independently of the first subframe subset.

(13) In the communication system of the present invention, the first subframe subset comprises at least one subframe comprising a first synchronization signal or a second synchronization signal, and a physical broadcast channel.

(14) In the communication system of the present invention, the base station transmits to the terminal using a physical downlink control channel. The terminal transmits an uplink signal at the first uplink transmission power in a case that the physical downlink control channel is detected in a first control channel region, and transmits the uplink signal at the second uplink transmission power in a case that the physical downlink control channel is detected in a second control channel region.

(15) The present invention is related to a communication method of a terminal in communication with a base station. The communication method comprises a step of receiving information related to a configuration of one or more parameters of uplink power control comprised in a radio resource control signal, a step of receiving information related to a first measurement target configuration and information related to a second measurement target configuration comprised in the radio resource control signal, a step of configuring a first path loss and first uplink transmission power in accordance with a first measurement target comprised in the information related to the first measurement target configuration and the information related to the configuration of one or more parameters of the uplink power control, and a step of configuring a second path loss and second uplink transmission power in accordance with a second measurement target comprised in the information related to the second measurement target configuration and the information related to the configuration of one or more parameters of the uplink power control.

(16) The communication of the present invention comprises transmitting an uplink signal at the first uplink transmission power in a case that a physical downlink control channel is detected in a control channel region of a primary cell, and transmitting the uplink signal at the second uplink transmission power in a case that the physical downlink control channel is detected in a control channel region of a secondary cell.

(17) The communication method of the present invention comprises receiving information related to a carrier indicator using a physical downlink control channel, transmitting to the base station an uplink signal at the first uplink transmission power in a case that the information related to the carrier indicator indicates a primary cell, and transmitting to the base station the uplink signal at the second uplink transmission power in a case that the information related to the carrier indicator indicates a secondary cell.

(18) The communication method of the present invention comprises receiving using a physical downlink control channel, transmitting to the base station an uplink signal at the first uplink transmission power in a case that the physical downlink control channel is detected in a downlink subframe comprised in a first subframe subset, and transmitting to the base station the uplink signal at the second uplink transmission power in a case that the physical downlink control channel is detected in a downlink subframe comprised in a second subframe subset.

(19) The communication method of the present invention comprises transmitting an uplink signal at the first uplink transmission power in a case that a physical downlink control channel is detected in a first control channel region, and transmitting the uplink signal at the second uplink transmission power in a case that the physical downlink control channel is detected in a second control channel region.

Advantageous Effects of Invention

According to the present invention, the terminal may measure downlink reception power and configure uplink transmission power in the radio communication system where the base station and the terminal communicate with each other.

BRIEF DESCRIPTION OF DRAWINGS

FIG. 14 illustrates in detail an example of the third measurement target configuration.

FIG. 22 illustrates in detail an example of a parameter configuration related to uplink power control.

FIG. 28 illustrates an example of a configuration of a parameter related to first uplink power control and a configuration of a parameter related to the second uplink power control, comprised in each radio resource configuration.

FIG. 29 illustrates an example of a configuration of a parameter related to second-cell-specific uplink power control.

FIG. 30 illustrates an example of a configuration of a parameter related to first-terminal-specific uplink power control and a configuration of a parameter related to second-terminal-specific uplink power control.

FIG. 31 illustrates an example of the path loss reference resource.

FIG. 36 illustrates an example of execution of an uplink CoMP scheme.

DESCRIPTION OF EMBODIMENTS

First Embodiment

A first embodiment of the present invention is described below. A communication system of the first embodiment comprises macro base stations (base station, transmitting apparatus, cell, transmission point, transmit antenna group, transmit antenna port group, receive antenna port group, component carrier, and eNodeB), RRH (Remote Radio Head, remote antenna, distributed antennas, base station, transmitting apparatus, cell, transmission point, transmit antenna group, transmit antenna port group, component carrier, eNodeB), and terminals (terminal apparatus, mobile terminal, reception point, receiving terminal, receiving apparatus, third communication apparatus, transmit antenna port group, receive antenna group, receive antenna port group, and UE).

Figure 1:
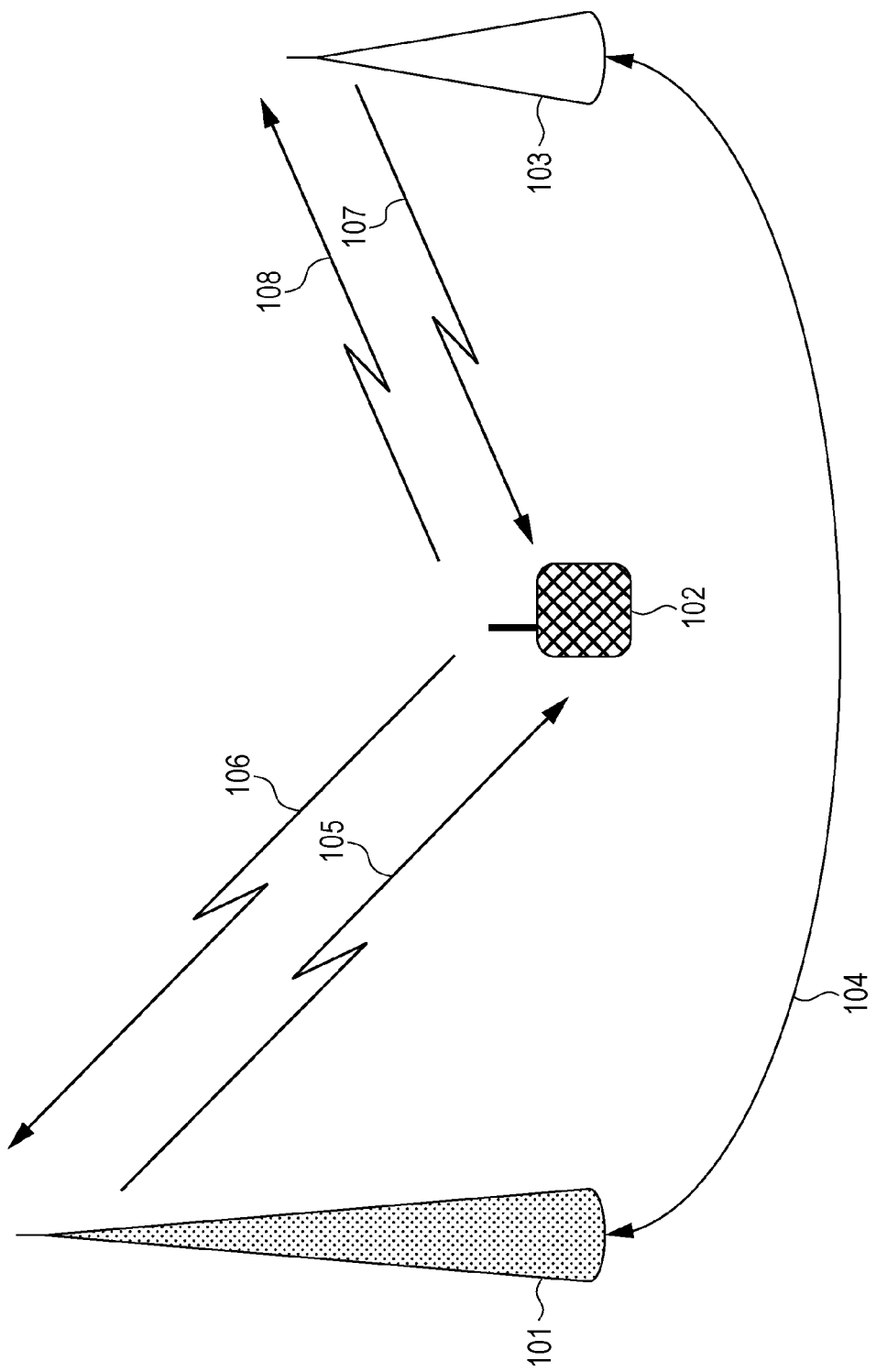
FIG. 1 is a diagram illustrating a communication system that performs data transmission in accordance with a first embodiment of the present invention.

FIG. 1 is a diagram illustrating a communication system that performs data transmission in accordance with a first embodiment of the present invention. As illustrated in FIG. 1, a base station (macro base station) 101 transmits and receives control information and information data in a downlink 105 and an uplink 106 to perform communication with a terminal 102. Similarly, an RRH 103 transmits and receives control information and information data in a downlink 107 and an uplink 108 to perform communication with the terminal 102. A communication line 104 comprises a wired line such as an optical fiber, or a wireless line based on relay technique. If whole or part of each of the base station 101 and the RRH 103 uses the same frequency (resource), total frequency usage efficiency (transmission capacity) within the coverage area of the base station 101 is increased. A network constructed using the same frequency between adjacent stations (such as between a macro base station and an RRH) is referred to as a single frequency network (SFN).

Referring to FIG. 1, the base station 101 notifies the terminal 102 of a cell ID. The cell ID may be used in a cell-specific reference signal (CRS), and a terminal-specific reference signal. The terminal-specific reference signal may be also referred to as DL DMRS (Downlink Demodulation Reference Signal) or UE-RS (UE-specific Reference Signal). Also, the RRH 103 may notify the terminal 102 of the cell ID. The cell ID notified by the RRH 103 may or may not be the same as the cell ID notified by the base station 101. In the following discussion, the base station 101 may represent the base station 101 or the RRH 103 in FIG. 1. Also the following discussion of the operation performed between the base station 101 and the RRH 103 may refer to the operation performed between macro base stations or the operation performed between RRHs.

Figure 2:
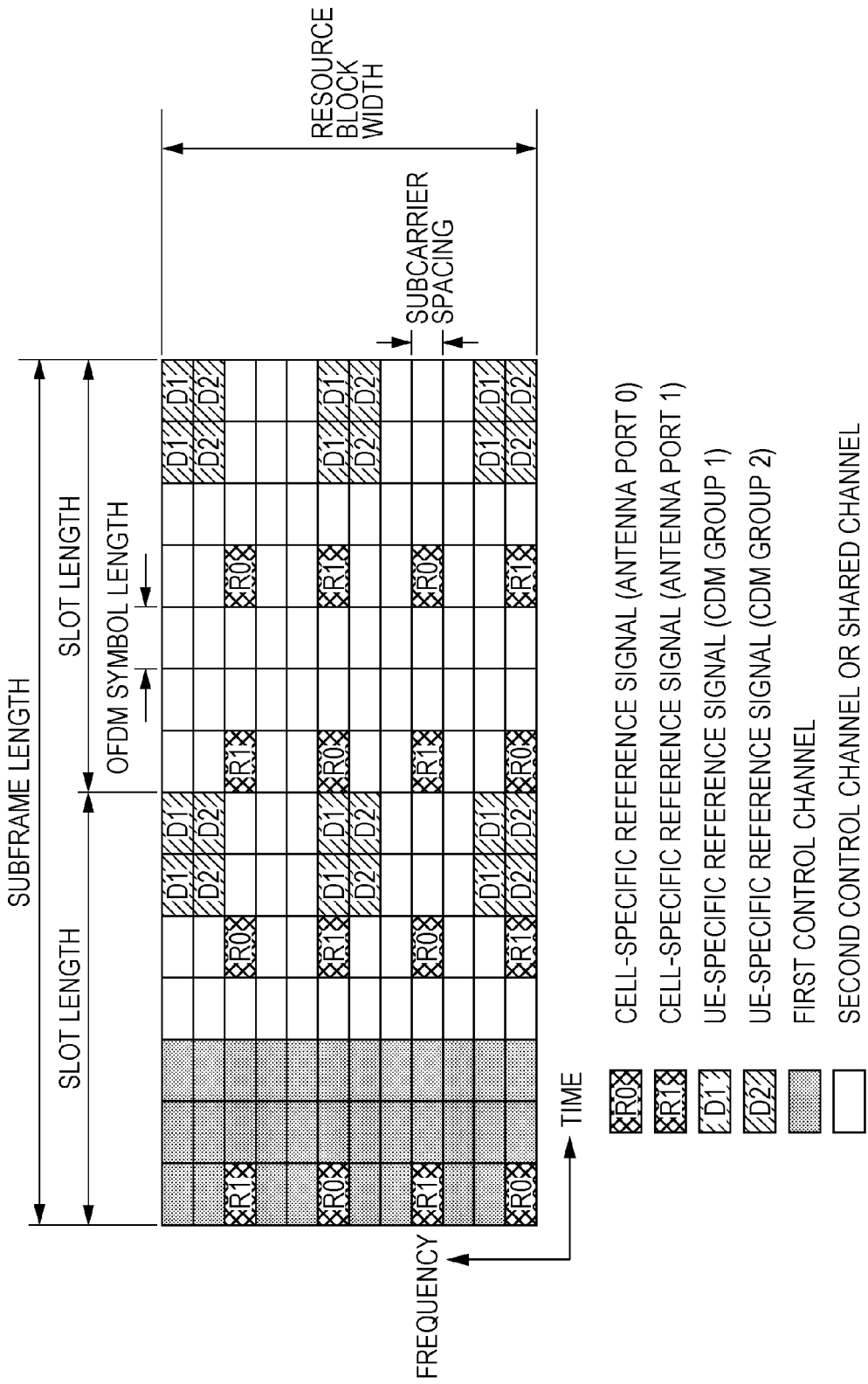
FIG. 2 illustrates an example of a pair of resource blocks mapped by a base station 101.

FIG. 2 illustrates an example of a pair of resource blocks that the base station 101 and/or the RRH 103 maps in the downlink 105 or the downlink 107. FIG. 2 illustrates two resource blocks (referred to as a resource block pair). One resource block comprises 12 subcarriers in the frequency domain and 7 OFDM symbols in the time domain. Of one OFDM symbol, each subcarrier is referred to as a resource element (RE). The resource block pair is arranged in the frequency domain, and the number of resource block pairs may be configured on a per base station basis. For example, the number of resource block pairs to be configured may range from 6 to 110. The width in the frequency domain is referred to as a system bandwidth. The resource block pair in the time domain is referred to as a subframe. Of each subframe, each of the seven leading and subsequent OFDM symbols in the time domain is also referred to as a slot. More specifically, one subframe is composed of two slots. In the discussion that follows, the resource block pair is also simply referred to as a resource block (RB).

R0 and R1 represent cell-specific reference signals (CRS) of antenna ports 0 and 1 from among shadowed resource elements. The cell-specific reference signals of FIG. 2 are of the two antenna ports. The number of the signals may be changed. For example, the cell-specific reference signals may be mapped to a single antenna port or four antenna ports. The cell-specific reference signals may be configured to be mapped to a maximum of four antenna ports (antenna ports 0-3).

In the base station 101 and the RRH 103, R0 and R1 may be allocated to different resource elements or may be allocated the same resource element. For example, if each of R0 and R1 is allocated to different resource elements and/or different signal sequences in the base station 101 and the RRH 103, the terminal 102 may calculate reception power (received signal power) individually from the base station 101 and the RRH 103 using the cell-specific reference signal. In particular, in a case that the cell IDs notified by the base station 101 and the RRH 103 are different from each other, above configuration becomes enabled. In another example, R0 and R1 may be allocated to some resource elements in only the base station 101, and R0 and R1 may be allocated to none of the resource elements in the RRH 103. In such a case, the terminal 102 may calculate the reception power from the base station 101 in accordance with the cell-specific reference signal. In particular, in a case that the cell ID is notified by the base station 101 only, the above configuration becomes enabled. In another example, R0 and R1 are allocated to the same resource element in the base station 101 and the RRH 103 in order to transmit the same sequence from the base station 101 and the RRH 103. In this case, the terminal 102 may calculate reception power that is combined using the cell-specific reference signals. In particular, in a case that the cell ID from the base station 101 is the same as the cell ID from the RRH 103, the above configuration becomes enabled.

In the discussion of the embodiments of the present invention, computing power comprises computing the value of power, calculating power comprises calculating the value of power, measuring power comprises measuring the value of power, and reporting power comprises reporting the value of power. In this way, the term power is intended to mean the value of power as appropriate.

D1 and D2 from among the shadowed resource elements respectively represent terminal-specific reference signals (DL DMRS, UE-RS) of CDM (Code Division Multiplexing) group 1 and CDM group 2. The terminal-specific reference signals of the CDM group 1 and the CDM group 2 are code division multiplexed (CDM) using orthogonal code such as Walsh code. Also, the terminal-specific reference signals of the CDM group 1 and the CDM group 2 are mutually frequency division multiplexed (FDM). The base station 101 may map the terminal-specific reference signals up to a maximum of rank 8 using eight antenna ports (antenna ports 7-14) in accordance with a control signal and data signal to be mapped to the resource block pair. The base station 101 may vary the spread code length of CDM and the number of resource elements to be mapped in accordance with the rank according to which the terminal-specific reference signals are mapped.

The terminal-specific reference signals with ranks 1 and 2 comprise a spread code length of 2 chips on antenna ports 7 and 8, and are mapped to the CDM group 1. The terminal-specific reference signals with ranks 3 and 4 comprise a spread code length of 2 chips on antenna ports 9 and 10 in addition to antenna ports 7 and 8, and are mapped to the CDM group 2. The terminal-specific reference signals within rank 5 and rank 8 comprise a spread code length of 4 chips on antenna ports 7 and 14, and are mapped to the CDM group 1 and the CDM group 2.

In the terminal-specific reference signal, a scramble code is further superimposed on an orthogonal code in each antenna port. The scramble code is generated in accordance with a cell ID and a scramble ID notified by the base station 101. For example, the scramble code is generated from a pseudo-noise sequence generated from the cell ID and the scramble ID notified by the base station 101. For example, the scramble ID is a value of 0 or 1. Information indicating the scramble ID and the antenna port in use is joint-coded to index these pieces of information.

Regions of the first through third OFDM symbols from among the shaded resource elements of FIG. 2 are configured to be regions where a first control channel (PDCCH: Physical Downlink Control Channel) is allocated. The base station 101 may also configure an OFDM symbol count (i.e., the number of OFDM symbols) in a per subframe basis for the region of the first control channel. White regions of resource elements indicate regions where a second control channel (X-PDCCH) or a shared channel (PDSCH: Physical Downlink Shared Channel) is allocated. The shared channel may be also referred to as the physical data channel. The base station 101 may configure on a per resource block pair the region where the second control channel or the shared channel is allocated. The rank for each of the control signal mapped to the second control channel and the data signal mapped to the shared channel may be different in configuration from the rank for the control signal mapped to the first control channel.

The resource block count may be changed depending on the frequency bandwidth (system bandwidth) used in the communication system. For example, the base station 101 may use 6 to 110 resource blocks in the system bandwidth, and unit of the resource blocks is referred to as a CC (Component Carrier or Carrier Component). The base station 101 may configure the terminal 102 for a plurality of component carriers via frequency aggregation. The frequency aggregation may be also referred to as the carrier aggregation. For example, the base station 101 configures a component carrier of 20 MHz for the terminal 102, thereby configuring, for the terminal 102, five component carriers contiguously or non-contiguously in the frequency domain. The base station 101 thus configures an overall bandwidth of 100 MHz for use in the communication system.

The control information is modulated or error-correction coded in accordance with a predetermined modulation scheme or encoding scheme to generate a control signal. The control signal is transmitted or received in a first control channel (first physical control channel) or a second control channel (second physical control channel) different from the first control channel. Note that the physical control channel herein is one type of physical channel that is defined in a physical frame.

From one viewpoint, the first control channel is a physical control channel that uses the same transmit port as that of the cell-specific reference signal. The transmit port may be also referred to as the antenna port. Also, the second control channel is a physical control channel that uses the same transmit port as that of the terminal-specific reference signal. The terminal 102 demodulates the control signal to be mapped to the first control channel using the cell-specific reference signal, and demodulates the control signal to be mapped to the second control channel using the terminal-specific reference signal. Since the cell-specific reference signal is a reference signal common to all the terminals 102 within the cell and inserted into all the resource blocks in the system bandwidth, any terminal 102 may use the cell-specific reference signal. For this reason, any terminal 102 may demodulate the signal in the first control channel. On the other hand, the terminal-specific reference signal is a reference signal that is inserted into only an allocated resource block. A beam forming operation may be adaptively performed on the terminal-specific reference signal in the same manner as on the data signal. The second control channel thus provides adaptive beam forming gain.

From another viewpoint, the first control channel is a physical control channel on an OFDM symbol located in the front portion of the physical subframe, and may be placed over the entire region of the system bandwidth on the OFDM symbols. The system bandwidth may be also referred to as the CC (Component Carrier or Carrier Component). The second control channel is a physical control channel on an OFDM symbol located behind the first control channel of the physical subframe, and may be placed on part of the system bandwidth on the OFDM symbols. Since the first control channel is placed on the OFDM symbol dedicated to the control channel located in the front portion of the physical subframe, the first control channel may be received and demodulated prior to the OFDM symbol in the rear portion of the physical data channel. The terminal 102 that monitors only the OFDM symbol dedicated to the control channel may also receive in the first control channel.

Since the resource used in the first control channel may be distributed and placed over the entire CC region, inter-cell interference over the first control channel may be randomized. On the other hand, the second control channel is placed on the OFDM symbol in the rear portion of the shared channel (physical data channel) in which the terminal 102 normally receives. By frequency-division multiplexing the second control channel, the base station 101 may orthogonal multiplex (interference-free multiplex) the second control channels or the second control channel and physical data channel.

From another viewpoint, the first control channel is a cell-specific physical control channel, and is a physical channel that may be accessed by both the terminal 102 in an idle state and the terminal 102 in a connected state. The second control channel is a terminal-specific physical control channel, and is a physical channel that may be accessed only by the terminal 102 in the connected state. The idle state refers to a state, in which the base station 101 is not ready to immediately transmit or receive data, such as a state (RRC_IDLE state) in which the base station 101 has not accumulated information of RRC (Radio Resource Control). On the other hand, the connected state refers to a state, in which the terminal 102 is ready to immediately transmit or receive data, such as a state (RRC_connected state) in which the terminal 102 has held network information. The first control channel is a channel in which the terminal 102 may receive in a manner free from dedicated RRC signaling. The second control channel is a channel that is configured by the dedicated RRC signaling and that the terminal 102 may receive using the dedicated RRC signaling. More specifically, the first control channel is a channel that any terminal may receive in a predetermined limited configuration, and the second control channel is a channel that permits a terminal-specific configuration to be easily modified.

Figure 3:
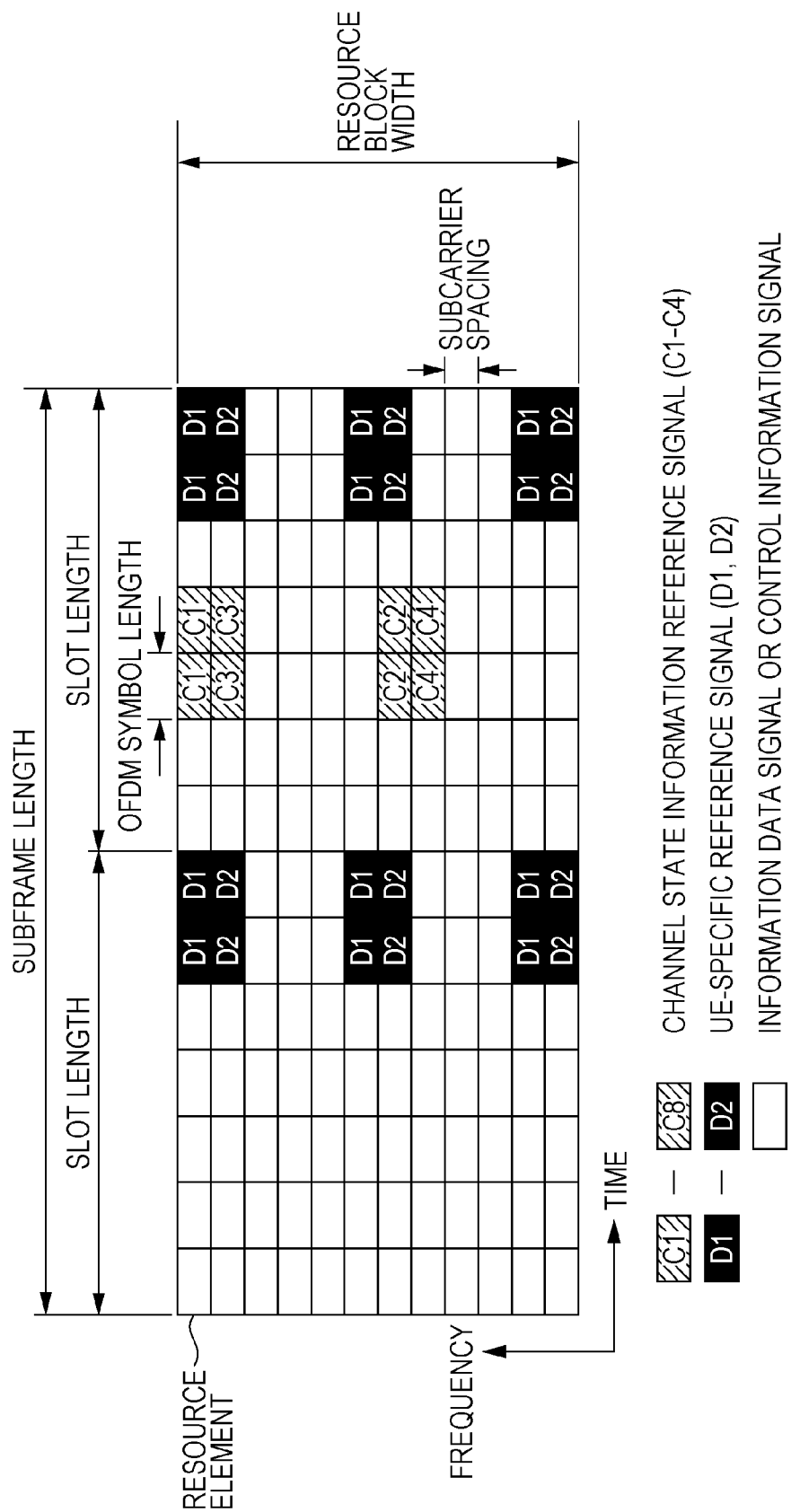
FIG. 3 illustrates another example of the pair of resource blocks mapped by the base station 101.

FIG. 3 illustrates another example of the pair of resource blocks to which the Channel State Information Reference Signals (CSI-RS) for eight antenna ports are mapped. As illustrated in FIG. 3, the channel state information reference signals are mapped in a case that the number of antenna ports of the base station (CSI port count) is eight. FIG. 3 also illustrates two resource blocks within one subframe.

From among resource elements in filled or hatched columns of FIG. 3, D1 and D2 represent the terminal-specific reference signals for the CDM groups 1 and 2 (data signal demodulation reference signals), and C1 through C4 represent channel state information reference signals for the CDM groups 1 through 4. Furthermore, a data signal or a control signal is mapped to a resource element other than the resource elements to which these reference signals are mapped.

The orthogonal code of two chips decoding means, Walsh code) is used for the channel state information reference signal in each CDM group, a CSI port (port for the channel state information reference signal (antenna port, resource grid)) is allocated to each orthogonal code, and the channel state information reference signal is code division multiplexed (CDM) on every two CSI ports. Each CDM group is then frequency division multiplexed. Using four CDM groups, the channel state information reference signals of eight antenna ports of CSI ports 1 through 8 (antenna ports 15 through 22) are mapped. For example, in the CDM group C1 of the channel state information reference signals, the channel state information reference signals of the CSI ports 1 and 2 (antenna ports 15 and 16) are code-division multiplexed and then mapped. In the CDM group C2 of the channel state information reference signals, the channel state information reference signals of the CSI ports 3 and 4 (antenna ports 17 and 18) are code-division multiplexed and then mapped. In the CDM group C3 of the channel state information reference signals, the channel state information reference signals of the CSI ports 5 and 6 (antenna ports 19 and 20) are code-division multiplexed and then mapped. In the CDM group C4 of the channel state information reference signals, the channel state information reference signals of the CSI ports 7 and 8 (antenna ports 21 and 22) are code-division multiplexed and then mapped.

If the number of antenna ports of the base station 101 is eight, the base station 101 may set the number of layers for data signals or control signals (rank, the number of spatial multiplexes, the number of DMRS ports) to be a maximum of eight. For example, the number of layers for data signals may be set to two, and the number of layers for control signals may be set to one. The orthogonal code of two chips or four chips may be used for the terminal-specific reference signal (DL DMRS, UE-RS) in each CDM group depending on the number of layers, and the terminal-specific reference signal is code-division multiplexed every two layers or every four layers. Each CDM group of the terminal-specific reference signals is frequency-division multiplexed. Using two CDM groups, the terminal-specific reference signals of eight layers of DMRS ports 1 through 8 (antenna ports 7 through 14) are mapped.

With the number of antenna ports being one, two, or four, the base station 101 may transmit the channel state information reference signal. The base station 101 may transmit the channel state information reference signal for one antenna port or two antenna ports using the CDM group C1 of the channel state information reference signal of FIG. 3. The base station 101 may transmit the channel state information reference signal for four antenna ports using the CDM groups C1 and C2 of the channel state information reference signals of FIG. 3.

The base station 101 and the RRH 103 may allocate a different resource element to each of C1 through C4 or may allocate the same resource element to each of C1 through C4. For example, if the base station 101 and the RRH 103 allocate a different resource element or a different signal sequence to each of the C1 through C4, the terminal 102 may calculate the reception power (received signal power) and the channel state from each of the base station 101 and the RRH 103 using the channel state information reference signal. In another example, if the base station 101 and the RRH 103 allocate the same resource element for each of the C1 through C4 and transmit each of the C1 through C4 within the same signal sequence, the terminal 102 may calculate the combined reception power using the channel state information reference signal.

Figure 4:
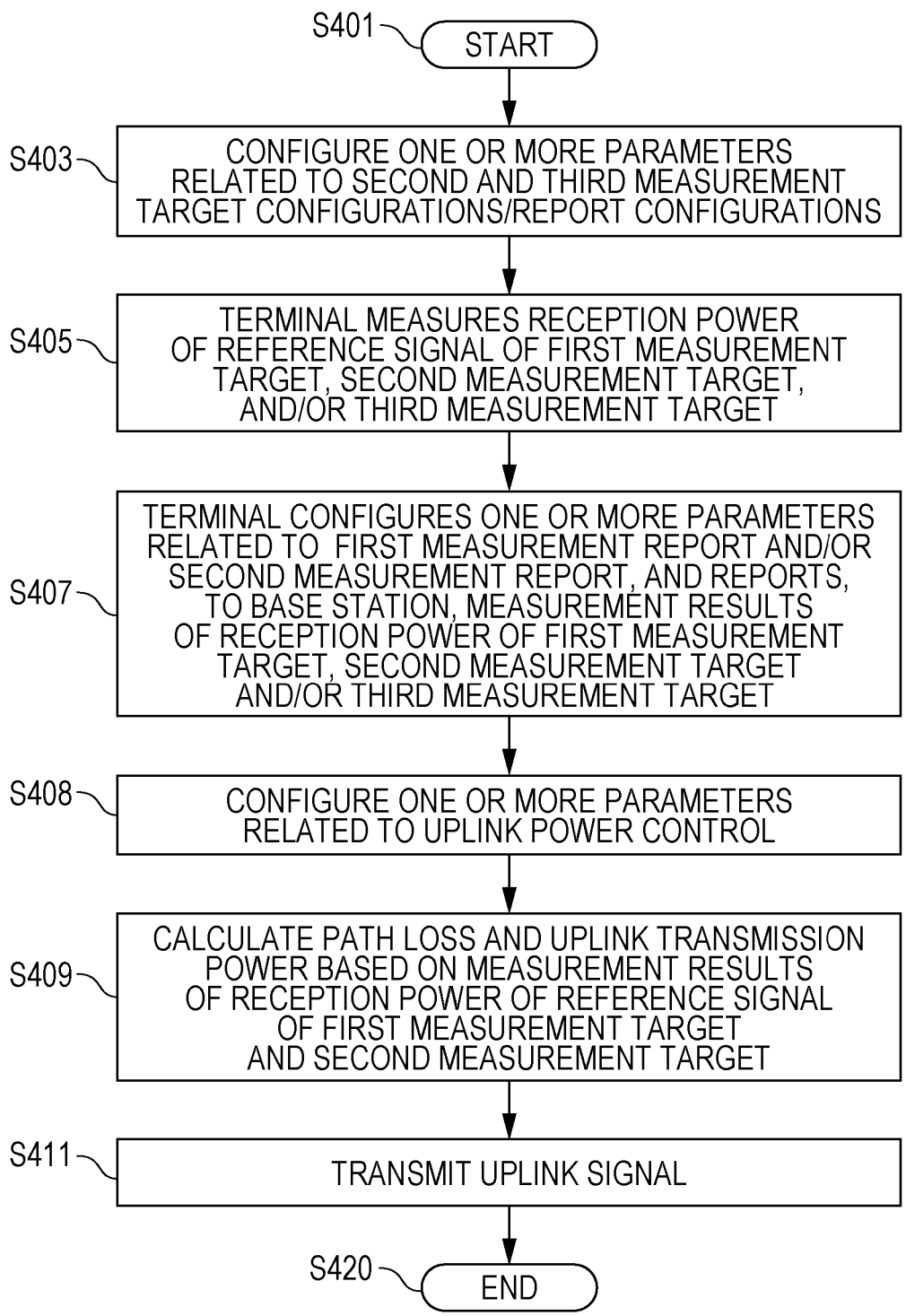
FIG. 4 is a flowchart illustrating in detail a transmission process of a terminal of the first embodiment of the present invention that transmits an uplink signal.

Referring to a flowchart of FIG. 4, the terminal 102 measures the reference signals (the cell-specific reference signal and the channel state information reference signal), reports the reception power to the base station 101, calculates a path loss on the basis of measurement results, calculates uplink transmission power based on the calculated path loss, and transmits an uplink signal at the calculated uplink transmission power. In step S403, the base station 101 configures, for the terminal 102, one or more parameters related to the measurement and reporting of the reference signal. The parameters related to each of a second measurement target configuration, a second report configuration, a third measurement target configuration, and a third report configuration are configured in step S403. A first measurement target configuration, though not illustrated herein, is performed in the terminal 102 in advance. The measurement target in the first measurement target configuration (a first measurement target) may always be a cell-specific reference signal on the antenna port 0 or cell-specific reference signals on antenna ports 0 and 1. More specifically, the first measurement target configuration may be intended for a predetermined particular reference signal and antenna port.

On the other hand, the second measurement target configuration performed by the base station 101 is intended for the channel state information reference signal. A resource as the measurement target (e.g., antenna port) may be configured by the base station 101. The number of resources as the second measurement target may be one or more. The parameters are described in detail later. The third measurement target configuration performed by the base station 101 comprises a configuration for the measurement of a reference signal transmitted from an unconnected cell as described below. For example, a reference signal serving as the measurement target of the third measurement target configuration (a third measurement target) may always be the cell-specific reference signal of the antenna port 0 or the cell-specific reference signals of the antenna ports 0 and 1. More specifically, the third measurement target configuration may be intended for a certain reference signal and a certain antenna port configured in advance in an unconnected cell. The unconnected cell may refer to a cell in a state that no parameter is configured by RRC. From another viewpoint, the cell-specific reference signal transmitted from the unconnected cell may be generated using a physical ID (physical cell ID) different from the cell-specific reference signal transmitted from the connected cell.

Figure 15:
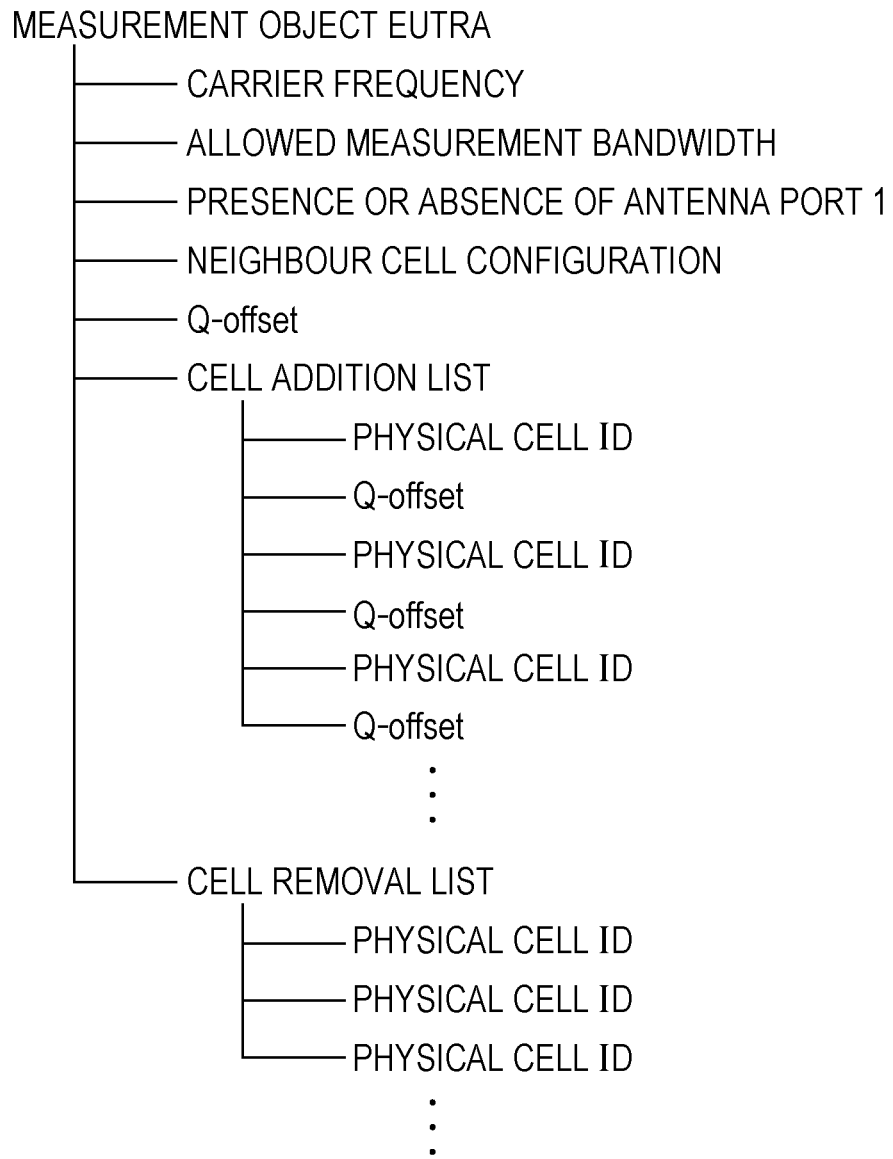
FIG. 15 illustrates in detail an example of measurement object EUTRA.

In a case that the base station 101 notifies the terminal 102 of the physical ID (physical cell ID) and the carrier frequency (center frequency) in accordance with the third measurement target configuration, the terminal 102 may measure the received signal power of the cell-specific reference signal transmitted from the unconnected cell (cell with no RRC parameter configured) (see FIG. 15). Each of the second report configuration and the third report configuration comprises a configuration of transmission timing, such as an event that serves as a trigger in response to which the terminal 102 performs the measurement report comprising the measurement results.

Step S405 is described next. In step S405, the terminal 102 measures the reception power of the reference signal as the first measurement target configured in the first measurement target configuration if the first measurement target configuration is performed, and measures the reception power of the reference signal as the second measurement target configured in the second measurement target configuration if the second measurement target configuration is performed. If the third measurement target configuration is performed, the terminal 102 measures the reception power of the reference signal as the third measurement target configured in the third measurement target configuration. Step S407 is then described. In step S407, one or more parameters for the first measurement report and/or the second measurement report may be configured. The first measurement report may be related to the received signal power of the measurement target configured in the first measurement target configuration and/or the third measurement target configuration. On the other hand, the second measurement report may be related to the received signal power of the measurement target configured in the second measurement target configuration.

The second measurement report is related to one or more measurement results of the reference signal received power (RSRP) as the second measurement target configured in the second measurement target configuration. The second measurement report may comprise a configuration as to which resource's measurement result from among the second measurement targets is configured as a report target. Which resource's measurement result configured as the report target may be notified by an index related to the CSI ports 1 through 8 (antenna ports 15 through 22) or may be notified by an index related to a frequency-time resource. If the first measurement report is configured in step S407, the measurement results of the reception power of the reference signals of the first measurement target and/or the third measurement target configured in the first measurement target configuration and/or the third measurement target configuration are reported. If the second measurement report is configured, one or more measurement results of the reception power of the reference signals of the second measurement target configured in the second measurement target configuration are reported. As previously described, the second measurement report may comprise the configuration as to which resource's measurement result from among the second measurement targets is configured as the report target.

Step S408 is described below. In step S408, one or more parameters related to the uplink power control (UplinkPowerControl or TPC Command) may be configured. This parameter configuration is related to which pass loss, a first path loss or a second path loss, to use in the setting of the uplink transmission power. The first path loss is based on the received signal power respectively measured and reported in the first measurement target configuration and the first measurement report. The second path loss is based on the received signal power respectively measured and reported in the second measurement target configuration and the second measurement report. These parameters are described in detail below.

Step S409 is described next. In step S409, the uplink transmission power is set. A downlink path loss between the base station 101 (or the RRH 103) and the terminal 102 is used to set the uplink transmission power. The downlink path loss is based on the measurement result of the received signal power for the cell-specific reference signal measured in S405, namely, the measurement result for the first measurement target, or the measurement result of the received signal power for the channel state information reference signal measured in S405, namely, the measurement result for the second measurement target. Since the transmission power of the reference signal is also needed to calculate the path loss, information related to the transmission power for the reference signal may be comprised in the second measurement target configuration. The terminal 102 thus stores the first path loss calculated from the reception power for the reference signal as the first measurement target configured in the first measurement target configuration, and the second path loss calculated from the reception power of the reference signal as the second measurement target configured in the second measurement target configuration. The terminal 102 sets the uplink transmission power on the basis of the configuration of one or more parameters related to the uplink power control configured in step S403 using one of the first path loss and the second path loss. Step S411 is described next. In step S411, the uplink signal is transmitted at the transmission power determined in step S409.

Figure 5:
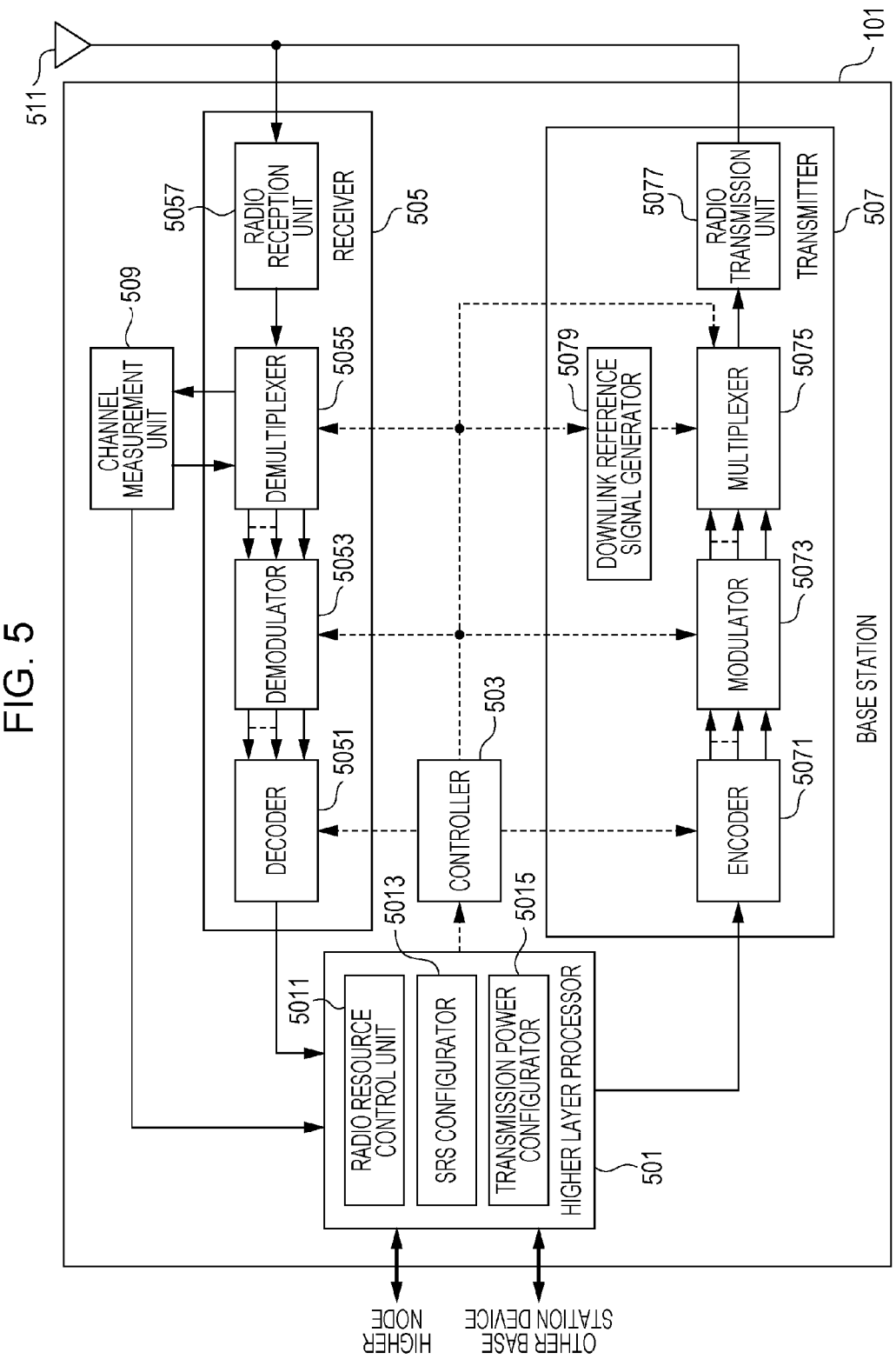
FIG. 5 is a diagrammatic block diagram illustrating a configuration of the base station 101 of the first embodiment of the present invention.

FIG. 5 is a diagrammatic block diagram illustrating a configuration of the base station 101 of the first embodiment of the present invention. As illustrated in FIG. 5, the base station 101 comprises one or more higher layer processors 501, one or more controllers 503, one or more receivers 505, one or more transmitters 507, one or more channel measurement units 509, and one or more transmit and receive antennas 511. The higher layer processor 501 comprises a radio resource control unit 5011, an SRS configurator 5013, and a transmission power configurator 5015. The receiver 505 comprises a decoder 5051, a demodulator 5053, a demultiplexer 5055, and a radio reception unit 5057. The transmitter 507 comprises an encoder 5071, a modulator 5073, a multiplexer 5075, a radio transmission unit 5077, and a downlink reference signal generator 5079.

The higher layer processor 501 performs processes in a packet data convergence protocol (PDCP) layer, a radio link control (RLC) layer, and a radio resource control (RRC) layer.

The radio resource control unit 5011 in the higher layer processor 501 generates information on each downlink channel, or acquires the information on each downlink channel from a higher node, and then outputs the information to the transmitter 507. The radio resource control unit 5011 allocates from uplink radio resources a radio resource to which the terminal 102 assigns uplink data information in a physical uplink shared channel (PUSCH). The radio resource control unit 5011 allocates from downlink radio resources a radio resource to which downlink data information in a physical downlink shared channel (PDSCH) is assigned. The radio resource control unit 5011 generates downlink control information indicating radio resource allocation, and then transmits the downlink control information to the terminal 102 via the transmitter 507. In a case that the radio resource for the PUSCH transmission is allocated, the radio resource control unit 5011 allocates a radio resource having a higher channel quality with a higher priority on the basis of the uplink channel measurement results input from the channel measurement unit 509. The downlink control information is transmitted by means of a certain format corresponding to applications. The downlink control information format for use in the scheduling of the PUSCH and the transmission power control may also be referred to as an uplink grant. The downlink control information format for use in the scheduling of the PDSCH and the transmission power control of the PUCCH may also be referred to as a downlink grant (downlink assignment). These downlink control information formats are transmitted from the base station 101 to the terminal 102 using a physical downlink control channel.

The higher layer processor 501 generates control information to control the receiver 505 and the transmitter 507 in accordance with uplink control information (ACK/NACK, channel quality information, and scheduling request) notified by the terminal 102 in the physical uplink control channel (PUCCH), buffer status notified by the terminal 102, and a variety of configuration information for each terminal 102 configured by the radio resource control unit 5011. The higher layer processor 501 then outputs the control information to the controller 503.

The SRS configurator 5013 configures a sounding subframe as a subframe in which the terminal 102 reserves a radio resource to transmit a sounding reference signal SRS, configures a bandwidth of a radio resource that the terminal 102 reserves to transmit the SRS in the sounding subframe, generates information related to the configuration as system information, and broadcasts the system information using the PDSCH by the transmitter 507. The SRS configurator 5013 also configures a subframe to transmit periodic SRS periodically to each terminal 102, configures a value of a cyclic shift for use in a CAZAC sequence of the periodic SRS, generates a signal, comprising the information related to the configuration, as a radio resource control signal (RRC signal), and notifies each terminal 102 of the RRC signal using the PDSCH by the transmitter 507.

The SRS configurator 5013 configures a frequency bandwidth to transmit aperiodic SRS to each terminal 102, configures a value of a cyclic shift for use in a CAZAC sequence of the aperiodic SRS, generates a signal, comprising the information related to the configuration, as an RRC signal, and notifies each terminal 102 of the RRC signal using the transmitter 507 and the PDSCH. In a case that the SRS configurator 5013 requests the terminal 102 to transmit the aperiodic SRS, the SRS configurator 5013 generates an SRS request requesting the terminal 102 to transmit the aperiodic SRS, and then notifies the terminal 102 of the SRS request using the PDCCH by the transmitter 507.

The transmission power configurator 5015 configures the transmission power of the PUCCH, the PUSCH, the periodic SRS, and the aperiodic SRS. More specifically, in accordance with information indicating an amount of interference from one or more adjacent base stations, information indicating an amount of interference that is notified by an adjacent base station 101 and affects the adjacent base station 101, a quality of a channel input from the channel measurement unit 509, and other factors, and in view of interference to the adjacent base station, the transmission power configurator 5015 configures the transmission power of the terminal 102 so that the PUSCH and the like satisfy a predetermined channel quality. The transmission power configurator 5015 transmits information indicative of the configuration to the terminal 102 via the transmitter 507.

More specifically, the transmission power configurator 5015 configures $P_{O\_PUSCH}$, and $\alpha$ in Equation (1) discussed later, $P_{SRS\_OFFSET}(0)$ of the periodic SRS (first parameter (pSRS-Offset)), and $P_{SRS\_OFFSET}(1)$ of the aperiodic SRS (second parameter (pSRS-OffsetAp-r10)), generates a signal, comprising information indicative of the configuration, as a radio resource control signal, and notifies each terminal 102 of the radio resource control signal using the transmitter 507 and the PDSCH. The transmission power configurator 5015 configures a TPC command to calculate "f" of Equation (1) and Equation (4), generates a signal indicative of the TPC command, and then notifies each terminal 102 of the signal using the transmitter 507 and the PDCCH. Here, $\alpha$ is a coefficient that is used in Equation (1) and Equation (4) together with a path loss value to calculate the transmission power, and indicates the degree of compensation for the path loss. In other words, $\alpha$ is a coefficient that determines how much power is to be increased or decreased in response to the path loss. Typically, $\alpha$ falls within a range from 0 to 1. If $\alpha$ is 0, no power compensation is performed in response to the path loss. If $\alpha$ is 1, the transmission power of the terminal 102 is increased or decreased so that the effect of the path loss acts on the base station 101.

The controller 503 generates a control signal to control the receiver 505 and the transmitter 507 in response to the control information from the higher layer processor 501. The controller 503 outputs the generated control signal to the receiver 505 and the transmitter 507, thereby controlling the receiver 505 and the transmitter 507.

In response to the control signal input from the controller 503, the receiver 505 demultiplexes, demodulates, and decodes a reception signal received from the terminal 102 via the transmit and receive antenna 511, and outputs the decoded information to the higher layer processor 501. The radio reception unit 5057 converts (down-converts) an uplink signal received via the transmit and receive antenna 511 into an intermediate frequency (IF), removes an unnecessary frequency component, controls an amplification level to maintain an appropriate signal level, orthogonally demodulates the received signal in accordance with an in-phase component and an orthogonal component of the received signal, and converts the orthogonally demodulated analog signal into a digital signal. The radio reception unit 5057 removes a portion corresponding to a guard interval (GI) from the digital signal. The radio reception unit 5057 performs fast Fourier transform (FFT) on the signal with the guard interval removed therefrom to extract a signal in the frequency domain, and then outputs the signal in the frequency domain to the demultiplexer 5055.

The demultiplexer 5055 demultiplexes the signal input from the radio reception unit 5057 into signals of PUCCH, PUSCH, UL DMRS, SRS, and the like. The demultiplexing is performed in accordance with allocation information of the radio resource which is determined by the base station 101 in advance and is notified to the terminal 102. The demultiplexer 5055 compensates for the channels of PUCCH and PUSCH in accordance with an estimated value of the channel input from the channel measurement unit 509. The demultiplexer 5055 outputs the demultiplexed signals of UL DMRS and SRS to the channel measurement unit 509.

The demodulator 5053 performs inverse discrete Fourier transform (IDFT) on the PUSCH signal to acquire a modulation symbol. The demodulator 5053 demodulates the PUCCH and PUSCH modulation symbols in accordance with a predetermined modulation scheme such as binary phase shift keying (BPSK), quadrature phase shift keying (QPSK), 16 quadrature amplitude modulation (16QAM), 64 quadrature amplitude modulation (64QAM), or a modulation scheme the base station 101 has notified in advance to each terminal 102 using the downlink control information.

The decoder 5051 decodes the demodulated PUCCH and PUSCH encoded bits at a predetermined encoding rate of a predetermined encoding scheme, or at an encoding rate the base station 101 has notified in advance to the terminal 102 using the uplink grant (UL grant). The decoder 5051 outputs decoded data information and uplink control information to the higher layer processor 501.

The channel measurement unit 509 measures an estimated values of the channel and/or channel quality using the uplink demodulation reference signal (UL DMRS) and/or SRS input from the demultiplexer 5055 and outputs the measured values to the demultiplexer 5055 and the higher layer processor 501.

In accordance with the control signal input from the controller 503, the transmitter 507 generates the reference signal of the downlink (the downlink reference signal), and encodes and modulates the data signal and the downlink control information, input from the higher layer processor 501, multiplexes the PDCCH and PDSCH signals, and downlink reference signal, and transmits the multiplexed signal to the terminal 102 via the transmit and receive antenna 511.

The encoder 5071 performs an encoding process, such as turbo coding, convolutional coding, or block coding, on the downlink control information and data information input from the higher layer processor 501. The modulator 5073 modulates encoded bits in accordance with a modulation scheme, such as QPSK, 16QAM, or 64QAM. The downlink reference signal generator 5079 generates as a downlink reference signal a sequence, which is determined in accordance with a rule predetermined on the basis of a cell identity (Cell ID) identifying the base station 101 and known to the terminal 102. The multiplexer 5075 multiplexes the modulated channel signals and the generated downlink reference signal.

The radio transmission unit 5077 performs inverse fast Fourier transform (IFFT) on the multiplexed modulation symbol, performs OFDM modulation on the transformed symbol, attaches a guard interval to the OFDM modulated symbol, generates a baseband digital signal, converts the baseband digital signal into an analog signal, generates from the analog signal an in-phase component and an orthogonal component of an intermediate frequency, removes an unnecessary frequency component in the intermediate frequency band, converts (up-converts) the intermediate frequency signal to a signal on a higher frequency, removes an unwanted frequency component from the higher frequency signal, power-amplifies the resulting signal, and outputs the amplified signal to the transmit and receive antenna 511 for transmission. The RRH 103, thought not illustrated herein, is similar in structure to the base station 101.

Figure 6:
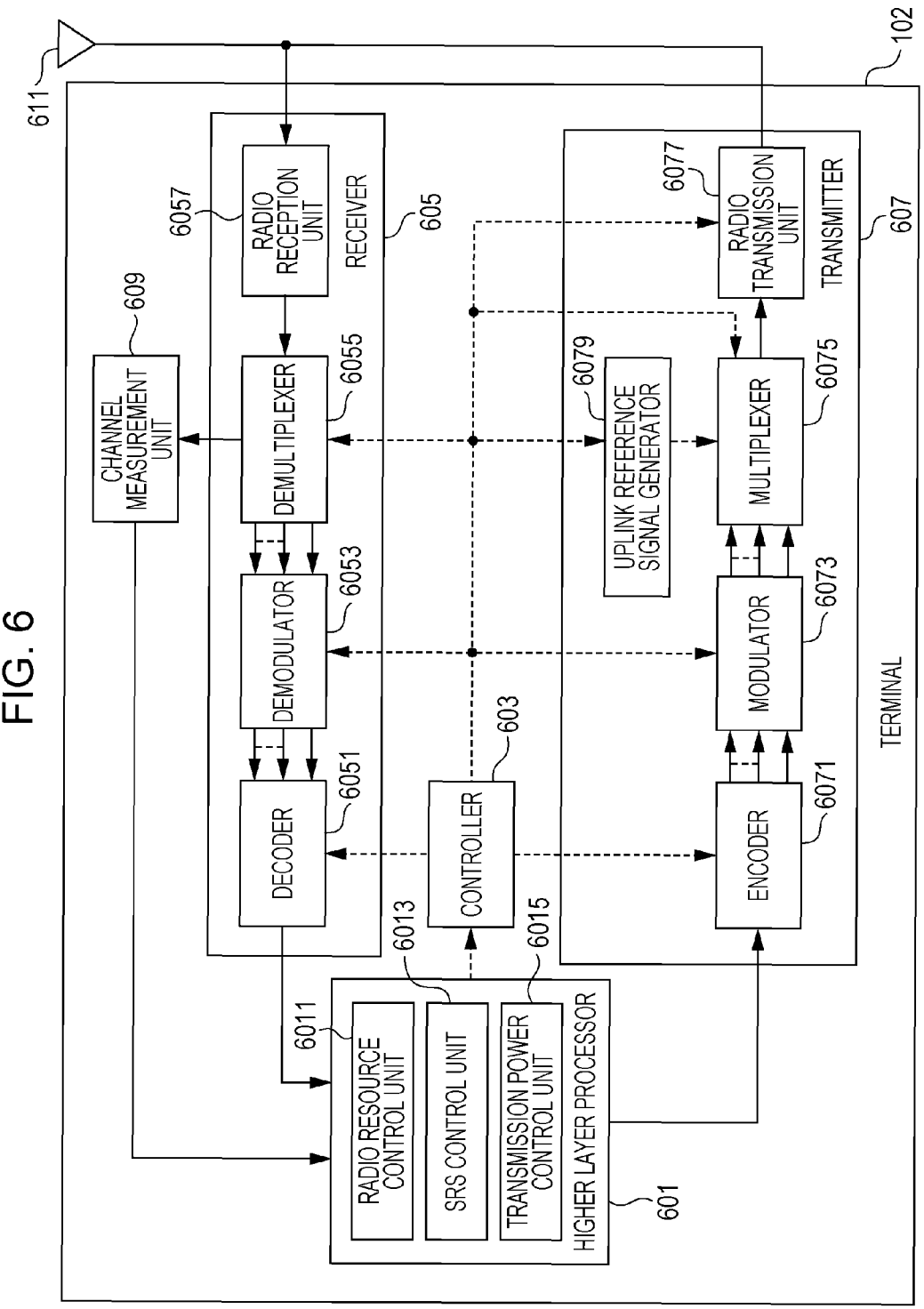
FIG. 6 is a diagrammatic block diagram illustrating a configuration of a terminal 102 of the first embodiment of the present invention.

FIG. 6 is a diagrammatic block diagram illustrating a configuration of the terminal 102 of the embodiment of the present invention. As illustrated, the terminal 102 comprises one or more higher layer processors 601, one or more controllers 603, one or more receivers 605, one or more transmitters 607, one or more channel measurement units 609, and one or more transmit and receive antennas 611. The higher layer processor 601 comprises a radio resource control unit 6011, an SRS control unit 6013, and a transmission power control unit 6015. The receiver 605 comprises a decoder 6051, a demodulator 6053, a demultiplexer 6055, and a radio reception unit 6057. The transmitter 607 comprises an encoder 6071, a modulator 6073, a multiplexer 6075, and a radio transmission unit 6077.

The higher layer processor 601 outputs, to the transmitter, uplink data information generated in response to a user operation. The higher layer processor 601 performs processes at the packet data convergence protocol layer, the radio link control layer, and the radio resource control layer.

The radio resource control unit 6011 in the higher layer processor 601 manages a variety of configuration information for the terminal 102. The radio resource control unit 6011 generates information to be allocated on each uplink channel, and outputs the generated information to the transmitter 607. In accordance with the downlink control information notified by the base station 101 using the PDCCH, and a variety of configuration information for the terminal 102 that is configured by the radio resource control information notified using the PDSCH and is managed by the radio resource control unit 6011, the radio resource control unit 6011 generates control information to control the receiver 605 and the transmitter 607. The radio resource control unit 6011 then outputs the control information to the controller 603.

The SRS control unit 6013 in the higher layer processor 601 receives, from the receiver 605, information indicating a sounding subframe (SRS subframe, and SRS transmission subframe) as a subframe to reserve a radio resource to transmit the SRS broadcast by the base station 101, and a bandwidth of a radio resource reserved to transmit the SRS in the sounding subframe, information indicating a subframe to transmit the periodic SRS which the base station 101 has notified to the terminal 102, a frequency bandwidth, and a value of a cyclic shift for use in the CAZAC sequence of the periodic SRS, and information indicating a frequency bandwidth to transmit the aperiodic SRS which the base station 101 has notified to the terminal 102, and a value of a cyclic shift for use in the CAZAC sequence of the aperiodic SRS.

The SRS control unit 6013 controls the SRS transmission in accordance with the above-described information. More specifically, the SRS control unit 6013 controls the transmitter 607 in accordance with the information related to the periodic SRS in order to transmit the periodic SRS single or indefinite. Upon being requested to transmit the aperiodic SRS in an SRS indicator (SRS request) input from the receiver 605, the SRS control unit 6013 transmits the aperiodic SRS by a predetermined number of times (single, for example) in accordance with the information related to the aperiodic SRS.

The transmission power control unit 6015 in the higher layer processor 601 outputs the control information to the controller 603 in order to control the transmission power based on information indicating the configuration of the transmission power for the PUCCH, the PUSCH, the periodic SRS, and the aperiodic SRS. More specifically, the transmission power control unit 6015 controls the transmission power of the periodic SRS and the aperiodic SRS in accordance with Equation (4) based on $P_{O\_PUSCH}$, $\alpha$, $P_{SRS\_OFFSET}(0)$ of the periodic SRS (first parameter (pSRS-Offset)), and $P_{SRS\_OFFSET}(1)$ of the aperiodic SRS (second parameter (pSRS-OffsetAp-r10)), and the TPC command, received from the receiver 605. The transmission power control unit 6015 switches parameters of $P_{SRS\_OFFSET}$ depending on the periodic SRS or the aperiodic SRS.

In accordance with the control information from the higher layer processor 601, the controller 603 generates the control signal to control the receiver 605 and the transmitter 607. The controller 603 outputs the generated control signal to the receiver 605 and the transmitter 607, thereby controlling the receiver 605 and the transmitter 607.

In accordance with the control signal input from the controller 603, the receiver 605 demultiplexes, demodulates, and decodes a signal received from the base station 101 via the transmit and receive antenna 611, and outputs the decoded information to the higher layer processor 601.

The radio reception unit 6057 converts (down-converts) the downlink signal received via each receive antenna into an intermediate frequency, removes an unwanted frequency component, controls an amplification level to maintain an appropriate signal level, orthogonally demodulates the received signal in accordance with an in-phase component and an orthogonal component of the received signal, and converts the orthogonally demodulated analog signal into a digital signal. The radio reception unit 6057 removes a portion of the digital signal corresponding to the guard interval, and performs fast Fourier transform on the signal with the guard interval removed therefrom, thereby extracting a signal in the frequency domain.

The demultiplexer 6055 demultiplexes the extracted signal into a physical downlink control channel (PDCCH) signal, a PDSCH signal, and a downlink reference signal DRS. The demultiplexing is performed based on the allocation information of the radio resource notified using the downlink control information. The demultiplexer 6055 compensates for the channels of PDCCH and PDSCH in accordance with the estimated value of the channel input from the channel measurement unit 609. The demultiplexer 6055 then outputs the demultiplexed downlink reference signal to the channel measurement unit 609.

The demodulator 6053 demodulates the PDCCH signal in accordance with the QPSK modulation scheme, and outputs the resulting signal to the decoder 6051. In a case that the decoder 6051 decodes the PDCCH signal successfully, the decoder 6051 outputs the decoded downlink control signal to the higher layer processor 601. The demodulator 6053 demodulates the PDSCH signal in the modulation scheme notified by the downlink control information, such as the QPSK, 16QAM, or 64QAM, and outputs the demodulation result to the decoder 6051. The decoder 6051 decodes the demodulation result at the encoding rate notified by the downlink control information, and then outputs the decoded data information to the higher layer processor 601.

The channel measurement unit 609 measures a downlink path loss from the downlink reference signal input from the demultiplexer 6055, and transmits the measured path loss to the higher layer processor 601. The channel measurement unit 609 calculates the estimated value of the downlink channel from the downlink reference signal, and then outputs the calculated value to the demultiplexer 6055.

The transmitter 607 generates an UL DMRS signal and/or an SRS signal in response to the control signal input from the controller 603, encodes and modulates the data information input from the higher layer processor 601, multiplexes the PUCCH and PUSCH signals, and the generated UL DMRS signal and/or SRS signal, adjusts the transmission power of the PUCCH, PUSCH, UL DMRS and SRS signals, and transmits the resulting signal to the base station 101 via the transmit and receive antenna 611.

The encoder 6071 performs an encoding process, comprising turbo coding, convolutional coding, or block coding, on the uplink control information and data information input from the higher layer processor 601. The modulator 6073 modulates encoded bits input from the encoder 6071 in accordance with a modulation scheme, such as BPSK, QPSK, 16QAM, or 64QAM.

The uplink reference signal generator 6079 generates a CAZAC sequence, which is known to the base station 101 and is determined in accordance with a rule predetermined on the basis of a cell identity identifying the base station 101, and a bandwidth used to allocate UL DMRS and/or SRS. In accordance with the control signal input from the controller 603, the uplink reference signal generator 6079 imparts a cyclic shift to the generated CAZAC sequence for UL DMRS and/or SRS.

In accordance with the control signal input from the controller 603, the multiplexer 6075 rearranges the PUSCH modulation symbols in parallel and then performs discrete Fourier transform (DFT) on the rearranged modulation symbols, and multiplexes signals of PUCCH and PUSCH and the generated UL DMRS and SRS.

The radio transmission unit 6077 performs inverse fast Fourier transform on the multiplexed signal, modulates the inverse-transformed signal in accordance with the SC-FDMA scheme, attaches the guard interval to the SC-FDMA symbols that are SC-FDMA modulated, generates a baseband digital signal, converts the baseband digital signal into an analog signal, generates an in-phase component and an orthogonal component of an intermediate frequency from the analog signal, removes an unwanted frequency component in the intermediate frequency bandwidth, converts (up-converts) the signal on the intermediate frequency to a higher frequency signal, removes an unwanted frequency component, power-amplifies, and outputs the resulting signal to the transmit and receive antenna 611 for transmission.

Figure 7:
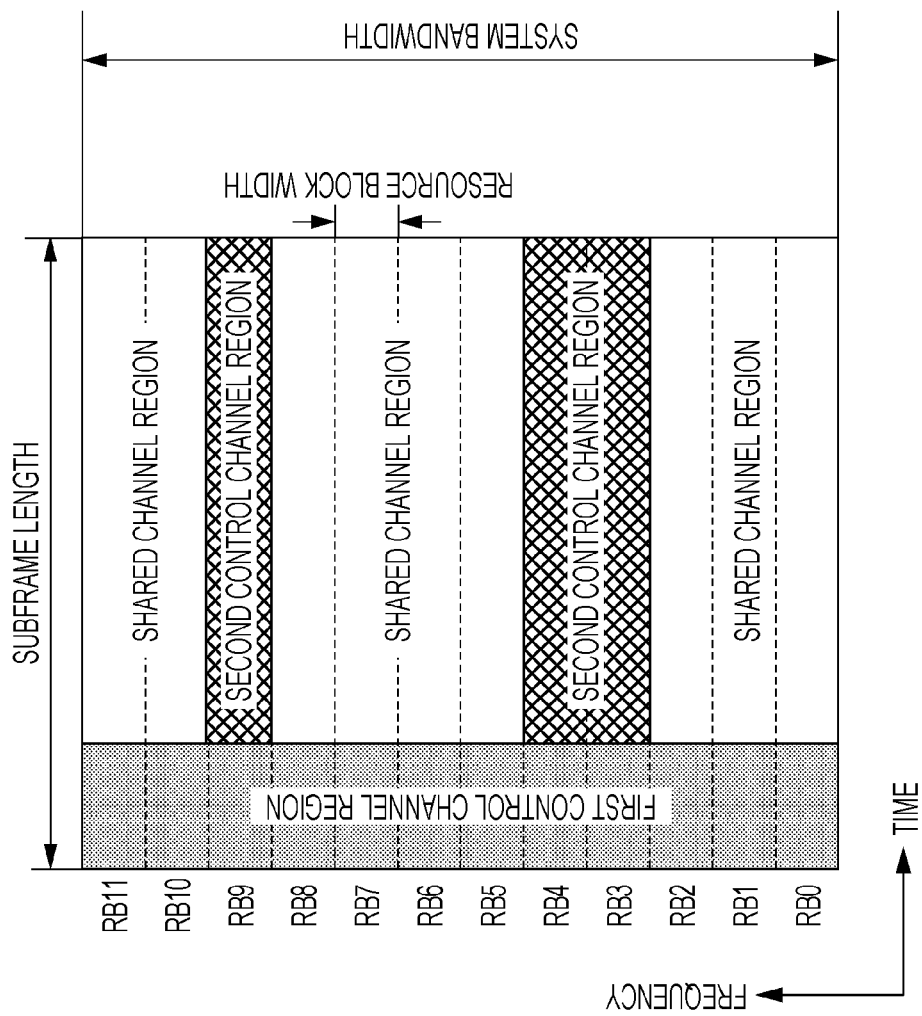
FIG. 7 illustrates an example of channels mapped by the base station 101.

FIG. 7 illustrates an example of channels mapped by the base station 101. As illustrated in FIG. 7, a system bandwidth is a frequency bandwidth of 12 resource block pairs. PDCCH as a first control channel is allocated to front OFDM symbols 1 through 3 in the subframe. The frequency domain of the first control channel extends across the system bandwidth. The shared channels are allocated to OFDM symbols other than those of the first control channels in the subframe.

The structure of the PDCCH is described below. The PDCCH comprises a plurality of channel elements (CCE). The number of CCEs used in each downlink component carrier depends on the bandwidth of the downlink component carrier, the number of OFDM symbols forming the PDCCH, and the number of transmit ports for the downlink reference signal corresponding to the number of transmit antennas of the base station 101 used for communication. The CCE comprises a plurality of downlink resource elements (a resource defined by one OFDM symbol and one subcarrier).

The CCE used between the base station 101 and the terminal 102 is tagged with a number identifying the CCE. The numbering of the CCE is performed in accordance with a predetermined rule. CCE_t represents a CCE having the CCE number t. The PDCCH is an aggregation (CCE Aggregation) comprising a plurality of CCEs. The number of CCEs forming the aggregation is referred to as a CCE aggregation level. The base station 101 configures the CCE aggregation level of the PDCCH in accordance with the encoding rate configured in the PDCCH, and the number of bits of the DCI comprised in the PDCCH signal. A combination of the CCE aggregation levels that may be used in the terminal 102 is predetermined. An aggregation of n CCEs is referred to as "CCE aggregation level n".

One resource element group (REG) comprises four downlink resource elements contiguous with each other in the frequency domain. One CCE comprises nine different resource element groups dispersed in the frequency domain and the time domain. More specifically, a block interleaver interleaves all the numbered resource element groups over the downlink component carrier on a per resource element group basis, and nine consecutively numbered and interleaved resource element groups form a single CCE.

A search space (SS) where PDCCH is searched for is configured in the terminal 102. The SS comprises a plurality of CCEs. The SS comprises a plurality of CCEs that are consecutively numbered from the number of the smallest CCE, and the number of CCEs that are consecutively numbered is predetermined. The SS of each CCE aggregation level comprises an aggregation of plurality of PDCCH candidates. The search spaces are categorized into CSS (Cell-specific SS) having a number counted from the smallest CCE and common in the cell and USS (UE-specific SS) having a number counted from the smallest CCE and specific to the terminal. Assigned to the CSS are the PDCCH to which the control information to be read by the terminal 102, such as system information and information related to paging, is allocated and the PDCCH to which the downlink/uplink grant indicating fallback or random access to lower transmission scheme is allocated.

The base station 101 performs transmission in the PDCCH using one or more CCEs in the SS configured in the terminal 102. The terminal 102 decodes the received signal using one or more CCEs in the SS, and performs a process to detect a signal of the PDCCH directed to the terminal 102 (referred to as blind decoding). The terminal 102 configures an SS different depending on the CCE aggregation level. The terminal 102 then performs blind decoding using a predetermined combination of CCEs in the SS different depending on the CCE aggregation level. In other words, the terminal 102 performs blind decoding on each PDCCH candidate in the SS different depending on the CCE aggregation level. This series of operations performed by the terminal 102 is referred to as monitoring of the PDCCH.

The second control channel (X-PDCCH, PDCCH on PDSCH, Extended PDCCH, Enhanced PDCCH, and E-PDCCH) is allocated to the OFDM symbols other than those of the first control channel. The second control channel and the shared control channel are allocated to different resource blocks. The resource blocks to which the second control channel and the shared control channel may be allocated are configured in each terminal 102. The shared channel of own terminal or another terminal (data channel) may be configured in the resource block to which the second control channel may be allocated. The start position of the OFDM symbol having the second control channel allocated thereto may be determined using the same method as that of the shared channel. More specifically, the base station 101 implements the method by configuring some of the resources of the first control channel to be PCFICH (Physical control format indicator channel), and mapping information indicative of the number of OFDM symbols of the first control channel.

The start position of the OFDM symbol having the second control channel allocated thereto may be predefined. For example, the start position of the OFDM symbol may be set to be a fourth front OFDM symbol in the subframe. If the number of OFDM symbols of the first control channel is two or less, the second and third OFDM symbols in the resource block pair having the second control channel allocated thereto are configured to be null with no signal mapped thereto. The resources configured to be null allows another control signal and data signal to be mapped thereto. The start position of the OFDM symbol forming the second control channel may be configured using the control information of a higher layer. As illustrated in FIG. 7, the subframes are multiplexed and the second control channel is configured on a per subframe basis.

As in the PDCCH, the SS to search X-PDCCH may comprise a plurality of CCEs. More specifically, a resource element group is constructed of a plurality of resource elements in a region configured as a region for the second control channel of FIG. 7, and the CCE is constructed of a plurality of resource elements. In this way, as in the PDCCH, the SS to search (monitor) X-PDCCH is constructed.

Alternatively, unlike in the PDCCH, the SS to search the X-PDCCH may be constructed of one or more resource blocks. More specifically, with the resource block in the region configured as the region for the second control channel of FIG. 7 being as a unit, the SS to search the X-PDCCH is constructed of an aggregation (RB Aggregation) comprising one or more resource blocks. The number of PBs forming the aggregation is referred to as "RB aggregation level". The SS is constructed of a plurality of RBs having consecutive numbers and ranging from the smallest RB. The number of RBs being one or more and having the consecutive numbers is predetermined. The SS of each RB aggregation level comprises an aggregation of a plurality of X-PDCCH candidates.

The base station 101 performs transmission in the X-PDCCH using one or more RBs in the SS configured in the terminal 102. The terminal 102 decodes the received signal using one or more RBs in the SS and thus performs a process to detect the X-PDCCH signal addressed thereto (blind decoding). The terminal 102 configures an SS different depending on the RB aggregation level. The terminal 102 then performs blind decoding using a predetermined combination of RBs in the SS that is different depending on the RB aggregation level. In other words, the terminal 102 performs blind decoding on each X-PDCCH candidate in the SS different depending on the RB aggregation level (monitors the X-PDCCH).

In a case that the base station 101 notifies the terminal 102 of the control signal using the second control channel, the base station 101 configures the monitoring of the second control channel with the terminal 102, and maps the control signal for the terminal 102 to the second control channel. In a case that the base station 101 notifies the terminal 102 of the control signal in the first control channel, the base station 101 does not configure the monitoring of the second control channel with the terminal 102, but maps the control signal for the terminal 102 to the first control channel.

Upon configuring the monitoring of the second control channel, the terminal 102 performs blind decoding on the control signal over the second control channel directed to the terminal 102. If the base station 101 has not configured the monitoring of the second control channel, the terminal 102 does not perform blind decoding on the control signal over the second control channel directed to the base station 101.

The control signal to be mapped to the second control channel is described below. The control signal to be mapped to the second control channel is processed on each piece of control information of respective terminal 102. As on the data signal, a scramble operation, a modulation operation, a layer mapping operation, a precoding operation, and other operations are performed on the control signal. A precoding operation specific to the terminal 102 is performed on the control signal to be mapped to the second control channel along with a terminal-specific reference signal. The precoding operation is preferably performed with a precoding weight appropriate for the terminal 102. For example, the precoding operation is commonly performed on the signal in the second control channel and the terminal-specific reference signal in the same resource block.

The control signal to be mapped to the second control channel is mapped to a front slot (i.e., first slot) and a rear slot (i.e., second slot) in the subframe with the control signal inclusive of the control information different from slot to slot. Mapped to the front slot in the subframe, for example, is the control signal comprising the allocation information in the downlink shared channel of the data signal (e.g., downlink allocation information) that the base station 101 transmits to the terminal 102. Mapped to the rear slot in the subframe, for example, is the control signal comprising the allocation information in the uplink shared channel of the data signal (e.g., uplink allocation information) that the terminal 102 transmits to the base station 101. Note that the control signal comprising the uplink allocation information of the base station 101 directed to the terminal 102 may be mapped to the front slot in the subframe, and that the control signal comprising the downlink allocation information of the terminal 102 directed to the base station 101 may be mapped to the rear slot in the subframe.

Also, the data signal directed to the terminal 102 or another terminal 102 may be mapped to the front slot and/or the rear slot in the second control channel. The control signal directed to the terminal 102 or a terminal having the second control channel configured therein (comprising the terminal 102) may be mapped to the front slot and/or the rear slot in the second control channel.

The base station 101 multiplexes the control signal to be mapped to the second control channel and the terminal-specific reference signal. The terminal 102 performs a demodulation process on the control signal to be mapped to the second control channel, in accordance with the terminal-specific reference signal to be multiplexed. Some or all of the terminal-specific reference signals of antenna ports 7 through 14 are used. The control signal to be mapped to the second control channel is then MIMO transmitted using a plurality of antenna ports.

For example, the terminal-specific reference signal in the second control channel is transmitted using a predefined antenna port and scramble code. More specifically, the terminal-specific reference signal in the second control channel is generated using the predefined antenna port 7 and scramble ID.

For example, the terminal-specific reference signal in the second control channel is generated using the antenna port and scramble ID notified using RRC signaling and PDCCH signaling. More specifically, one of the antenna port 7 and the antenna port 8 is notified through the RRC signaling or the PDCCH signaling as the antenna port for the terminal-specific reference signal in the second control channel. One of the values 0 through 3 is notified through the RRC signaling or the PDCCH signaling as a scramble ID for the terminal-specific reference signal in the second control channel.

In the first embodiment, the base station 101 sets the second measurement target configuration on each terminal 102. The terminal 102 holds the first measurement target configuration and reports to the base station 101 the reception power for the cell-specific reference signal as a measurement target specified in the first measurement target configuration and the reception power for the channel state information reference signal as a measurement target specified in the second measurement target configuration.

The following advantages are provided by implementing the embodiment. It is now assumed that the cell-specific reference signal of FIG. 2 is transmitted from only the base station 101 using the downlink 105, that the measurement target configured in the second report configuration and the second report configuration in step S403 of FIG. 4 are the channel state information reference signal of FIG. 3, and that the reference signal as the measurement target is transmitted from only the RRH 103 using the downlink 107. In such a case, the received signal power for the cell-specific reference signal as the measurement target specified in the first measurement target configuration predetermined in step S405 of FIG. 4 is measured and the received signal power for the channel state information reference signal transmitted from only the RRH 103 as the measurement target specified in the second measurement target configuration configurable by the base station 101 is measured. A path loss 1 as a downlink path loss between the base station 101 and the terminal 102 and a second path loss 2 as a downlink path loss between the RRH 103 and the terminal 102 are thus calculated.

More specifically, two types of uplink transmission power are measured while uplink transmission power to one of the base station 101 and the RRH 103 (whichever is smaller in path loss, in other words, whichever is closer to the terminal 102) is configured during uplink coordinated communication. Reported to the base station 101 in the present embodiment are the received signal power of the cell-specific reference signal as the first measurement target and the received signal power of the channel state information reference signal transmitted from only the RRH 103 as the second measurement target. During the uplink coordinated communication, the base station 101 may determine (decide) that the base station 101 is to receive the uplink signal from the terminal 102 in the uplink 106 or may determine (decide) that the RRH 103 is to receive the uplink signal from the terminal 102 using the uplink 108. In response to the determination, the base station 101 configures the parameter related to the uplink power control of FIG. 3, and thus configures which path loss, the path loss 1 or the path loss 2, to use.

It is now assumed in another example that the cell-specific reference signal of FIG. 2 is transmitted from the base station 101 and the RRH 103 using the downlink 105 and the downlink 107, that the two measurement targets configured in the second report configuration and the second report configuration in step S403 of FIG. 4 are configured, that the two measurement targets configured are the channel state information reference signal of FIG. 3, that the reference signal is transmitted from only the base station 101 as one of the measurement targets using the downlink 105, and that the reference signal is transmitted from only the RRH 103 as the other of the measurement targets using the downlink 107. In such a case, the received signal power for the cell-specific reference signal as the first measurement target specified in the first measurement target configuration predetermined in step S405 of FIG. 4 is measured. The received signal power for the channel state information reference signal transmitted from only the base station 101 as one of the second measurement targets specified in the second measurement target configuration configurable by the base station 101 is measured. The received signal power for the channel state information reference signal transmitted from only the RRH 103 as one of the second measurement targets is measured. Calculated as a result are the path loss 1 as a combined value of the downlink path loss between the base station 101 and the terminal 102 and the downlink path loss between the RRH 103 and the terminal 102 and the path loss 2 comprising the downlink path loss between the base station 101 and the terminal 102 and the downlink path loss between the RRH 103 and the terminal 102.

More specifically, two types of uplink transmission power are set by the terminal 102 while uplink transmission power to one of the base station 101 and the RRH 103 (whichever is smaller in path loss, in other words, whichever is closer to the terminal 102) is set during uplink coordinated communication. Reported to the base station 101 in the present embodiment are the received signal power for the cell-specific reference signal as the first measurement target, the received signal power for the channel state information reference signal transmitted from only the base station 101 as the second measurement target, and the received signal power for the channel state information reference signal transmitted from only the RRH 103 as the other of the second measurement targets. During the uplink coordinated communication, the base station 101 may determine that the base station 101 is to receive the uplink signal from the terminal 102 in the uplink 106 or may determine that the RRH 103 is to receive the uplink signal from the terminal 102 using the uplink 108. In response to the determination, the base station 101 configures the parameter related to the uplink power control of FIG. 3, and thus configures which path loss, the path loss 1, the two path losses 2, to use. In the present embodiment, the terminal 102 may perform transmission power control appropriate for the uplink coordinated communication by calculating the uplink transmission power using the path loss 1 that is a combination of the path loss between the base station 101 and the terminal 102, and the path loss between the RRH 103 and the terminal 102. The terminal 102 may perform the transmission power control appropriate for the communication between the base station 101 and the terminal 102 by calculating the uplink transmission power using the path loss 2 based on the second measurement target between the base station 101 and the terminal 102.

The terminal 102 may perform the transmission power control appropriate for the communication between the RRH 103 and the terminal 102 by calculating the uplink transmission power using the path loss 2 based on the second measurement target between the RRH 103 and the terminal 102. In this way, the use of both the first measurement target configuration predetermined and the second measurement target configuration configurable by the base station 101 allows the appropriate uplink power control to be performed regardless of the configuration of the reference signal by the base station 101 and the RRH 103 (in a case that the cell-specific reference signal is transmitted from only the base station 101 or in a case that the cell-specific reference signal is transmitted from both the base station 101 and the RRH 103). In the present embodiment, the reporting of the received signal power of the cell-specific reference signal specified in the first measurement target configuration and the received signal power of the channel state information reference signal specified in the second measurement target configuration helps the base station 101 to learn the positional relationship of the base station 101, the RRH 103, and the terminal 102 (in other words, expected reception power and path loss), and this leads to a benefit even during the downlink coordinated communication. For example, if the signal to be received by the terminal 102 is appropriately selected and transmitted from the base station 101, the RRH 103, or both the base station 101 and the RRH 103 using the downlink 105 and the uplink 106, an unnecessary signal transmission is suppressed, leading an increase in the throughput of the whole system.

Second Embodiment

A second embodiment of the present invention is described below. Described with reference to the present embodiment are a parameter configuration (referred to as a parameter set) for a channel state information reference signal, second measurement target and second report configurations and third measurement target and third report configurations in step S403 of FIG. 4, and one or more parameters of a first measurement report and second measurement report in step S407 of FIG. 4. Also described in detail herein are a first reference signal configuration to perform a CSI feedback, a second reference signal configuration to configure a resource element that is to be excluded as a process target in the demodulation of data during data demodulation, and a third reference signal configuration to configure a measurement target to calculate received signal power.

Figure 8:
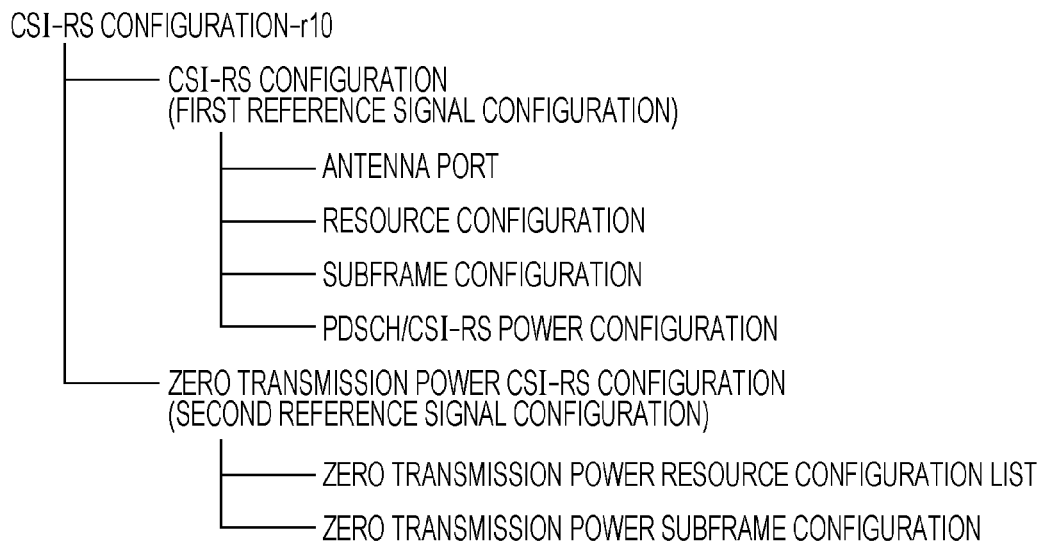
FIG. 8 illustrates in detail a reference signal configuration for channel state measurement.

FIG. 8 illustrates in detail parameters related to the first reference signal configuration and the second reference signal configuration as details of the channel state information reference signal. CSI-RS configuration-r10 (CSI-RS-Config-r10) comprises CSI-RS configuration, namely, the first reference signal configuration (csi-RS-r10) and zero transmission power CSI-RS configuration, namely, the second reference signal configuration (zeroTxPowerCSI-RS-r10). The CSI-RS configuration comprises an antenna port (antennaPortsCount-r10), resource configuration (resourceConfig-r10), subframe configuration (subframeConfig-r10), and PDSCH/CSI-RS power configuration (p-C-r10).

The antenna port count (i.e., the number of antenna ports) ensured by the CSI-RS configuration is configured in the antenna port (antennaPortsCount-r10). In one example, one of the values 1, 2, 4 and 8 is selected in the antenna port (antennaPortsCount-r10). The resource configuration (resourceConfig-r10) comprises an index that indicates a location of a front resource element (a minimum block delineated by frequency (subcarrier) and time (OFDM symbol) of FIG. 2 and FIG. 3) in the antenna port 15 (CSI port 1). In this way, the resource element of the channel state information reference signal assigned to each antenna port is uniquely determined. There is more on this later.

The subframe configuration (subframeConfig-r10) comprises indexes that indicate the location and period of a subframe comprising the channel state information reference signal. For example, if an index of the subframe configuration (subframeConfig-r10) is 5, the channel state information reference signal is transmitted every 10 subframes, and in a radio frame having 10 subframes as a unit, the channel state information reference signal is transmitted in a subframe 0. In another example, if an index of the subframe configuration (subframeConfig-r10) is 1, the channel state information reference signal is transmitted every 5 subframes, and in a radio frame having 10 subframes as a unit, the channel state information reference signal is transmitted in a subframe 1 and a subframe 6. As described above, the subframe configuration uniquely specifies the period and the location of the subframe transmitting the channel state information reference signal.

The PDSCH/CSI-RS power configuration (p-C-r10) is a power ratio of the PDSCH signal to the channel state information reference signal (CSI-RS) (ratio of EPRE (Energy Per Resource Element), and may be configured in a range from −8 to 15 dB. The base station 101 notifies the terminal 102 of cell-specific reference signal transmission power (referenceSignalPower), $P_A$ and $P_B$ separately, using an RRC signal, though this is not illustrated herein. $P_A$ here is an index representing a power ratio of the PDSCH to the cell-specific reference signal in the subframe where no cell-specific reference signal is present, and $P_B$ here is an index representing a power ratio of the PDSCH to the cell-specific reference signal in the subframe where a cell-specific reference signal is present. The terminal 102 may calculate the transmission power for the channel state information reference signal by combining the PDSCH/CSI-RS power configuration (p-C-r10), the cell-specific reference signal transmission power (referenceSignalPower), and $P_A$.

An example of the resource configuration (resourceConfig-r10) is described below. The resource configuration (resourceConfig-r10) comprises an index representing the location of a resource assigned to the CSI-RS of each antenna port. For example, if an index 0 is configured in the resource configuration (resourceConfig-r10), a front resource element of the antenna port 15 (CSI port 1) is configured as a subcarrier number 9 and a subframe number 5. Since C1 is assigned to the antenna port 15 as illustrated in FIG. 3, the resource element of the subcarrier number 9 and the subframe number 6 is configured as the channel state information reference signal of the antenna port 15 (CSI port 1).

The resource element of each antenna port is thus reserved based on this configuration. Similarly, assigned to 16 (CSI port 2) are the resource element of the subcarrier number 9 and the subframe number 5, and the resource element of the subcarrier number 9 and the subframe number 6. Similarly, assigned to antenna ports 17 and 18 (CSI ports 3 and 4) are the resource elements of the subcarrier number 3 and the subframe number 5, and the resource element of the subcarrier number 3 and the subframe number 6. Similarly, assigned to antenna ports 19 and 20 (CSI ports 5 and 6) are the resource element of the subcarrier number 8 and the subframe number 5, and the resource element of the subcarrier number 8 and the subframe number 6. Similarly, assigned to antenna ports 21 and 22 (CSI ports 7 and 8) are the resource element of the subcarrier number 2 and the subframe number 5, and the resource element of the subcarrier number 2 and the subframe number 6. If another index is specified in the resource configuration (resourceConfig-r10), the front resource element of the antenna port 15 (CSI port 1) becomes different, and the resource element assigned to each antenna port becomes different accordingly.

The zero transmission power CSI-RS configuration (second reference signal configuration) comprises a zero transmission power resource configuration list (zeroTxPowerResourceConfigList-r10) and a zero power subframe (zeroTxPowerSubframeConfig-r10) configuration. One or more indexes comprised in the resource configuration (resourceConfig-r10) are specified by bitmap in the zero transmission power resource configuration list. As described previously, in the zero transmission power subframe configuration, the location and period of the subframe comprising the channel state information reference signal are indicated by indexes. The appropriate configuration of the zero transmission power resource configuration list and the zero transmission power subframe configuration specifies the resource element that is excluded as a process target in a demodulation process in a case that the terminal 102 performs demodulation on the PDSCH (the downlink shared channel, the downlink data channel, the downlink data signal, or the physical downlink shared channel) as a resource of the channel state information reference signal. As one example, the index specified by the zero transmission power resource configuration list corresponds to the resource configuration (resourceConfig-r10) with antenna ports (antennaPortsCount-r10) being four.

In other words, if the antenna ports are four, the resource configuration (resourceConfig-r10) is notified by 16 types of indexes. More specifically, the resource for the channel state information reference signal indicated by the 16 types of indexes in the zero transmission power resource configuration list is notified by a 16-bit bitmap in the zero transmission power resource configuration list. For example, if the indexes 0 and 2 are notified by the bitmap, the resource elements corresponding to the indexes 0 and 2 are excluded as a process target in the demodulation process during demodulation.

The detail of a parameter related to the second measurement target configuration in step S403 of FIG. 4 is described with reference to FIG. 9. The reference signal measurement configuration of FIG. 9, namely, the third reference signal configuration or the second measurement target configuration, comprises a reference signal measurement configuration—addition or modification list and a reference signal measurement configuration—removal list. The reference signal measurement configuration—addition or modification list comprises a CSI-RS measurement index and a CSI-RS measurement configuration. The reference signal measurement configuration—removal list comprises a CSI-RS measurement index. The CSI-RS measurement index and the CSI-RS measurement configuration are configured in combination, and one or more combinations are configured in the reference signal measurement configuration—addition or modification list. The CSI-RS measurement configuration thus configured becomes a measurement target. The CSI-RS measurement index is an index that is related to the CSI-RS measurement configuration, and that discriminates between a plurality of measurement targets configured in the third reference signal configuration. In accordance with the CSI-RS measurement index, a measurement target is removed in the reference signal measurement configuration—removal list, and in a measurement report described below, the measurement report is related to the measurement target specified by the index. The CSI-RS measurement configuration is described below with reference to FIG. 11 and FIG. 12.

Figure 10:
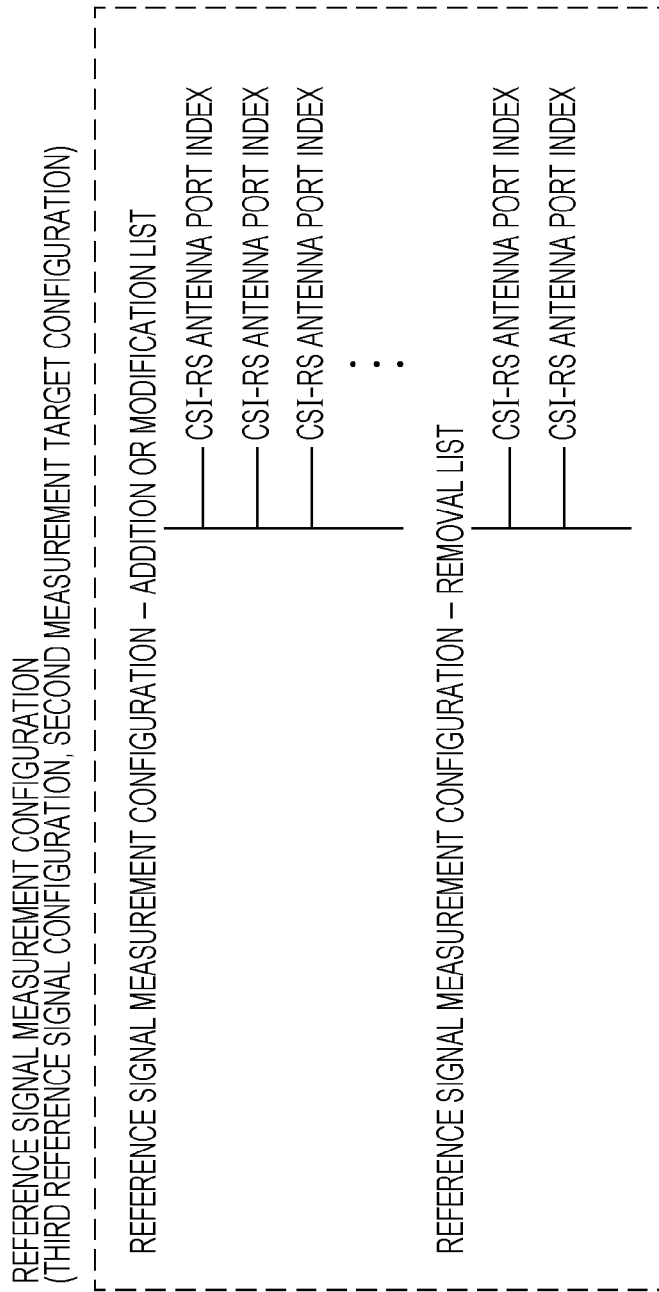
FIG. 10 illustrates in detail another example of the parameter related to the second measurement target configuration in step S403 of FIG. 4.

In another example as illustrated in FIG. 10, a CSI-RS antenna port index only may be configured in the reference signal measurement configuration—addition or modification list and the reference signal measurement configuration—removal list. The CSI-RS antenna port index is an index that is related to an antenna port number (antenna ports 15 through 22) of the channel state information reference signal of FIG. 3. The CSI-RS antenna port index configured in the third reference signal configuration of FIG. 10 may be part of the channel state information reference signal configured in the first reference signal configuration of FIG. 8 or may not be comprised in the channel state information reference signal configured in the first reference signal configuration. The CSI-RS antenna port index configured in the third reference signal configuration may not comprised in the channel state information reference signal configured in the first reference signal configuration. In such a case, an object in the third reference signal configuration is the channel state information reference signal in a case that the CSI-RS antenna port index configured in the third reference signal configuration is comprised in the channel state information reference signal configured in the first reference signal configuration.

Figure 9:
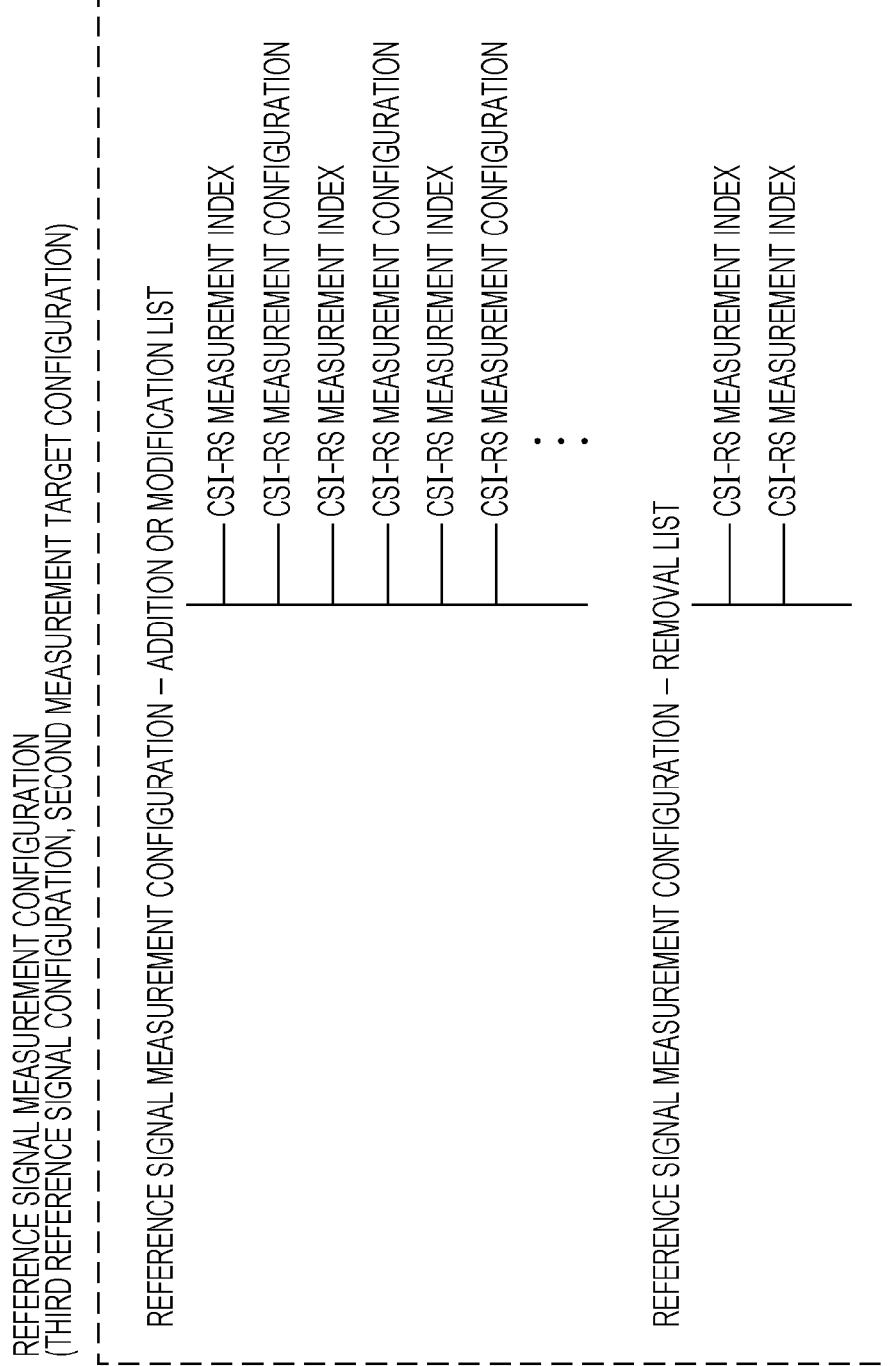
FIG. 9 illustrates in detail an example of a parameter related to a second measurement target configuration in step S403 of FIG. 4.
Figure 11:
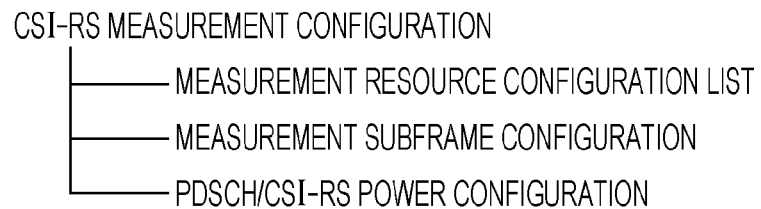
FIG. 11 illustrates in detail an example of a CSI-RS measurement configuration.

The detail of the CSI-RS measurement configuration of FIG. 9 is described with reference to FIG. 11 and FIG. 12. In one example as illustrated in FIG. 11, the CSI-RS measurement configuration may comprise a measurement resource configuration list, a measurement subframe configuration, a PDSCH/CSI-RS power configuration. Each of the measurement resource configuration list and the measurement subframe configuration may be considered to be the same configuration as the zero transmission power resource configuration list (zeroTxPowerResourceConfigList-r10) and the zero transmission power subframe (zeroTxPowerSubframeConfig-r10) configuration illustrated in FIG. 8. The PDSCH/CSI-RS power configuration may be considered to be the same configuration as the PDSCH/CSI-RS power configuration (p-C-r10) of FIG. 8.

Figure 12:
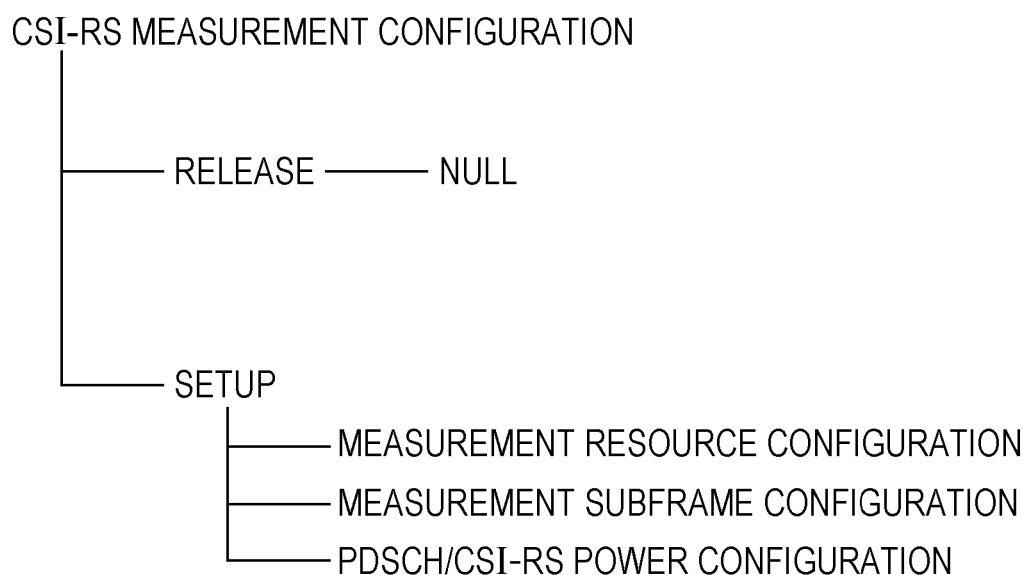
FIG. 12 illustrates in detail another example of the CSI-RS measurement configuration.

In another example, the CSI-RS measurement configuration may comprise a measurement resource configuration, a measurement subframe configuration, and a PDSCH/CSI-RS power configuration as illustrated in FIG. 12. The measurement resource configuration, the measurement subframe configuration, and the PDSCH/CSI-RS power configuration may be considered to be the similar configurations as the resource configuration (resourceConfig-r10), the subframe configuration (subframeConfig-r10), and the PDSCH/CSI-RS power configuration (p-C-r10) as illustrated in FIG. 8. The PDSCH/CSI-RS power configuration is assumed in FIG. 11 and FIG. 12. Alternatively, the CSI-RS transmission power (transmission power for channel state information reference signal) may be notified.

Figure 13:
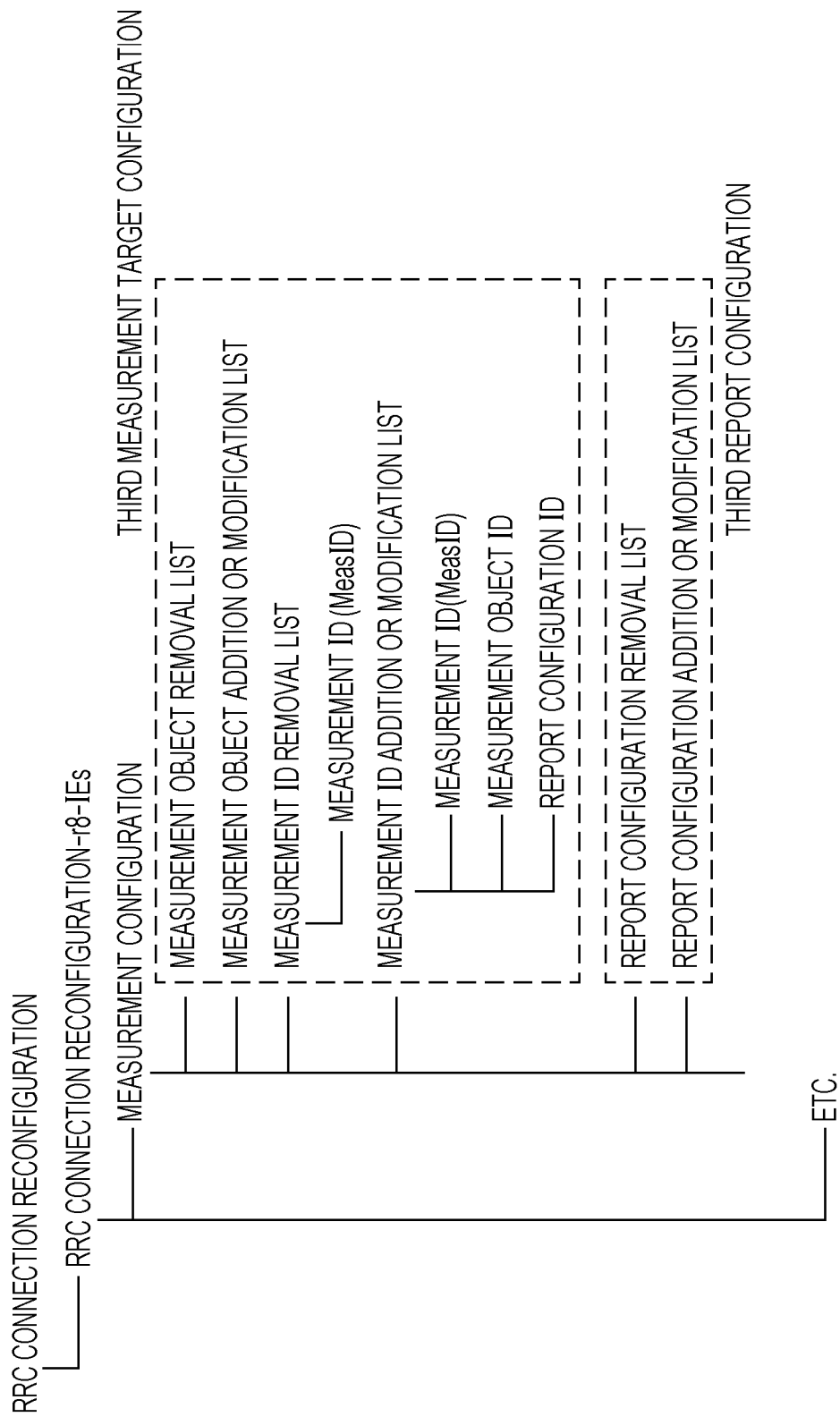
FIG. 13 illustrates in detail a third measurement target configuration and report configuration in step S403 of FIG. 4.

The detail of the third measurement target configuration and the third report configuration in step S403 of FIG. 4 are described with reference to FIG. 13. In one example, an RRC connection reconfiguration (RRCConnectionReconfiguration) comprises an RRC connection reconfiguration-r8-IEs (RRCConnectionReconfiguration-r8-IEs). The RRC connection reconfiguration-r8-IEs (RRCConnectionReconfiguration-r8-IEs) comprises a measurement configuration (MeasConfig). The measurement configuration may comprise a measurement object removal list (MeasObjectToRemoveList), a measurement object addition or modification list (MeasObjectToAddModList), a measurement ID removal list, a measurement ID addition or modification list, a report configuration removal list (ReportConfigToRemoveList), and a report configuration addition or modification list (ReportConfigToAddModList).

The third measurement target configuration in step S403 of FIG. 4 indicates a measurement object removal list, a measurement object addition or modification list, a measurement ID removal list, and a measurement ID addition or modification list. The third report configuration indicates a report configuration removal list, and a report configuration addition or modification list. The measurement ID addition or modification list may comprise a measurement ID, a measurement object ID, and a report configuration ID, and the measurement ID removal list may comprise a measurement ID. The measurement object ID is related to a measurement object to be described below, and the report configuration ID is related to a report configuration ID to be described below. As illustrated in FIG. 14, a measurement object ID and a measurement object are selectable in the measurement object addition or modification list. Selectable as the measurement object is a measurement object EUTRA, a measurement object UTRA, a measurement object GERAN, or a measurement object CDMA2000. In the measurement object EUTRA, the received signal power for the cell-specific reference signal transmitted from an unconnected cell (a cell with no RRC parameter configured) may be measured with the base station 101 notifying the terminal 102 of the carrier frequency (center frequency) and the like (see FIG. 15).

The third measurement target configuration and the third report configuration allow the received signal power of the cell-specific reference signal of the unconnected cell to be measured. The measurement object removal list comprises a measurement object ID, and by specifying the measurement object ID, the measurement object is removed. Since the measurement target configuration is comprised in the RRC connection reconfiguration, the measurement target is configured using the RRC signal during the reconfiguration of the RRC connection (i.e., RRC connection Reconfiguration). The RRC connection reconfiguration, and a variety of information elements and a variety of configurations comprised in the RRC connection reconfiguration may be configured on each terminal 102 using the RRC signal (e.g., dedicated signaling). The physical configuration may be configured on each terminal 102 using a certain RRC message. The RRC reconfiguration and RRC reestablishment may be configured on each terminal 102 using the RRC message.

The second measurement target configuration and the second report configuration in step S403 of FIG. 4 are described in detail with reference to FIG. 16. In one example, a dedicated physical configuration (PhysicalConfigDedicated) comprises a measurement configuration. The measurement configuration comprises a measurement object removal list, a measurement object addition or modification list, a measurement ID removal list, a measurement ID addition or modification list, a report configuration removal list, and a report configuration addition or modification list. The second measurement target configuration indicated in step S403 of FIG. 4 indicates the measurement object removal list and the measurement object addition or modification list, and may further comprise a measurement ID removal list and a measurement ID addition or modification list. The second report configuration indicates a report configuration removal list and a report configuration addition or modification list. Each of the measurement object removal list and the measurement object addition or modification list may be considered to be the same as the reference signal measurement configuration—addition or modification list and the reference signal measurement configuration—removal list of FIG. 9 or FIG. 10.

Figure 16:
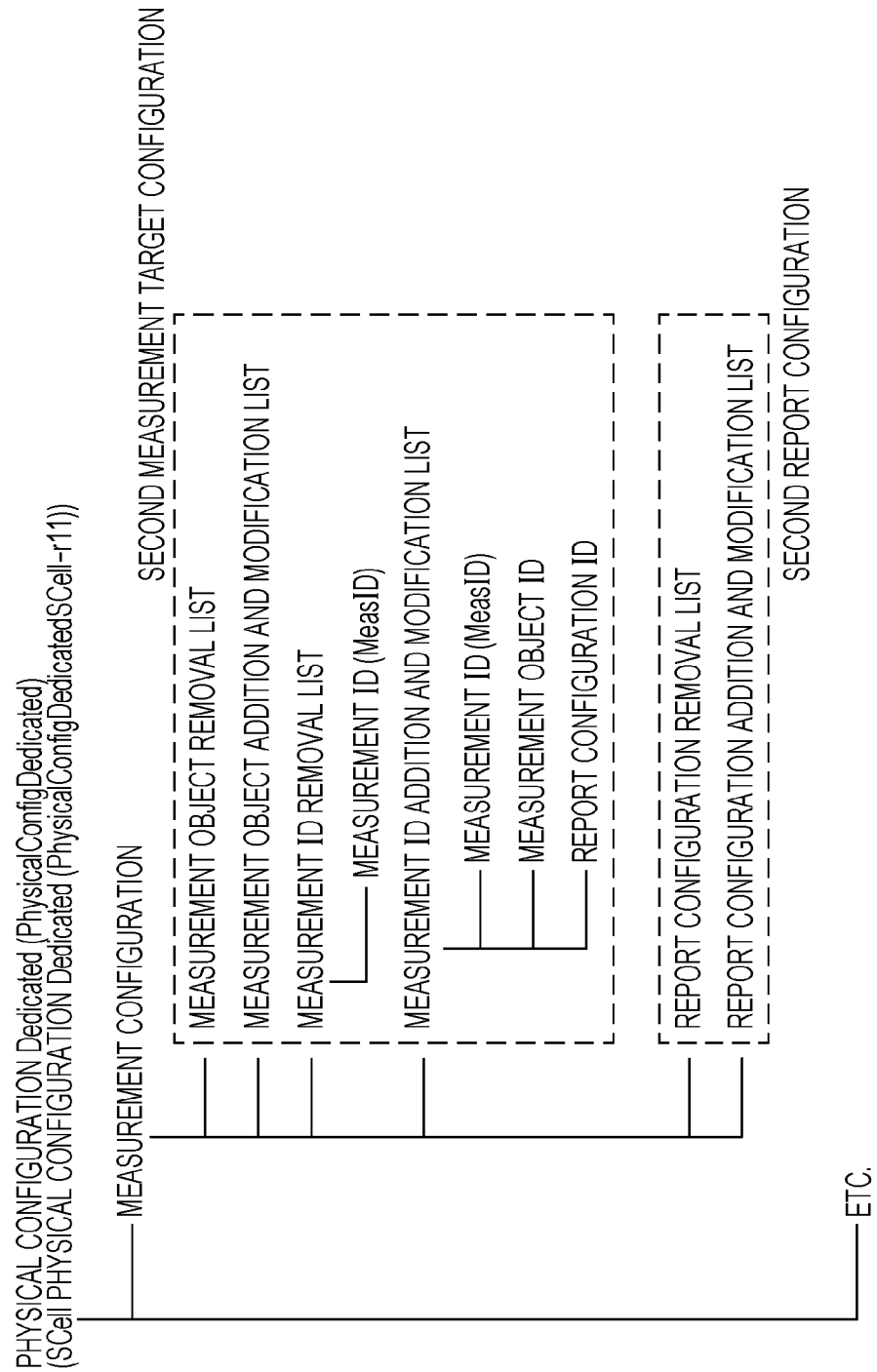
FIG. 16 illustrates in detail the second measurement target configuration and report configuration in step S403 of FIG. 4.

As illustrated in FIG. 16, the dedicated physical configuration (PhysicalConfigDedicated) of a terminal-specific physical configuration has been described. Alternatively, a dedicated physical configuration for SCell (PhysicalConfigDedicatedSCell-r11) as a terminal-specific physical configuration assigned to a secondary cell (SCell) may be used. The dedicated physical configuration is configured using the RRC signal at the reestablishment of the RRC connection (RRC Connection Reestablishment) or at the reconfiguration of the RRC connection (RRC Connection Reconfiguration). On the other hand, the dedicated physical configuration for SCell may be comprised in the SCell addition or modification list, and may be configured using the RRC signal during the addition of the SCell or modification of the configuration of the SCell. The second measurement target configuration and the second report configuration allow the received signal power of the channel state information reference signal configured in the connected cell to be measured. The measurement object addition or modification list and the measurement object removal list (the second measurement target configuration) of FIG. 16 may be the same contents as the reference signal measurement configuration—addition or modification list and the reference signal measurement configuration—removal list (the third reference signal configuration) of FIG. 9 or FIG. 10.

The measurement object addition or modification list and the measurement object removal list of FIG. 16 comprise the configuration of the third reference signal in accordance with the CSI-RS measurement configuration (see FIG. 11 and FIG. 12) identified by the CSI-RS measurement index of FIG. 9 or the configuration of the third reference signal in accordance with the CSI-RS antenna port index of FIG. 10. As illustrated in FIG. 16, the second measurement target configuration is assumed to be comprised in the dedicated physical configuration (PhysicalConfigDedicated) or a dedicated physical configuration for SCell (PhysicalConfigDedicatedSCell-r11) as a terminal-specific physical configuration assigned to the secondary cell (SCell), but the second measurement target configuration may be comprised in the CSI-RS configuration-r10 of FIG. 8. In another example, the second measurement target configuration is assumed to be comprised. The second measurement target configuration may be comprised in the measurement configuration of FIG. 13. The physical configuration may be configured on each terminal using the RRC signal (e.g., dedicated signaling).

The detail of the second report configuration of FIG. 16 is described with reference to FIG. 17. In one example, a report configuration ID and a report configuration in combination are comprised in the report configuration—addition or modification list. The report configuration ID is comprised in a report configuration—removal list. One or more combinations of report configuration ID and report configuration may be comprised in the report configuration—addition or modification list. One or more report configuration IDs may be comprised in the report configuration—removal list. As with reference to FIG. 17, the report configuration addition or modification list of FIG. 13 also comprises one or more combinations of report configuration ID and report configuration. The contents of the report configuration are identical to the report configuration. As with reference to FIG. 17, the report configuration removal list of FIG. 13 comprises one or more report configuration IDs.

Figure 17:
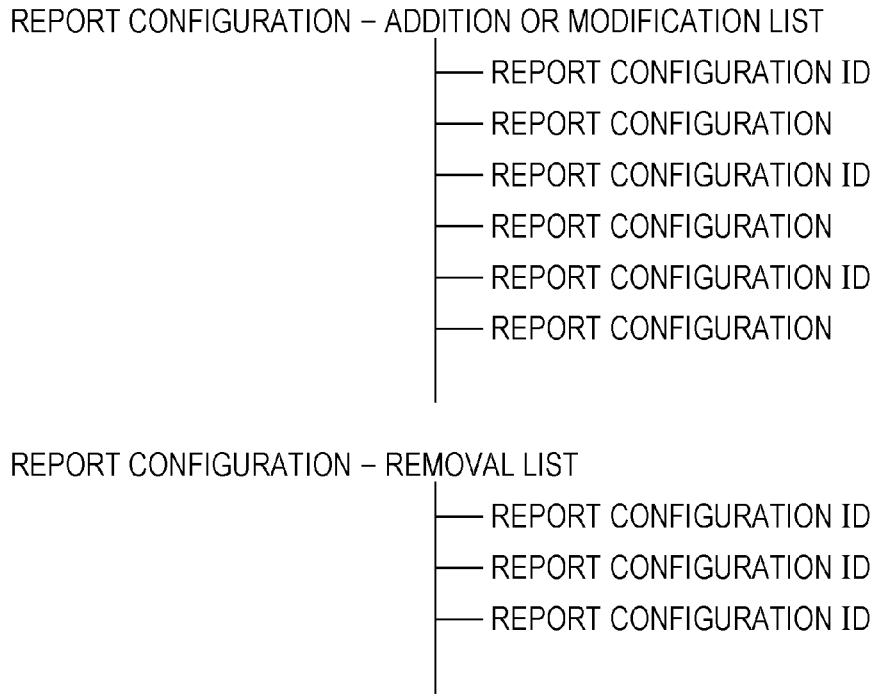
FIG. 17 illustrates in detail a second report configuration.
Figure 18:
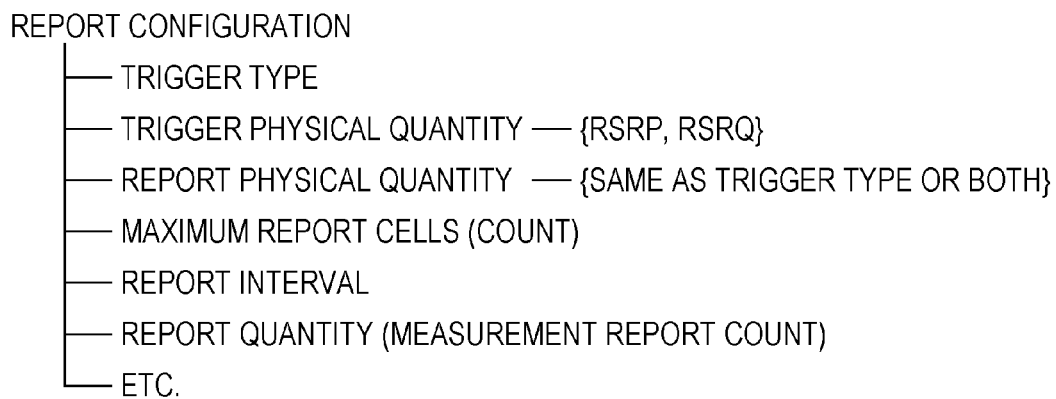
FIG. 18 illustrates an example of the report configuration.

The report configuration of FIG. 17 is described with reference to FIG. 18. In one example, the report configuration comprises a trigger type. Configured in the trigger type is information comprising a threshold according to which an event is to be reported, and report intervals.

Figure 19:
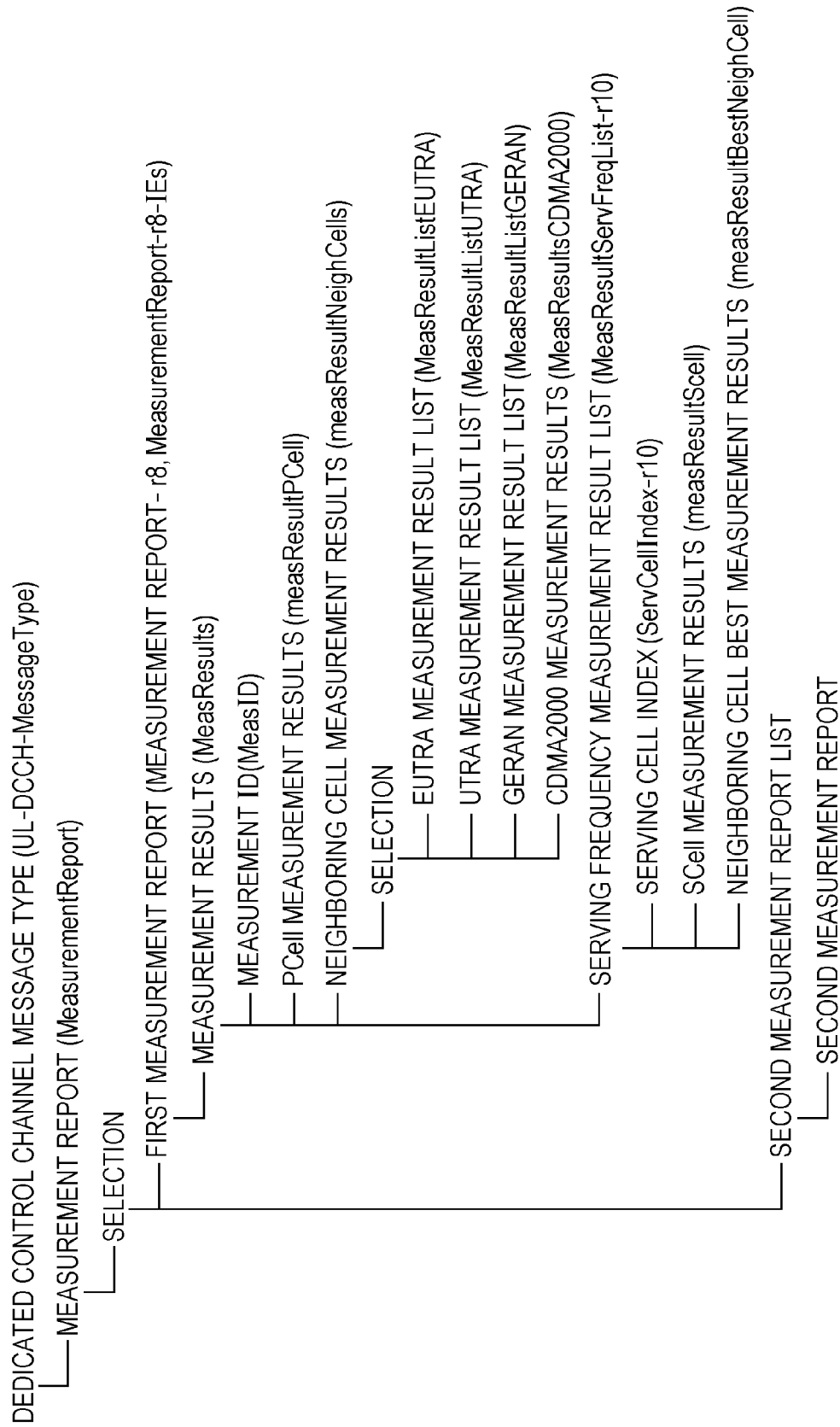
FIG. 19 illustrates in detail a measurement report.

Referring to FIG. 19, a first measurement report and a second measurement report list are described as a configuration of the first measurement report and the second measurement report in step S407 of FIG. 4. A dedicated control channel message type described with reference to FIG. 19 (UL-DCCH-MessageType) is one of the RRC messages transmitted from the terminal 102 to the base station 101. The dedicated control channel message type comprises at least a measurement report (MeasurementReport). A report comprised in the measurement report is selectable. At least a first measurement report (measurement report-r8, MeasurementReport-r8-IEs) and a second measurement report are selectable. The first measurement report comprises measurement results (MeasResults), and the measurement results comprise a measurement ID (MeasID), a PCell measurement result (measResultPCell), a neighboring cell measurement result (measResultNeighCells), and a serving frequency measurement result list.

Selectable as the neighboring cell measurement result are an EUTRA measurement result list (MeasResultListEUTRA), an UTRA measurement result list (MeasResultListUTRA), a GERAN measurement result list (MeasResultListGERAN), or a CDMA2000 measurement result list (MeasResultsCDMA2000). The serving frequency measurement result list may comprise a serving cell index, an SCell measurement result, and a neighboring cell best measurement result. It is assumed that the first measurement report and the second measurement report list are juxtaposed to be selected as illustrated in FIG. 19. Alternatively, the measurement result of the first measurement report may comprise the second measurement report.

Figure 20:
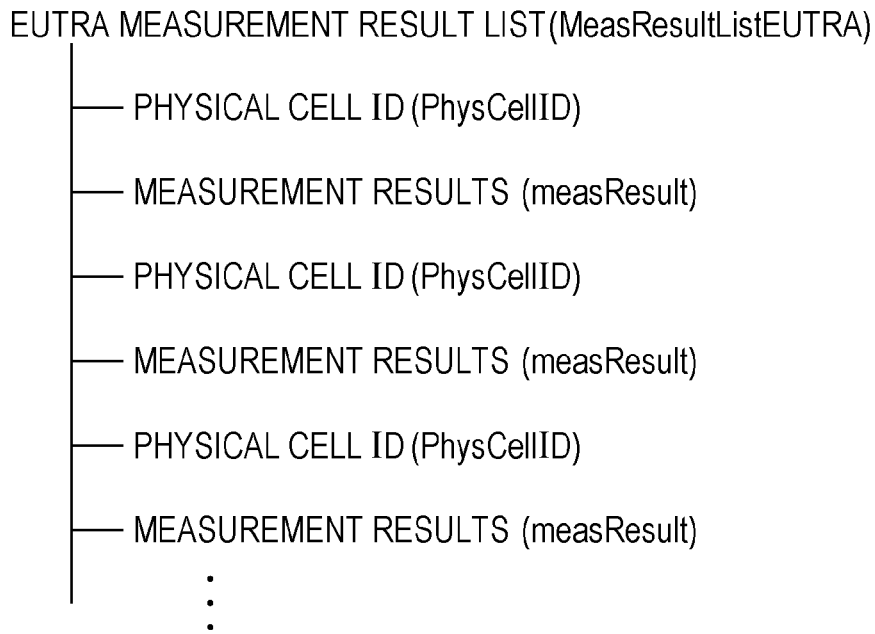
FIG. 20 illustrates in detail an EUTRA measurement result list.

The detail of the EUTRA measurement result list of FIG. 19 is described with reference to FIG. 20. The EUTRA measurement result list comprises a physical cell ID (PhysCellID) and a measurement result (measResult). By combining the physical cell ID and the measurement result, the terminal 102 may notify the base station 101 of the neighboring cell from which measurement information has derived. The EUTRA measurement result list may comprise one or more physical cell IDs and one or more measurement results. The PCell measurement result and the serving frequency measurement result list as illustrated in FIG. 19 are the measurement results for the measurement target specified by the first measurement target configuration. The measurement results comprised in the EUTRA measurement result list of FIG. 20 are the results of the measurement of the measurement target specified by the third measurement target configuration of FIG. 13. The measurement ID of FIG. 19 indicates the measurement ID of FIG. 13, and in this way, the measurement result may be related to the measurement object comprised in the third measurement target configuration and the measurement report configuration comprised in the third report configuration.

The relationship between the measurement report and the first through third measurement target configuration is described below. Using the PCell measurement result and the SCell measurement result comprised in the first measurement report, the terminal 102 may report to the base station 101 the received signal power for the cell-specific reference signal for the PCell at the antenna port 0, and the received signal power for the cell-specific reference signal for the SCell at the antenna port 0. These are the measurement targets specified in the first measurement target configuration. On the other hand, the terminal 102 may report to the base station 101 the received signal power for the cell-specific reference signal of the neighboring cell at the antenna port 0, using the physical cell ID and the measurement result comprised in the EUTRA measurement result list. These are measurement targets specified in the third measurement target configuration. More specifically, using the first measurement report and the third measurement target configuration, the terminal 102 may report to the base station 101 the received signal power for the cell-specific reference signal of the unconnected cell at the antenna port 0 (the cell with no RRC parameter configured or neighboring cell). Using the first measurement report, the terminal 102 reports to the base station 101 the received signal power at the antenna port 0 for the cell-specific reference signal of each cell (the primary cell, the secondary cell, or the neighboring cell).

Figure 21:
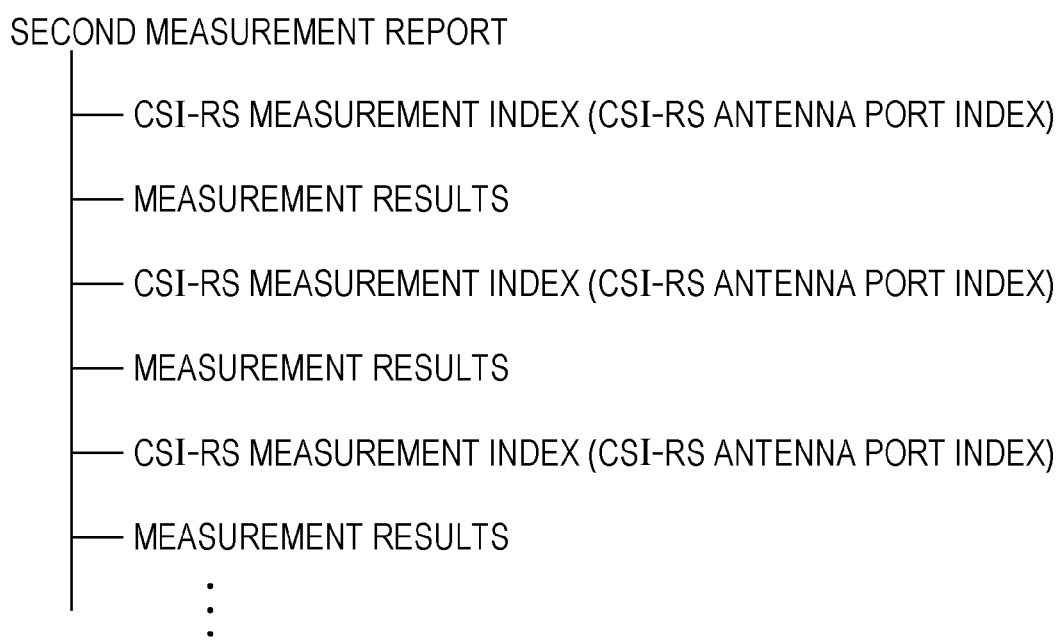
FIG. 21 illustrates in detail a second measurement report.

Referring to FIG. 21, the detail of the second measurement report list of FIG. 19 is described. A CSI-RS measurement index and a measurement result are comprised in the second measurement report in the second measurement report list. A CSI-RS antenna port index may be comprised in place of the CSI-RS measurement index. The CSI-RS measurement index and the CSI-RS antenna port index herein indicate the CSI-RS measurement index and the CSI-RS antenna port index described with reference to FIG. 9 and FIG. 10. The terminal 102 may thus report to the base station 101 the received signal power for the measurement target configured in the third reference signal configuration using the measurement results of the second measurement report. For example, if the antenna port 15 is specified for the channel state information reference signal by the third reference signal configuration, the terminal 102 may report to the base station 101 the received signal power at the antenna port 15 for the channel state information reference signal.

More specifically, using the second measurement report, the terminal 102 may report to the base station 101 the received signal power of the channel state information reference signal (the channel state information reference signal at the antenna port 15) configured in the connected cell (the primary cell or the secondary cell). The second measurement report of FIG. 21 may comprise an index, indicating a particular cell (carrier component), such as the serving cell index, though the index is not illustrated. In such a case, by combining the serving cell index, the CSI-RS measurement index, and the measurement results, the terminal 102 may report to the base station 101 the results of measurement of the channel state information reference signal in terms of which channel state information reference signal is derived from which cell.

In the second embodiment, the base station 101 configures each terminal 102 for the second measurement target configuration that is intended to measure only the channel state information reference signal configured by the base station 101. The base station 101 configures the terminal 102 for the third measurement target configuration that is intended to measure the cell-specific reference signal generated using a physical ID different from the physical ID of the connected cell. The terminal 102 reports to the base station the received signal of the reference signal as the measurement target specified in the second measurement target configuration and the received signal of the reference signal as the measurement target specified in the third measurement target configuration.

In accordance with the second embodiment, the base station 101 configures each terminal 102 for the first reference signal configuration that is intended to configure the measurement target for channel state reporting, for the second reference signal configuration that specifies the resource element that the terminal 102 excludes as a process target in the demodulation process of data during the data demodulation, and for the third reference signal configuration that configures the measurement target on which the terminal 102 measures the reception power for the reference signal. The terminal 102 receives the information configured by the base station 101, reports to the base station 101 the channel state in accordance with the first reference signal configuration, determines in accordance with the second reference signal configuration the resource element that is to be excluded as a process target in the demodulation process of data during the data demodulation, demodulates the data, and measures the reception power of the reference signal in accordance with the third reference signal configuration.

In accordance with the embodiments, the following advantages are provided. It is assumed that the cell-specific reference signal of FIG. 2 and the channel state information reference signal of FIG. 3 are transmitted only from the base station 101 at the antenna ports 15, 16, 17, and 18 using the downlink 105, that the antenna port 19 for the channel state information reference signal of FIG. 3 is the measurement target configured in the second measurement target configuration and the second report configuration in step S403 of FIG. 4, namely, the measurement target configured in the third reference signal configuration of FIG. 9, and that the channel state information reference signal as the measurement target has been transmitted from only the RRH 103 using the downlink 107. In such a case, the path loss 1 as the downlink path loss between the base station 101 and the terminal 102 and the path loss 2 as the downlink path loss between the RRH 103 and the terminal 102 may be calculated by measuring the received signal power for the cell-specific reference signal as the first measurement target, and the received signal power for the channel state information reference signal transmitted from only the RRH 103 as the second measurement target in step S405 of FIG. 4.

Notified in response to the first reference signal configuration performed at the antenna ports 15, 16, 17, and 18 are Rank information (RI: Rank Indicator), precoding information (PMI: Precoding Matrix Indicator), channel quality information (CQI: Channel Quality Indicator). These pieces of information are used in precoding of the cell-specific reference signal and the data signal and the modulation coding scheme (MCS) of the data signal. On the other hand, only the measurement and reporting of the received signal power are performed with respect to the antenna port 19 for the channel state information reference signal as the measurement target configured in the third reference signal configuration. The antenna port (or the measurement target) at which only the reception power (and the path loss) is measured is separately configured from the antenna port through which communications are performed in the downlink in the communication system. For example, in comparison with the reference signal corresponding to the antenna port performing communications in the downlink, the base station 101 may reduce the frequency of transmission occurrences of the reference signal corresponding to the antenna port for use in the measurement of only the reception power, and controls an increase in the system overhead related to the reference signal.

If the received signal power for the channel state information reference signal at the antenna port 19 increases (more specifically, the path loss between the RRH 103 and the terminal decreases), the base station 101 may reconfigure the channel state information reference signal configured using the first reference signal configuration to the antenna port assigned to the RRH 103, and may thus always transmit an downlink signal via an appropriate transmit point (from the base station 101 or the RRH 103). From another viewpoint, the antenna ports 15, 16, 17, and 18 for the channel state information reference signal configured in the first reference signal configuration may be used to transmit the downlink signal while the path loss determined from the antenna port 19 for the channel state information reference signal configured in the third reference signal configuration may be used to transmit an uplink signal. This arrangement allows the terminal 102 to receive the downlink signal in the downlink 105 from the base station 101 while allowing the terminal 102 to transmit the uplink signal to the RRH 103 in the uplink 108. The communication system thus sets the first reference signal configuration to configure the measurement target to calculate CSI feedback comprising at least one of CQI, PMI, and RI, and sets the third reference signal configuration to configure the measurement target to calculate the received signal power, and creates a state in which at least part of the resources configured in the third reference signal configuration are not comprised in the resources configured in the first reference signal configuration. As a result, a flexible communication system design is thus implemented in which communication destinations of the downlink signal and the uplink signal are changed.

It is assumed in another viewpoint that the cell-specific reference signal of FIG. 2 is transmitted only from the base station 101 using the downlink 105, that the second measurement target configuration in step S403 of FIG. 4 and the measurement target configured in the second report configuration is the channel state information reference signal of FIG. 3, and that the channel state information reference signal as the measurement target has been transmitted from only the RRH 103 using the downlink 107. The base station 101 and the RRH 103 perform the carrier aggregation, and perform communications using two carrier components (CCs, Cells) in the downlink and the uplink having different center frequencies. These are called a first carrier component and a second carrier component. The base station 101 and the RRH 103 may thus perform individual communications and coordinated communications using these carrier components.

In such a case, the terminal 102 establishes a connection with the base station 101 using the first carrier component. At the same time, the terminal 102 measures the measurement target on the basis of one or more parameters related to a predetermined first measurement. The measurement target is then the antenna port 0 for the cell-specific reference signal of the connected cell. At the same time, the terminal 102 configures parameters related to the third measurement and the third report, thereby measuring the measurement target. The measurement target then is the antenna port 0 for the cell-specific reference signal of the unconnected cell. The terminal 102 then reports to the base station 101 the first measurement report of FIG. 19 in step S407 of FIG. 4. More specifically, the terminal 102 reports to the base station 101 using the first measurement report the reception power at the antenna port 0 for the cell-specific reference signal of the connected cell and the reception power at the antenna port 0 for the cell-specific reference signal of the unconnected cell. On the other hand, after the connection of the first carrier component (primary cell), the second measurement configuration may be individually set for the first carrier component using the physical configuration dedicated. The second measurement configuration may be set for the second carrier component at the addition of the second carrier component (secondary cell) (the SCell physical configuration dedicated configuration).

By performing the third measurement target configuration, the terminal 102 measures the antenna port 0 for the cell-specific reference signal of the unconnected cell and reports the measurement result to the base station 101. By performing the second measurement configuration and the second measurement report, the terminal 102 measures the antenna port configured in the channel state information reference signal of only the connected cell, and reports the measurement result to the base station 101 using the second measurement report. Each of the terminal 102 and the base station 101 may search for an appropriate base station 101 and cell using only the third measurement target configuration, the third report configuration and the first measurement report, and may search for an appropriate transmit point (such as the base station 101 or the RRH 103) and measure the path loss in accordance with first measurement target configuration and second measurement target configuration. The connected cell herein refers to a cell with a parameter configured by the RRC signal, in other words, a primary cell (first carrier component) or a secondary cell (second carrier component), and the unconnected cell refers to a cell with no parameter configured by the RRC signal, in other words, a neighboring cell.

Third Embodiment

A third embodiment is described below. In connection with the third embodiment, the process of step S408 and step S409 of FIG. 4 is described. In particular, the process of the communication system with a plurality of parameters related to uplink power control configured is described in detail. A path loss (first path loss) is configured in accordance with information related to the first measurement target configuration and information related to one or more parameters of the uplink power control, and first uplink transmission power is configured in accordance with information related to the first path loss and the configuration of the parameter of the uplink power control. The terminal 102 configures a path loss (second path loss) in accordance with information related to the second measurement target configuration and the information related to the configuration of the parameter of the uplink power control, and configures second uplink transmission power in accordance with the second path loss and the information related to the configuration of the parameter of the uplink power control. More specifically, implicitly configured are the information of the first measurement target configuration, the information of the second measurement target configuration, the first uplink transmission power, and the second uplink transmission power.

A calculation method of the uplink transmission power is described. The terminal 102 determines the uplink transmission power for PUSCH transmission in a subframe i of a serving cell c from Equation (1).

[Equation 1]

$$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \alpha_c(j) \cdot PL_c + \Delta_{TF,c}(i) + f_c(i)\end{array}\right\} \quad (1)$$

$P_{CMAX,c}$ represents maximum transmission power at the serving cell c. $M_{PUSCH,c}$ represents a transmission bandwidth of the serving cell c (the number of resource blocks in the frequency domain). $P_{O\_PUSCH,c}$ represents PUSCH standard power of the serving cell c. $P_{O\_PUSCH,c}$ is determined by $P_{O\_NOMINAL\_PUSCH,c}$ and $P_{O\_UE\_PUSCH,c}$. $P_{O\_NOMINAL\_PUSCH,c}$ is a parameter related to cell-specific uplink power control. $P_{O\_UE\_PUSCH,c}$ is a parameter related to terminal-specific uplink power control. $\alpha$ is an attenuation coefficient (channel loss compensation coefficient) for use in fractional transmission power control of the entire cell. $PL_c$ is a path loss and is determined by the reference signal transmitted at known power and by RSRP. In accordance with the present invention, $PL_c$ may be the calculation result of the path loss determined in the first embodiment or the second embodiment. $\Delta_{TF,c}$ is determined by Equation (2).

[Equation 2]

$$\Delta_{TF,c}(i) = 10 \log_{10}((2^{BPRE \cdot K_s} - 1) \cdot \beta_{offset}^{PUSCH}) \quad (2)$$

BPRE represents a bit count assignable to the resource element. The bit count may be also referred to as the number of bits. $K_s$ is a parameter related to the uplink power control notified by the higher layer using the RRC signal, and depends on the modulation coding scheme (MCS) of the uplink signal (deltaMCS-Enabled). Also, $f_c$ is a power control adjustment state determined by accumulation-enabled as a parameter related to the uplink power control, and a TPC command comprised in the uplink grant.

The terminal 102 determines the uplink transmission power for PUCCH transmission in the subframe i in accordance with Equation (3).

[Equation 3]

$$P_{PUCCH}(i) = \min\left\{\begin{array}{l}P_{CMAX,c}(i),\\ P_{0\_PUCCH} + PL_c + h(n_{CQI}, n_{HARQ}, n_{SR}) + \Delta_{F\_PUCCH}(F) + \Delta_{TxD}(F') + g(i)\end{array}\right\} \quad (3)$$

$P_{O\_PUCCH}$ represents standard power of the PUCCH. $P_{O\_PUCCH}$ is determined by $P_{O\_NOMINAL\_PUCCH}$ and $P_{O\_UE\_PUCCH}$. $P_{O\_NOMINAL\_PUCCH}$ is a parameter related to cell-specific uplink power control. $P_{O\_UE\_PUCCH}$ is a parameter related to terminal-specific uplink power control. $n_{CQI}$ represents a bit count of CQI, $n_{HARQ}$ represents a bit count, and $n_{SR}$ represents a bit count of SR. $h(n_{CQI}, n_{HARQ}, n_{SR})$ is a parameter defined in accordance with the bit counts, namely, a PUCCH format (deltaFList-PUCCH). $\Delta_{TxD}$ is a parameter that is notified by the higher layer in a case that transmission diversity is configured. g is a parameter for use in adjusting the power control of the PUCCH.

The terminal 102 determines the uplink transmission power for the SRS transmission in subframe i in accordance with Equation (4).

[Equation 4]

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \quad (4)$$

$P_{SRS\_OFFSET}$ is a power offset to adjust the transmission power of the SRS, and is comprised in the uplink power control parameter (the configuration of the parameter related to the terminal-specific uplink power control). $M_{SRS,c}$ represents a bandwidth (the number of the resource block in the frequency domain) of the SRS allocated for the serving cell c.

FIG. 22 illustrates an example of an information element comprised in the configuration of the parameter related to (first) uplink power control (UplinkPowerControl). The parameter configuration related to the uplink power control comprises a cell-specific configuration (a configuration of one or more parameters related to cell-specific uplink power control (UplinkPowerControlCommon)) and a terminal-specific configuration (a configuration of one or more parameters related to terminal-specific uplink power control (UpLinkControlDedicated)). UplinkPowerControlCommon is referred to as the cell-specific parameter configuration for the uplink power control. UplinkPowerControlDedicated is referred to as the terminal specific parameter configuration (referred to as the UE specific parameter configuration) for the uplink power control. The configurations comprises parameters (information elements) related to uplink power control of cell-specific configuration and of terminal specific configuration. Comprised as the cell-specific configurations are standard PUSCH power (p0-NominalPUSCH) as PUSCH power configurable in a cell-specific manner, an attenuation coefficient of fractional transmission power control (channel loss compensation coefficient) α (alpha), standard PUSCH as PUCCH power (p0-NominalPUCCH) configurable in a cell-specific manner, $\Delta_{F\_PUCCH}$ (deltaFList-PUCCH) comprised in Equation (3), and a power adjustment value (detalPreambleMsg3) applied in a case that a preamble message 3 is transmitted.

Comprised as the terminal-specific configurations are terminal-specific PUSCH power (p0-UE-PUSCH) as PUSCH power configurable in a terminal-specific manner, a parameter (deltaMCS-Enabled) related to a power adjustment value $K_s$ in the modulation coding scheme used in Equation (2), a parameter (accumulationEnabled) needed to configure a TPC command, terminal-specific PUCCH power (p0-UE-PUCCH) as PUCCH power configurable in a terminal-specific manner, a power offset $P_{SRS\_OFFSET}$ (pSRS-Offset, pSRS-OffsetAp-r10) of periodic SRS and aperiodic SRS, and a filter coefficient (filterCoefficient) of the reception power RSRP of the reference signal. These configurations may be configured in the primary cell, but may be similarly set on the secondary cell as well. The terminal-specific configuration on the secondary cell further comprises a parameter (pathlossReference-r10) that indicates the calculation of the path loss using a path loss measurement reference signal (such as the cell-specific reference signal) for the primary cell or the secondary cell.

Figure 23:
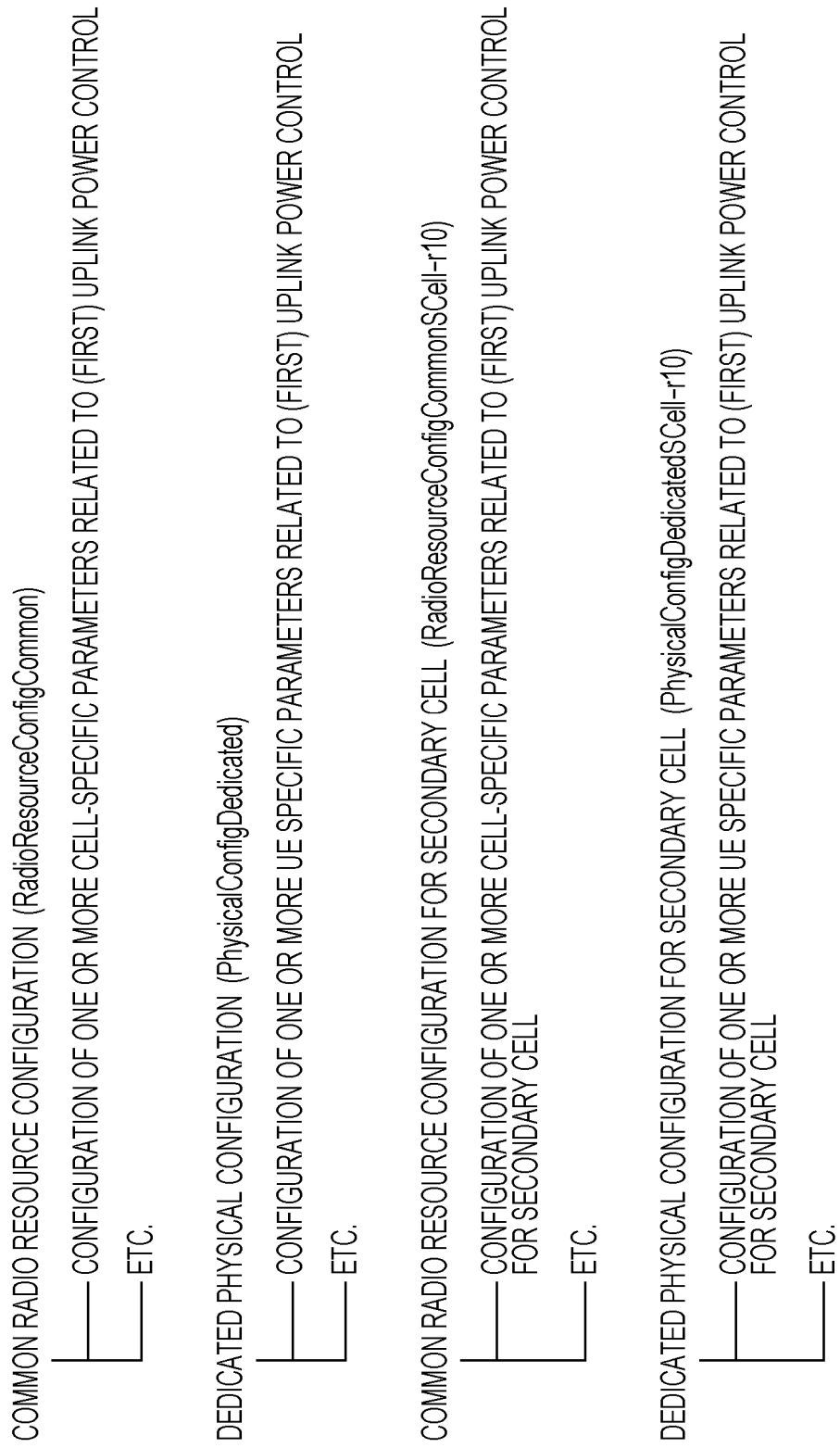
FIG. 23 illustrates in detail another example of the parameter configuration related to the uplink power control.

FIG. 23 illustrates an example of information comprising a configuration of a parameter related to the uplink power control (the configuration of the parameter related to the first uplink power control). A parameter configuration (UplinkPowerControlCommon) related to (first) cell-specific uplink power control is comprised in a cell-specific radio resource configuration (RadioResourceConfigCommon). A parameter configuration related to (first) terminal-specific uplink power control is comprised in a terminal-specific physical configuration (PhysicalConfigDedicated). A parameter configuration related to (first) cell-specific uplink power control for a secondary cell (UplinkPowerControlCommonSCell-r10-1) is comprised in a cell-specific radio resource configuration for a secondary cell (RadioResourceConfigCommonSCell-r10). A parameter configuration related to (first) terminal-specific uplink power control for a secondary cell (UplinkPowerControlDedicatedSCell-r10-1) is comprised in a terminal-specific physical configuration for a secondary cell (PhysicalConfigDedicatedSCell-r10). A (primary cell) terminal-specific physical configuration is comprised in a terminal-specific radio resource configuration for a primary cell (RadioResourceConfigDedicated). A secondary-cell terminal-specific physical configuration is comprised in a terminal-specific radio resource for a secondary cell (RadioResourceConfigDedicatedSCell-r10). The cell-specific radio resource configuration and the terminal-specific radio resource configuration may be comprised in the RRC connection reconfiguration (RRCConnectionReconfiguration) or the RRC reestablishment (RRCConnectionReestablishment) described with reference to the second embodiment.

The secondary-cell-specific radio resource configuration and the secondary-cell terminal-specific radio resource configuration may be comprised in the SCell addition or modification list described with reference to the second embodiment. The cell-specific radio resource configuration and the terminal-specific radio resource configuration may be performed on each terminal using the RRC signal (e.g., dedicated signaling). The RRC connection configuration and the RRC reestablishment may be performed on each terminal 102 using the RRC message. The configuration of the parameter related to the cell-specific uplink power control may be performed for the terminal 102 using the system information. The configuration of the parameter related to the terminal-specific uplink power control may be performed for each terminal 102 using the RRC signal (e.g., dedicated signaling).

In accordance with the third embodiment, the terminal 102 may calculate the uplink transmission power ($P_{PUSCH1}$, $P_{PUCCH1}$, and $P_{SRS1}$) of a variety of uplink signals (PUSCH, PUCCH, and SRS) in accordance with the first measurement target configuration and the second measurement target configuration described in the first embodiment and second embodiment. The variety of uplink signals also refer to a variety of uplink physical channels. The variety of uplink physical channels comprises at least one link physical channel of control information (CQI, PMI, RI, and ACK/NACK) comprised in PUSCH, PUCCH, UL DMRS, SRS, PRACH, and PUCCH.

In the third embodiment, the base station 101 notifies the terminal 102 of the first measurement target configuration, the second measurement target configuration, and the configuration of the parameter related to the uplink power control. In one example, in accordance with the notified information, the terminal 102 calculates the path loss (first path loss) based on the first measurement target configuration and the configuration of the parameter related to the uplink power control, and calculates the first uplink transmission power based on the first path loss and the configuration of the parameter related to the uplink power control. The terminal 102 also calculates the path loss (second path loss) based on the second measurement target configuration and the configuration of the parameter related to the uplink power control, and then calculates the second uplink transmission power from the second path loss and the configuration of the parameter related to the uplink power control. In other words, the first uplink transmission power may always be calculated in accordance with the measurement target notified using the first measurement target configuration, and the second uplink transmission power may always be calculated in accordance with the measurement target notified using the second measurement target configuration. More specifically, the first uplink transmission power may always be calculated based on the antenna port 0 for the cell-specific reference signal as the measurement target notified using the first measurement target configuration, and the second uplink transmission power may always be calculated based on the resource (or antenna port) specified by the channel state information reference signal as the measurement target notified using the second measurement target configuration.

If a plurality of measurement targets (such as a plurality of resources or a plurality of antenna ports specified in the channel state information reference signal) is specified in the second measurement target configuration in another example, one of the measurement targets to be used to calculate the second uplink transmission power needs to be notified. In such a case, a path loss reference resource to be described below with reference to FIG. 24 may be comprised in the configuration of the parameter related to the first-cell-specific uplink power control, the configuration of the parameter related to first-secondary cell-specific uplink transmission power, the configuration of the parameter related to first terminal-specific uplink power control, or the configuration of the parameter related to first-secondary terminal-specific uplink power control, as illustrated FIG. 22. In yet another example, the first uplink transmission power may always be calculated based on the antenna port 0 (or antenna ports 0 and 1) for the cell-specific reference signal, regardless of the first measurement target configuration. The terminal 102 may perform control as to whether the uplink signal is to be transmitted at the first uplink transmission power or at the second uplink transmission power, depending on the frequency resource or timing at which the uplink grant has been detected.

In this way, the first uplink transmission power and second uplink transmission power may be statically related to the first measurement target configuration and second measurement target configuration (and the measurement targets specified by the measurement target configurations).

More specifically, if the carrier aggregation to perform communications using a plurality of carrier components (two carrier components herein) is enabled, the first or second measurement target configuration may be related to the carrier component. In other words, the first measurement target configuration may be related to the first carrier component, and the second measurement target configuration may be related to the second carrier component. If the first carrier component is configured in the primary cell and the second carrier component is configured in the secondary cell, the first measurement target configuration may be related to the primary cell, and the second measurement target configuration may be related to the secondary cell. In other words, the base station 101 may perform the first measurement target configuration and second measurement target configuration on a per cell basis. If the uplink grant is detected from the primary cell, the terminal 102 calculates the first path loss and the first uplink transmission power based on the first measurement target configuration, the configuration of the parameter related to the primary-cell-specific uplink power control and the configuration of the parameter related to the primary-cell terminal-specific uplink power control. If the uplink grant is detected from the secondary cell, the terminal 102 calculates the second path loss and the second uplink transmission power based on the second measurement target configuration, the configuration of the parameter related to the secondary-cell-specific uplink power control and the configuration of the parameter related to the secondary-cell terminal-specific uplink power control.

From another viewpoint, let terminal A represent a terminal 102 in communication with the base station 101, and terminal B represent a terminal 102 in communication with the RRH 103. Dynamic transmission control of the uplink signal for the terminal A is performed in the primary cell only, and dynamic transmission control of the uplink signal for the terminal B is performed in the secondary cell only. More specifically, in order to cause the terminal 102 to transmit the uplink signal to the base station 101, the base station 101 notifies the terminal 102 of the uplink grant in the primary cell. In order to cause the terminal 102 to transmit the uplink signal to the RRH 103, the base station 101 notifies the terminal 102 of the uplink grant in the secondary cell. The base station 101 may perform the transmission power control on the uplink signal directed to the base station 101 or the RRH 103 using a TPC command that is a corrective value of the transmission power control for the uplink signal comprised in the uplink grant. The base station 101 configures a value of a TPC command comprised in the uplink grant for the base station 101 or the RRH 103 using the cell (the carrier component or the component carrier) that notifies the uplink grant.

To increase the uplink transmission power to the base station 101, the base station 101 configures the power corrective value of the TPC command of the primary cell to be the higher value. To decrease the uplink transmission power to the RRH 103, the base station 101 configures the power corrective value of the TPC command of the secondary cell to be the lower value. The base station 101 performs, for the terminal A, an uplink signal transmission and uplink transmission power control in the primary cell, and performs, for the terminal B, an uplink signal transmission and uplink transmission power control in the secondary cell. More specifically, the base station 101 performs inter-cell uplink transmission power control by configuring the power corrective value of the TPC command (transmission power control command) of the primary cell to be a first value and by configuring the power corrective value of the TPC command of the secondary cell to be a second value. The base station 101 may configure the first value to be higher in power corrective value than the second value. More specifically, the base station 101 may perform power control on each of the cells independently using the TPC commands.

In one example considered, a downlink subframe is divided into a first subset and a second subset. If an uplink grant is received in a subframe n (n is a natural number), the terminal 102 transmits an uplink signal in a subframe n+4. An uplink subframe is naturally divided into a first subset and a second subset. For example, if downlink subframes 0 and 5 are sorted into the first subset, and downlink subframes 1, 2, 3, 4, 6, 7, 8, and 9 are sorted into the second subset, uplink subframes 4 and 9 are naturally sorted into the first subset, and uplink subframes 1, 2, 3, 5, 6, 7, and 8 are sorted in the second subset. If a downlink subframe index having the uplink grant detected therewithin is comprised in the first subset, the terminal 102 calculates the first path loss and the first uplink transmission power based on the first measurement target configuration and the parameter configuration related to the uplink power control. If the downlink subframe index having the uplink grant detected therewithin is comprised in the second subset, the terminal 102 calculates the second path loss and the second uplink transmission power based on the second measurement target configuration and the parameter configuration related to the uplink power control. More specifically, depending on whether the downlink subframe index having the uplink grant detected therewithin is comprised in the first subset or the second subset, the terminal 102 performs control as to whether to transmit the uplink signal at the first uplink transmission power or at the second uplink transmission power.

The first subset may comprise a subframe that comprises a P-BCH (Physical Broadcast Channel), PSS (Primary Synchronization Signal), and SSS (Secondary Synchronization Signal). The second subset may comprise a subframe that does not comprise the P-BCH signal, the PSS, and the SSS.

From another viewpoint, let terminal A represent a terminal 102 in communication with the base station 101, and terminal B represent a terminal 102 in communication with the RRH 103. Dynamic transmission control of the uplink signal of the terminal A is performed in the first subframe subset only, and dynamic transmission control of the uplink signal of the terminal B is performed in the second subframe subset only. More specifically, in order to cause the terminal 102 to transmit the uplink signal to the base station 101, the base station 101 notifies the terminal 102 of the uplink grant comprised in the first subframe subset. In order to cause the terminal 102 to transmit the uplink signal to the RRH 103, the base station 101 notifies the terminal 102 of the uplink grant comprised in the second subframe subset. The base station 101 may perform the transmission power control for the uplink signal directed to the base station 101 or the RRH 103 using a TPC command that is a corrective value of the transmission power control for the uplink signal comprised in the uplink grant. The base station 101 configures for the base station 101 or the RRH 103 a TPC command value comprised in the uplink grant using the subframe subset that notifies the uplink grant.

To increase the uplink transmission power to the base station 101, the base station 101 configures the power corrective value of the TPC command in the first subframe subset to be higher. To decrease the uplink transmission power to the RRH 103, the base station 101 configures the power corrective value of the TPC command for the second subframe subset to be lower. The base station 101 performs, for the terminal A, an uplink signal transmission and uplink transmission power control in the first subframe subset, and performs, for the terminal B, an uplink signal transmission and uplink transmission power control in the second subframe subset. More specifically, the base station 101 performs inter-cell uplink transmission power control by configuring the power corrective value of the TPC command (transmission power control command) in the first subframe subset to be a first value and by configuring the power corrective value of the TPC command for the second subframe subset to be a second value. The base station 101 may configure the first value to be higher in power corrective value than the second value. More specifically, the base station 101 may perform power control on each of the cells independently using TPC commands.

In one example, if a physical downlink control channel (uplink grant) is detected in a first control channel region, the terminal 102 configures the first path loss and the first uplink transmission power on the basis of the information of the first measurement target configuration and the information of the parameter configuration related to the uplink power control. If the physical downlink control channel (uplink grant) is detected in a second control channel region, the terminal 102 calculates the second path loss and the second uplink transmission power on the basis of the information of the second measurement target configuration and the information of the parameter configuration related to the uplink power control. More specifically, the terminal 102 performs control as to whether to transmit the uplink signal at the first uplink transmission power or at the second uplink transmission power in accordance with the control channel region from which the physical downlink control channel (uplink grant) is detected.

From another viewpoint, let terminal A represent a terminal 102 in communication with the base station 101, and terminal B represent a terminal 102 in communication with the RRH 103. Dynamic transmission control of the uplink signal of the terminal A is performed in the first control channel (PDCCH) region only, and dynamic transmission control of the uplink signal of the terminal B is performed in the second control channel (X-PDCCH) region only. More specifically, in order to cause the terminal 102 to transmit the uplink signal to the base station 101, the base station 101 notifies the terminal 102 of the uplink grant comprised in the first control channel region. In order to cause the terminal 102 to transmit the uplink signal to the RRH 103, the base station 101 notifies the terminal 102 of the uplink grant comprised in the second control channel region. The base station 101 may perform the transmission power control for the uplink signal directed to the base station 101 or the RRH 103 using a TPC command that is a corrective value of the transmission power control for the uplink signal comprised in the uplink grant. The base station 101 configures for the base station 101 or the RRH 103 a TPC command value comprised in the uplink grant using the control channel region that notifies the uplink grant.

To increase the uplink transmission power to the base station 101, the base station 101 configures the power corrective value of the TPC command being transmitted in the first control channel region to be the higher value. To decrease the uplink transmission power to the RRH 103, the base station 101 configures the power corrective value of the TPC command being transmitted in the second control channel region to be the lower value. The base station 101 performs, for the terminal A, an uplink signal transmission and uplink transmission power control in the first control channel region, and performs, for the terminal B, an uplink signal transmission and uplink transmission power control in the second control channel region. More specifically, the base station 101 performs inter-cell uplink transmission power control by configuring the power corrective value of the TPC command (transmission power control command) being transmitted in the first control channel region to be a first value and by configuring the power corrective value of the TPC command being transmitted in the second control channel region to be a second value. The base station 101 may configure the first value to be higher in power corrective value than the second value. More specifically, the base station 101 may perform power control on each of the control channel regions independently using the TPC commands.

In the third embodiment, the base station 101 notifies the terminal 102 of the radio resource control signal comprising the first measurement target configuration and second measurement target configuration, and also notifies the terminal 102 of the radio resource control signal comprising the configuration of the parameter related to the uplink power control. The terminal 102 calculates the first path loss and the first uplink transmission power on the basis of the first measurement target comprised in the first measurement target configuration and the configuration of the parameter related to the uplink power control, calculates the second path loss and the second uplink transmission power on the basis of the second measurement target comprised in the second measurement target configuration and the configuration of the parameter related to the uplink power control, and then transmits the uplink signal to the base station 101 at the first or second uplink transmission power.

It is assumed that referring to FIG. 1, the base station 101 and the RRH 103 perform the carrier aggregation, and perform communications using two carrier components (CCs, or Cells) different in center frequency from the uplink to the downlink. These carrier components are referred to as a first carrier component and a second carrier component. The base station 101 and the RRH 103 may thus perform individual communications and coordinated communications using these carrier components. The first carrier component is used in communications between the base station 101 and the terminal 102, and the second carrier component is used in communications between the RRH 103 and the terminal 102. In other words, the downlink 105 or the uplink 106 is established using the first carrier component, and the downlink 107 or the uplink 108 is established using the second carrier component.

If the uplink grant is detected on the first carrier component in the downlink 105, the terminal 102 may transmit on the first carrier component in the uplink 106 at the first uplink transmission power. If the uplink grant is detected on the second carrier component in the downlink 107, the terminal 102 may transmit on the second carrier component in the uplink 108 at the second uplink transmission power. If a carrier indicator is comprised in the detected uplink grant, the terminal 102 may calculate the path loss and the uplink transmission power using the path loss reference resource related to the carrier (cell, primary cell, secondary cell, and serving cell index) indicated by the carrier indicator.

The base station 101 may perform appropriate uplink transmission power control for the terminal 102 by performing scheduling with carrier components different from a terminal 102 in communication with the base station 101 to a terminal 102 in communication with the RRH 103, and by configuring the first measurement target configuration or second measurement target configuration for the carrier component.

Referring to FIG. 1, the terminal 102 is configured with an uplink subframe subset (e.g., first subframe subset) to transmit the uplink signal to the base station 101 and with an uplink subframe subset (e.g., second subframe subset) to transmit the uplink signal to the RRH 103. The terminal 102 performs control to prevent the uplink signal transmitted from the terminal 102 from becoming an interference source to another terminal 102 by setting a transmission timing of the uplink signal to the base station 101 to be different from a transmission timing of the uplink signal to the RRH 103. Let the subframe subset to transmit the uplink signal to the base station 101 be a first subset, and the subframe subset to transmit the uplink signal to the RRH 103 be a second subset, and the terminal 102 transmits in the uplink 106 using the first subset, and transmits in the uplink 108 using the second subset. If the uplink signal is to be transmitted in the first subset, the terminal 102 may calculate the first path loss using the first measurement target configuration and the configuration of the parameter related to the uplink power control and may calculate the first uplink transmission power. If the uplink signal is to be transmitted in the second subset, the terminal 102 may calculate the second path loss using the second measurement target configuration and the configuration of the parameter related to the uplink power control and may calculate the second uplink transmission power.

The base station 101 configures a communication timing (subframe subset) between the base station 101 and the terminal 102 to be different from a communication timing (subframe subset) between the RRH 103 and the terminal 102, thereby performing appropriate uplink transmission power control in each of the subframe subsets. The base station 101 may thus configure the terminal 102 for the appropriate uplink transmission power for the uplink 106 and the uplink 108.

Depending on whether the control channel region with the detected uplink grant is the first control channel region or the second control channel region, as illustrated in FIG. 1, the terminal 102 may determine the timing to transmit in the uplink 106 or the uplink 108 in response to the detection timing of the uplink grant. More specifically, if the uplink grant is detected in the first control channel region in a subframe n, the terminal 102 may transmit the uplink signal to the base station 101 at the first uplink transmission power in a subframe n+4. If the uplink grant is detected in the second control channel region in a subframe n+1, the terminal 102 may transmit the uplink signal to the RRH 103 at the second uplink transmission power in a subframe n+5.

If the uplink grant is detected in the first control channel region, the terminal 102 transmits the uplink grant at the first uplink transmission power in the uplink 106. If the uplink grant is detected in the second control channel region, the terminal 102 transmits the uplink grant at the second uplink transmission power in the uplink 108.

The base station 101 may configure the terminal 102 for the appropriate uplink transmission power for the uplink 106 or the uplink 108 by scheduling the uplink grant appropriately in the first control channel region and the second control channel region in the downlink 105 and the downlink 107.

In this way, the terminal 102 may separate the uplink transmission to the base station 101 from the uplink transmission to the RRH 103 depending on the frequency resource and timing at which the uplink grant is detected. Even if terminals greatly different in uplink transmission power are configured, control process is performed to prevent one terminal 102 from becoming an interference source to another terminal 102.

First Modification of Third Embodiment

A first modification of the third embodiment is described below. In the first modification of the third embodiment, the base station 101 may specify, as information related to the configuration of the parameter (i.e., one or more parameters) related to the uplink power control, the reference signal (such as the cell-specific reference signal or the channel state information reference signal) used in the calculation of the path loss and the resource (or the antenna port) as the measurement target. The reference signal used in the calculation of the path loss may be indicated by the information related to the first measurement target configuration or the information related to the second measurement target configuration, described in the first embodiment or the second embodiment. The reference signal used in the calculation of the path loss and the configuration method of a resource as a measurement target are described in detail below.

It is assumed that the base station 101 and the RRH 103 perform the carrier aggregation, and perform communications using two carrier components (CCs, or Cells) different in center frequency from the uplink to the downlink. These carrier components are referred to as a first carrier component and a second carrier component. The base station 101 and the RRH 103 may thus perform individual communications and coordinated communications using these carrier components. The base station 101 may configure the first carrier component as a primary cell, and the second carrier component as a secondary cell. The base station 101 may specify, as a path loss reference resource to the primary cell and the secondary cell, a resource of a reference signal that is used to calculate the path loss using an index.

The path loss reference resource is an information element that indicates a reference signal to be used (referenced) in the calculation of the path loss, and indicates a resource (or an antenna port) of a measurement target. The path loss reference resource is a measurement target configured in the first measurement target configuration or the second measurement target configuration, described in the first embodiment or the second embodiment. The base station 101 may associate the path loss used to calculate the uplink transmission power on the basis of the path loss reference resource, with the measurement target (the reference signal and the antenna port index or a measurement index) used in the calculation. The path loss reference resource may also be the antenna port index 0 for the cell-specific reference signal or the CSI-RS antenna port (or the CSI-RS measurement index) for the channel state information reference signal, described in the first embodiment or the second embodiment. More specifically, if the index specified by the path loss reference resource is 0, the antenna port index of the cell-specific reference signal is 0. If the index specified by the path loss reference resource is another value, the path loss reference resource may be related to the CSI-RS measurement index or the CSI-RS antenna port index of the channel state information reference signal. The path loss reference resource may also be related to pathlossReference described with reference to FIG. 22.

More specifically, if the second carrier component (SCell or the secondary cell) is specified by pathlossReference, and the CSI-RS measurement index 1 of the channel state information reference signal is specified by the path loss reference resource, the terminal 102 calculates the path loss based on the resource corresponding to the CSI-RS measurement index 1 comprised in the second carrier component and calculates the uplink transmission power. In another example, if the first carrier component (PCell or the primary cell) is specified by pathlossReference and the CSI-RS measurement index 1 of the channel state information reference signal is specified by the path loss reference resource, the terminal 102 may calculate the path loss based on the resource corresponding to the CSI-RS measurement index 1 comprised in the first carrier component and set the uplink transmission power. If the carrier indicator is comprised in the detected uplink grant, the terminal 102 may calculate the path loss and set the uplink transmission power using the path loss reference resource related to the carrier (the cell, the primary cell, the secondary cell, or the serving cell) indicated by the carrier indicator.

In the procedure described above, the terminal 102 may calculate the path loss in accordance with the notification contents of the path loss reference resource notified by the base station 101, and may calculate the uplink transmission power on the basis of the path loss and the configuration of the parameter related to the uplink power control.

Figure 24:
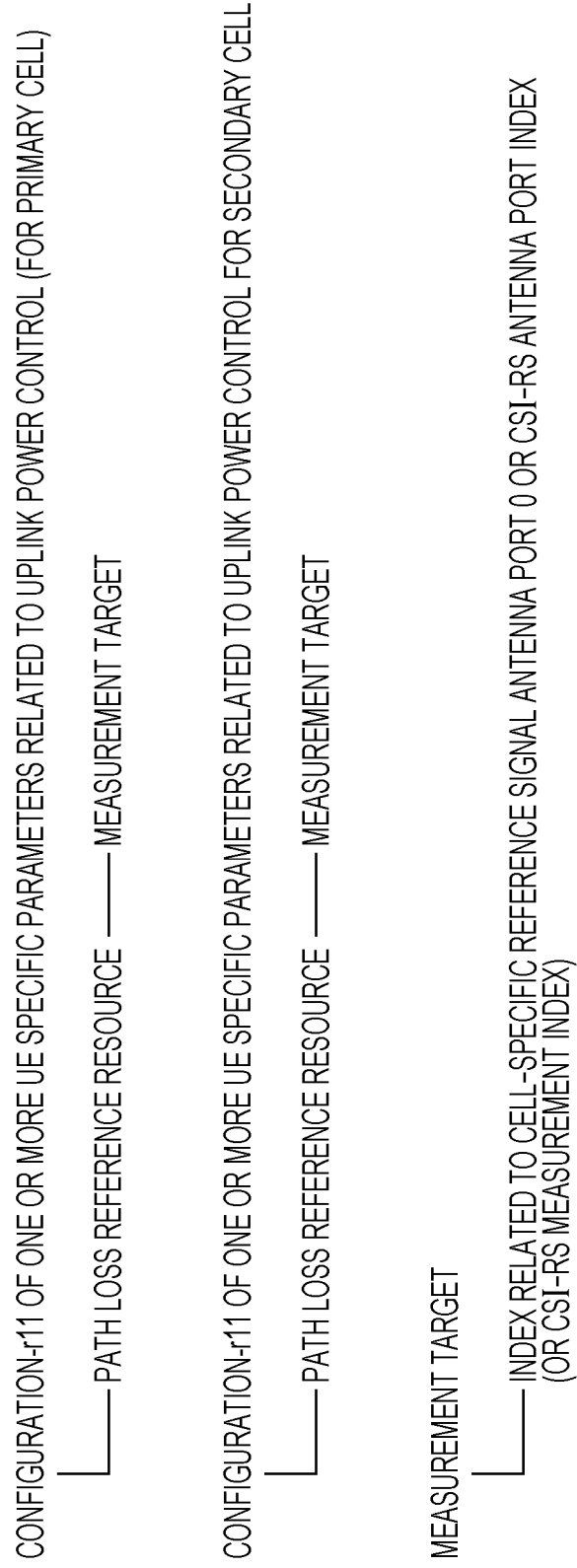
FIG. 24 illustrates in detail a path loss reference resource.

FIG. 24 illustrates in detail the path loss reference resource. The path loss reference resource is an information element that is to be added to the configuration of the terminal specific parameter related to the uplink power control (for the primary cell) and the configuration of the terminal specific parameter related to the uplink power control for the secondary cell. A downlink reference signal (the measurement target) for use in the path loss measurement configured in the measurement target configuration is specified in the path loss reference resource. The base station 101 may specify to the terminal 102 the measurement target, specified by the measurement target configuration indicated in the first embodiment or the second embodiment, using the path loss reference resource. More specifically, for the primary cell (the first carrier component or PCell) and the secondary cell (the second carrier component or SCell), the base station 101 may select a measurement resource for use in the path loss measurement from among the measurement targets configured in the measurement target configuration(s). The terminal 102 may calculate the path loss to calculate the uplink transmission power in the primary cell and the secondary cell in response to the selection result, and may calculate the uplink transmission power for the primary cell or the secondary cell on the basis of the path loss and the configuration of the parameter related to the uplink power control.

From another viewpoint, let terminal A represent a terminal 102 in communication with the base station 101, and terminal B represent a terminal 102 in communication with the RRH 103. Dynamic transmission control of the uplink signal of the terminal A is performed in the primary cell only, and dynamic transmission control of the uplink signal of the terminal B is performed in the secondary cell only. More specifically, in order to cause the terminal 102 to transmit the uplink signal to the base station 101, the base station 101 notifies the terminal 102 of the physical downlink channel (uplink grant) in the primary cell. In order to cause the terminal 102 to transmit the uplink signal to the RRH 103, the base station 101 notifies the terminal 102 of the physical downlink channel in the secondary cell. The base station 101 may perform the transmission power control on the uplink signal directed to the base station 101 or the RRH 103 using information related to a TPC command that is a corrective value of the transmission power control for the uplink signal comprised in the physical downlink control channel.

The base station 101 may configure the base station 101 itself or the RRH 103 for the value of the TPC command comprised in the signal of the physical downlink control channel (uplink grant) in the cell (the carrier component or component carrier) that notifies the signal of the physical downlink control channel (uplink grant). More specifically, to increase the uplink transmission power to the base station 101, the base station 101 configures the power corrective value of the TPC command of the primary cell to be the higher value. To decrease the uplink transmission power to the RRH 103, the base station 101 configures the power corrective value of the TPC command of the secondary cell to be the lower value. The base station 101 performs, for the terminal A, an uplink signal transmission and uplink transmission power control in the primary cell, and performs, for the terminal B, an uplink signal transmission and uplink transmission power control in the secondary cell. More specifically, the base station 101 performs inter-cell uplink transmission power control by configuring the power corrective value of the TPC command (transmission power control command) of the primary cell to be a first value and by configuring the power corrective value of the TPC command of the secondary cell to be a second value. The first value and the second value may be configured to be different. The base station 101 may configure the first value to be higher in power corrective value than the second value. More specifically, the base station 101 may perform power correction on each of the cells independently using the TPC commands.

Figure 25:
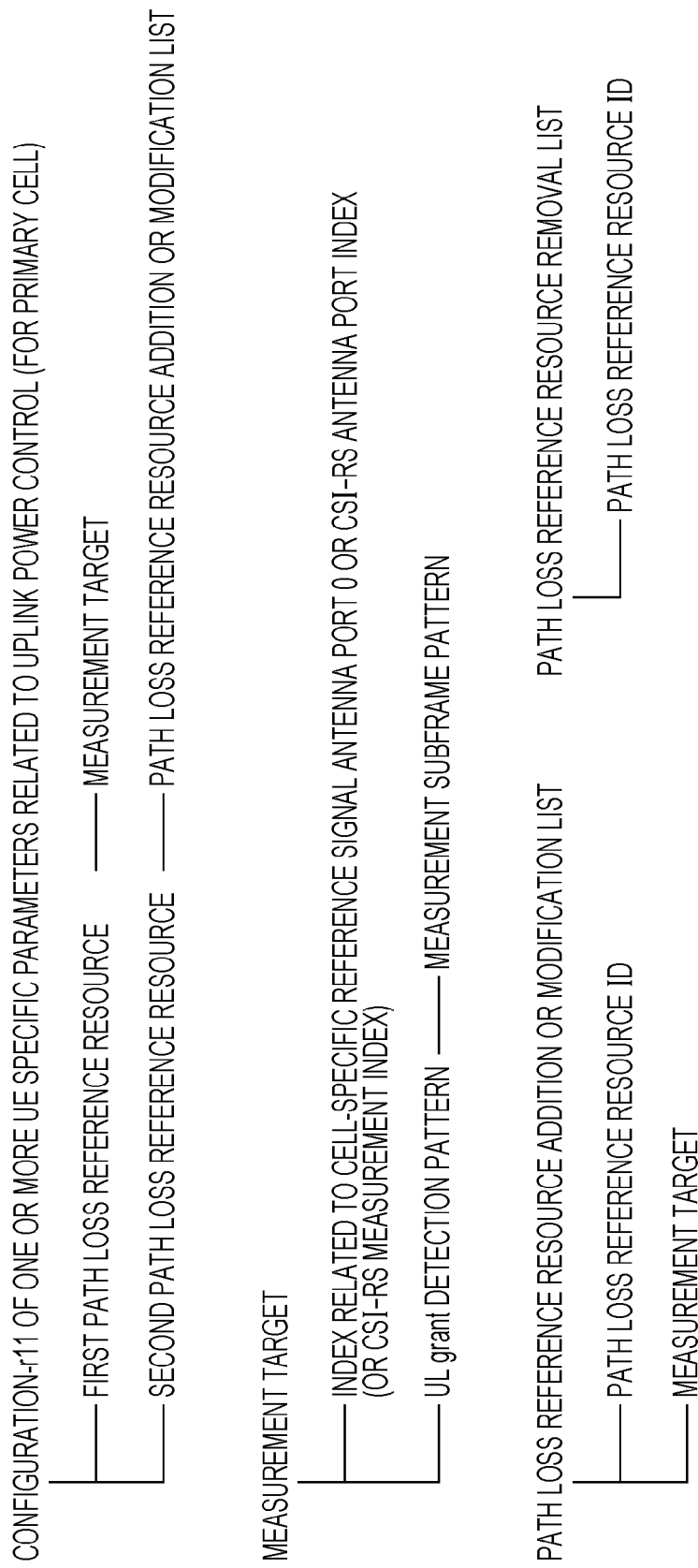
FIG. 25 illustrates in detail the path loss reference resource at the timing at which the terminal 102 detects an uplink grant.

FIG. 25 illustrates in detail the path loss reference resource at the timing at which the terminal 102 has detected a physical downlink control channel (uplink grant). The base station 101 may configure the terminal 102 for one or more path loss reference resources (a first path loss reference resource and a second path loss reference resource). The second path loss reference resource is a parameter that can be added as needed by the addition or modification list. The path loss reference resource is related to the measurement target configured in the measurement target configuration. For example, if an uplink grant detection subframe subset (uplink grant detection pattern) is configured in the measurement target and an uplink grant is detected in the uplink subframe comprised in the uplink grant detection pattern, the terminal 102 calculates the path loss using the measurement target related to the uplink grant detection subframe subset and calculates the uplink transmission power using the path loss.

In other words, in a case that a plurality of path loss reference resources (the first path loss reference resource and the second path loss reference resource) is configured, the uplink grant detection subframe subset is associated with the path loss reference resource. More specifically, the first path loss reference resource is associated with the first subframe subset. The second path loss reference resource is also associated with the second subframe subset. The terminal 102 selects, on the basis of the path loss reference resource, the measurement target configuration for the calculation of the uplink transmission power, and calculates the uplink transmission power based on the path loss calculated in accordance with the received signal power of the measurement target specified in the measurement target configuration. In one example, the first path loss reference resource specifies the first measurement target configuration, namely, the antenna port 0 for the cell-specific reference signal, and this may be transmitted from the base station 101. The second path loss reference resource specifies the second measurement target configuration, namely, the antenna port 15 for the channel state information reference signal, and this may be transmitted from the RRH 103. Different measurement targets are referenced in accordance with the subframe in which the uplink grant is to be detected, and if an uplink signal is detected in the first subframe subset as a result, the transmission power appropriate for the base station 101 is configured. If an uplink signal is detected in the second subframe subset as a result, the transmission power appropriate for the RRH 103 is configured. In other words, depending on the detection timing of the uplink grant, appropriate uplink transmission power control is performed by switching between the measurement targets to be used in the path loss calculation.

The second path loss reference resource is a path loss reference resource that can be added from the path loss reference resource addition or modification list. In other words, the base station 101 may define a plurality of path loss reference resources for a single cell (e.g., the primary cell). The base station 101 may instruct the terminal 102 to concurrently calculate the path loss on the plurality of path loss reference resources. If the second path loss reference resource is added, a path loss reference resource ID and measurement target are configured using the path loss reference resource addition or modification list to add the second path loss reference resource as needed. If there is no longer need to calculate the path loss with respect to the plurality of path loss reference resources, an unnecessary path loss reference resource is removed in accordance with the path loss reference resource removal list. A second path loss calculation method for this case is described below. The second path loss reference resource may specify a plurality of first measurement target configurations or a plurality of second measurement target configurations, namely, the antenna ports 15 and 16 for the channel state information reference signal, in the path loss reference resource addition or modification list. In such a case, the second path loss may be calculated in accordance with the received signal power at the antenna ports 15 and 16 for the channel state information reference signal. The path loss calculated from the antenna port 15 and the path loss calculated from the antenna port 16 may be averaged to determine the second path loss. Alternatively, the second path loss may be one of the antenna losses whichever is smaller or whichever is greater. Alternatively, the two path losses may be linearly processed to obtain the second path loss.

The antenna port 0 for the cell-specific reference signal and the antenna port 15 for the channel state information reference signal may be used. In yet another example, the second path loss reference resource may specify a plurality of second measurement target configurations, namely, the antenna ports 15 and 16 for the channel state information reference signal in the path loss reference resource addition or modification list. In such a case, the second path loss and third path loss may be calculated in accordance with the received signal power of the antenna ports 15 and 16 for the channel state information reference signal. In such a case, the first path loss, the second path loss, and the third path loss may be respectively related to the first subframe subset, the second subframe subset, and the third subframe subset.

The measurement targets comprised in the first path loss reference resource and second path loss reference resource may be the antenna port 0 for the cell-specific reference signal and the CSI-RS antenna port index (CSI-RS measurement index) described in the first embodiment and the second embodiment.

The measurement target may comprise an uplink grant detection pattern. A measurement subframe pattern (MeasSubframePattern-r10) comprised in the measurement object EUTRA among the measurement objects of FIG. 14 may be used for the uplink grant detection pattern.

The measurement target is associated herein with the uplink grant detection pattern. In another example, the measurement target, not comprising the uplink grant detection pattern, may be related to the transmission timing of the measurement report. More specifically, the terminal 102 may associate the measurement result of the measurement target with the subframe pattern that is to be notified to the base station 101. If the uplink grant is detected in a downlink subframe related to the subframe pattern, the terminal 102 may calculate the path loss using the measurement target to calculate the uplink transmission power.

Herein is described that a certain parameter is added in the configuration of one or more terminal specific parameters related to the uplink power control for the primary cell. The same configuration may be added in the secondary cell. In a case of the secondary cell, however, a path loss reference (pathlossReference-r10) has been configured, and the path loss calculation is performed based on the reference signal comprised in the primary cell or the secondary cell. More specifically, if the primary cell is selected in the path loss reference, the path loss calculation is performed using the path loss reference resource having the configuration of the terminal specific parameter related to the uplink power control for the primary cell. If the secondary cell is selected in the path loss reference, the path loss calculation is performed using the path loss reference resource having the configuration of the terminal specific parameter related to the uplink power control for the secondary cell. The path loss reference resource may be related to the path loss reference (pathlossReference-r10).

The secondary carrier component (SCell or the secondary cell) may be specified on the basis of the path loss reference (PathlossReference-r10), and the CSI-RS measurement index 1 of the channel state information reference signal may be specified by the path loss reference resource. The path loss calculation is then performed in accordance with the resource corresponding to the CSI-RS measurement index 1 comprised in the second carrier component to calculate the uplink transmission power. In another example, the primacy carrier component (PCell or the primary cell) may be specified on the basis of the path loss reference (PathlossReference-r10), and the CSI-RI measurement index 1 of the channel state information reference signal may be specified by the path loss reference resource. The path loss calculation is then performed in accordance with the resource corresponding to the CSI-RS measurement index 1 comprised in the first carrier component to calculate the uplink transmission power.

From another viewpoint, let terminal A represent a terminal 102 in communication with the base station 101, and terminal B represent a terminal 102 in communication with the RRH 103. Dynamic transmission control of the uplink signal of the terminal A is performed in the first subframe subset only, and dynamic transmission control of the uplink signal of the terminal B is performed in the second subframe subset only. More specifically, in order to cause the terminal 102 to transmit the uplink signal to the base station 101, the base station 101 notifies the terminal 102 of the uplink grant comprised in the first subframe subset. In order to cause the terminal 102 to transmit the uplink signal to the RRH 103, the base station 101 notifies the terminal 102 of the uplink grant comprised in the second subframe subset. The base station 101 may perform the transmission power control on the uplink signal directed to the base station 101 or the RRH 103 using a TPC command that is a corrective value of the transmission power control of the uplink signal comprised in the uplink grant. The base station 101 configures, for the base station 101 or the RRH 103, a TPC command value comprised in the uplink grant using the subframe subset that notifies the uplink grant.

To increase the uplink transmission power to the base station 101, the base station 101 configures the power corrective value of the TPC command in the first subframe subset to be the higher value. To decrease the uplink transmission power to the RRH 103, the base station 101 configures the power corrective value of the TPC command in the second subframe subset to be the lower value. For example, if a plurality of values (a first value and a second value, for example) is configured in the TPC command, the base station 101 may perform control to select the first value for the power corrective value of the TPC command in the first subframe subset and the second value for the power corrective value of the TPC command in the second subframe subset, depending on the communication state. The base station 101 performs, for the terminal A, an uplink signal transmission and uplink transmission power control using the first subframe subset, and performs, for the terminal B, an uplink signal transmission and uplink transmission power control using the second subframe subset. More specifically, the base station 101 performs inter-cell uplink transmission power control by configuring the power corrective value of the TPC command (transmission power control command) in the first subframe subset to be the first value and by configuring the power corrective value of the TPC command in the second subframe subset to be the second value. The base station 101 may configure the first value higher in power corrective value than the second value. The base station 101 may configure the first value to be higher in power corrective value than the second value. More specifically, the base station 101 may perform power control on each of the cells independently using the TPC commands.

Figure 26:
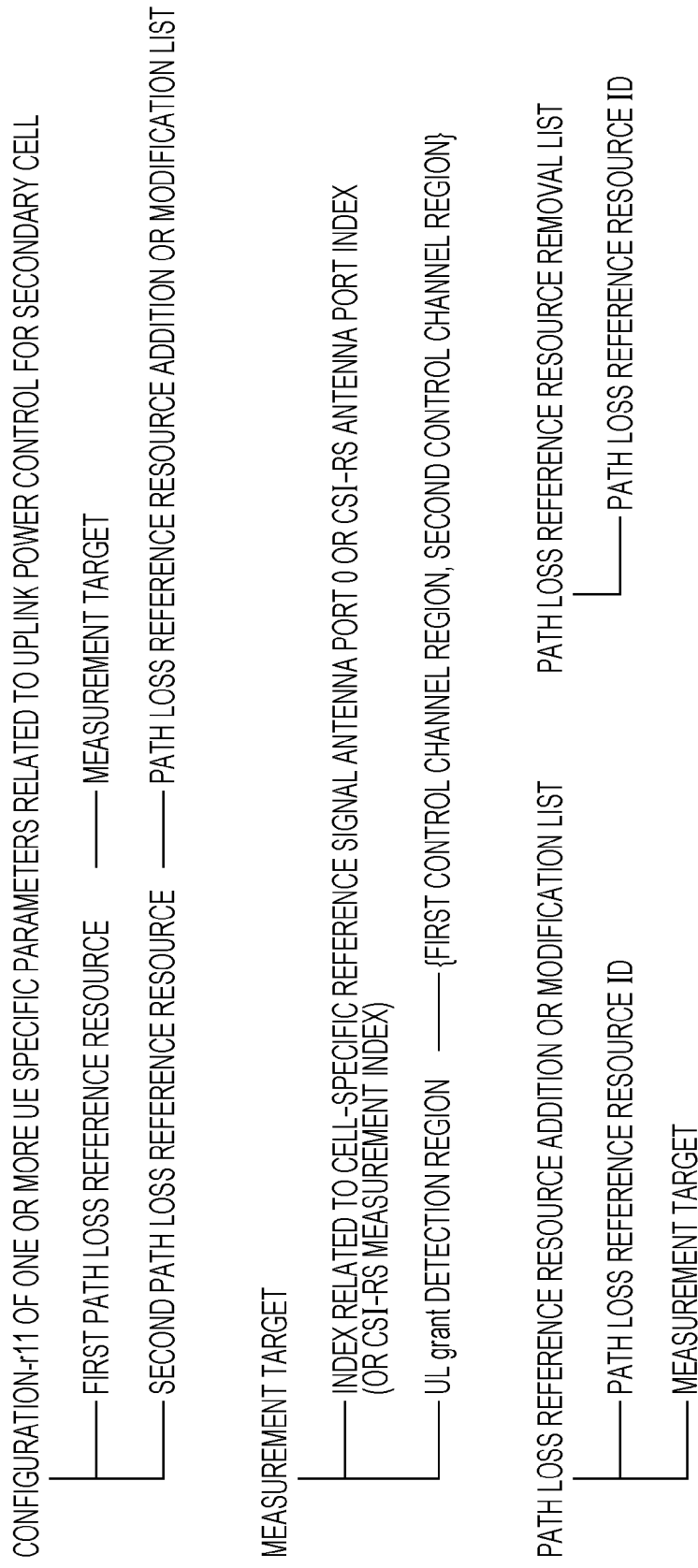
FIG. 26 illustrates in detail the path loss reference resource in accordance with a control channel region where the terminal 102 detects the uplink grant.
Figure 27:
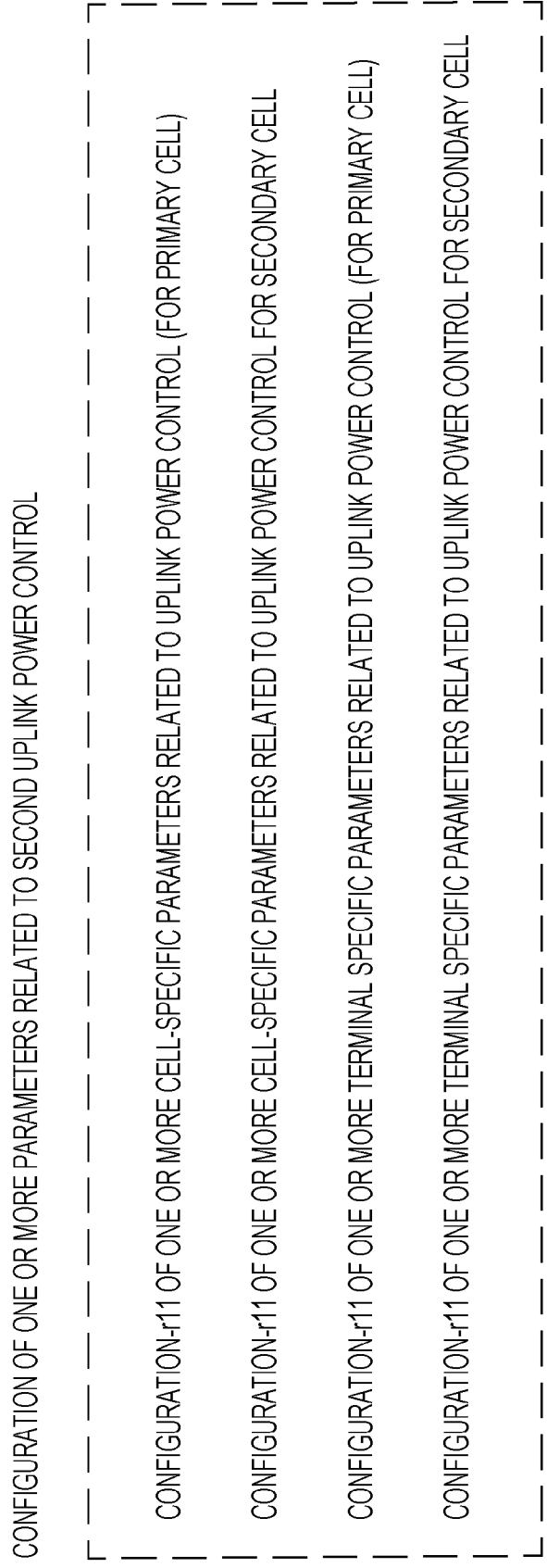
FIG. 27 illustrates an example of a configuration of a parameter related to second uplink power control in the present embodiment of the present invention.

FIG. 26 illustrates in detail the path loss reference resource in accordance with a control channel region where the terminal 102 detects the uplink grant. In the same manner as in FIG. 25, the base station 101 may configure the terminal 102 for two or more path loss reference resources (a first path loss reference resource and a second path loss reference resource). The second path loss reference resource is a parameter that can be added as needed by the addition or modification list. The path loss reference resource is related to the measurement target configured in the measurement target configuration. For example, if an uplink grant (physical downlink control channel) detection region (a first control channel region and a second control channel region) is configured as the measurement target, and the uplink grant is detected in the downlink control channel region comprised in the uplink grant detection region, the terminal 102 calculates the path loss using the measurement target related to the uplink grant detection region, and calculates the uplink transmission power based on the path loss.

If a plurality of path loss reference resources (the first path loss reference resource and the second path loss reference resource) is configured, the terminal 102 associates the uplink grant detection region with the path loss reference resource. More specifically, the first path loss reference resource is related to the first control channel region. The second path loss reference resource is related to the second control channel region. The terminal 102 selects from the path loss reference resource the measurement target configuration that serves as a basis for the calculation of the uplink transmission power, and calculates the uplink transmission power based on the path loss calculated from the received signal power as the measurement target specified in the measurement target configuration. In this way, the terminal 102 may transmit the uplink signal at the uplink transmission power calculated in response to the measurement target in a region where the uplink grant is detected (namely, a region where a physical downlink control channel is detected). A second path loss calculation method is described below. In the second path loss calculation, a plurality of second measurement target configurations is related to the second path loss reference resource. The second path loss reference resource may specify a plurality of first measurement target configuration or second measurement target configuration, such as the antenna ports 15 and 16 for the channel state information reference signal, in the path loss reference resource addition or modification list. In such a case, the second path loss may be calculated based on the received signal power of the antenna ports 15 and 16 for the channel state information reference signal.

The path loss calculated from the antenna port 15 and the path loss calculated from the antenna port 16 are averaged to determine the second path loss. Alternatively, the second path loss may be one of the antenna losses whichever is smaller or whichever is greater. Alternatively, the two path losses may be linearly processed to obtain the second path loss. The antenna port 0 for the cell-specific reference signal and the antenna port 15 for the channel state information reference signal may be used. In yet another example, the second path loss reference resource may specify a plurality of second measurement target configurations, namely, the antenna ports 15 and 16 for the channel state information reference signal in the path loss reference resource addition or modification list. In such a case, the second path loss and third path loss may be calculated in accordance with the received signal power of the antenna ports 15 and 16 for the channel state information reference signal. In such a case, the first path loss, the second path loss, and the third path loss may be associated respectively with the first subframe subset, the second subframe subset, and the third subframe subset.

The path loss measurement resource may be the antenna port 0 of the cell-specific reference signal and the CSI-RS antenna port index (CSI-RS measurement index) described in the first embodiment or the second embodiment.

From another viewpoint, let terminal A represent a terminal 102 in communication with the base station 101, and terminal B represent a terminal 102 in communication with the RRH 103. Dynamic transmission control of the uplink signal of the terminal A is performed in the first control channel (PDCCH) region only, and dynamic transmission control of the uplink signal of the terminal B is performed in the second control channel (X-PDCCH) region only. More specifically, in order to cause the terminal 102 to transmit the uplink signal to the base station 101, the base station 101 notifies the terminal 102 of the uplink grant comprised in the first control channel region. In order to cause the terminal 102 to transmit the uplink signal to the RRH 103, the base station 101 notifies the terminal 102 of the uplink grant comprised in the second control channel region. The base station 101 may perform the transmission power control on the uplink signal directed to the base station 101 or the RRH 103 using a TPC command that is a corrective value of the transmission power control of the uplink signal comprised in the uplink grant.

The base station 101 configures, for the base station 101 itself or the RRH 103, a TPC command value comprised in the physical downlink control channel (uplink grant) using a physical channel region through which a physical downlink control channel (uplink grant) transmission is performed. More specifically, to increase the uplink transmission power to the base station 101, the base station 101 configures the power corrective value of the TPC command notified in the first control channel region to be higher. To decrease the uplink transmission power to the RRH 103, the base station 101 configures the power corrective value of the TPC command notified in the second control channel region to be lower. The base station 101 performs, for the terminal A, an uplink signal transmission and uplink transmission power control in the first control channel region, and performs, for the terminal B, an uplink signal transmission and uplink transmission power control in the second control channel region. More specifically, the base station 101 performs inter-cell uplink transmission power control by configuring the power corrective value of the TPC command (transmission power control command) in the first control channel region to be a first value and by configuring the power corrective value of the TPC command in the second control channel region to be a second value. The first value and second value may be different from each other. The base station 101 may configure the first value to be higher in power corrective value than the second value. More specifically, the base station 101 may perform power control on each of the control channel regions independently using the TPC commands.

In the first modification of the third embodiment, the base station 101 transmits to the terminal 102 the radio resource control signal comprising information related to the path loss reference resource and information related to the configuration of the parameter related to the uplink power control, and transmits to the terminal 102 information related to the physical downlink control channel (the uplink grant). The terminal 102 configures the path loss and the uplink transmission power in accordance with the radio resource control signal comprising the information related to the path loss reference resource and the information related to the configuration of the parameter related to the uplink power control, and then transmits the uplink signal to the base station 101 at the uplink transmission power.

In the first modification of the third embodiment, the base station 101 transmits to the terminal 102 the radio resource control signal comprising information related to the first path loss reference resource and/or information related to the second path loss reference resource and information of the configuration of the parameter related to the uplink power control. The terminal 102 configures the first path loss in accordance with the information related to the first path loss reference resource, configures the second path loss in accordance with the information related to the second path loss reference resource, and configures the uplink transmission power in accordance with the first path loss and/or the second path loss and the information of the configuration of the parameter related to the uplink power control.

In the first modification of the third embodiment, the base station 101 transmits to the terminal 102 the radio resource control signal comprising information related to the primary-cell-specific path loss reference resource, information related to the secondary-cell-specific path loss reference resource, and the information on the configuration of one or more parameters related to the uplink power control, and also transmits to the terminal 102 in the physical downlink control channel (the uplink grant). The terminal 102 receives the radio resource control signal comprising the information related to the primary-cell-specific path loss reference resource and/or the information related to the secondary-cell-specific path loss reference resource, and the information of the configuration of the parameter related to the uplink power control. Upon detecting the physical downlink control channel (the uplink grant) in the primary cell, the terminal 102 configures the path loss and the uplink transmission power in accordance with the information related to the primary-cell-specific path loss reference resource and the information on the configuration of one or more parameters related to the uplink power control. Upon detecting the physical downlink control channel (the uplink grant) in the secondary cell, the terminal 102 configures the path loss and the uplink transmission power in accordance with the information related to the secondary-cell-specific path loss reference resource and the information on the configuration of one or more parameters related to the uplink power control, and transmits to the base station 101 the uplink signal at the uplink transmission power configured at the cell where the physical downlink control channel (the uplink grant) is detected.

In the first modification of the third embodiment, the base station 101 transmits to the terminal 102 the radio resource control signal comprising information related to the first path loss reference resource and/or information related to the second path loss reference resource and information related to the configuration of one or more parameters related to the uplink power control, and transmits to the terminal 102 the physical downlink control channel signal (the uplink grant). In a case that the terminal 102 detects the physical downlink control channel in the downlink subframe comprised in the first subframe subset, in accordance with the information comprised in the radio resource control signal, the terminal 102 configures the path loss and the uplink transmission power in accordance with the information related to the first path loss reference resource and the information on the configuration of one or more parameters related to the uplink power control. In a case that the terminal 102 detects the physical downlink control channel in the downlink subframe comprised in the second subframe subset, the terminal 102 configures the path loss and the uplink transmission power in accordance with the information related to the second path loss reference resource and the information of the configuration of the parameter related to the uplink power control, and then transmits the uplink signal to the base station 101 in the uplink subframe comprised in the subframe subset at the uplink transmission power.

In the first modification of the first embodiment, upon detecting the physical downlink control channel (the uplink grant) in the first control channel region, the terminal 102 configures the first path loss and the first uplink transmission power in accordance with the information related to the first path loss reference resource and the information of the configuration of the parameter related to the uplink power control. Upon detecting the physical downlink control channel (the uplink grant) in the second control channel region, the terminal 102 configures the second path loss and the second uplink transmission power in accordance with the information related to the second path loss reference resource and the information of the configuration of the parameter related to the uplink power control, and transmits to the base station 101 the uplink signal at the first uplink transmission power or the second uplink transmission power depending on the detection timing of the physical downlink control channel (the uplink grant).

The first modification of the first embodiment is described further with reference to FIG. 1. In a case that a plurality of path loss reference resources (the first path loss reference resource and the second path loss reference resource) are configured, the terminal 102 associates the path loss reference resource with the control channel region where the uplink grant is detected. More specifically, the terminal 102 associates the first path loss reference resource with the first control channel region. The terminal 102 also associates the second path loss reference resource with the second control channel region. The terminal 102 selects from the path loss reference resource the measurement target configuration that serves as a basis in the calculation of the uplink transmission power, and calculates the uplink transmission power based on the path loss that has been calculated from the received signal power of the measurement target specified in the measurement target configuration.

In one example, the first path loss reference resource may specify the first measurement target configuration, namely, the antenna port 0 for the cell-specific reference signal, and this may be transmitted from the base station 101. The second path loss reference resource may specify the second measurement target configuration, namely, the antenna port 15 for the channel state information reference signal, and this may be transmitted from the RRH 103. Different measurement targets are referenced in accordance with the control channel region where the uplink grant is to be detected, and if the uplink signal is detected in the first control channel region as a result, the transmission power appropriate for the base station 101 is configured. If the uplink signal is detected in the second control channel region as a result, the transmission power appropriate for the RRH 103 is configured. In other words, depending on the control channel region to detect the uplink grant, appropriate uplink transmission power control is performed by switching between the measurement targets to be used in the path loss calculation. Referencing the different measurement targets depending on the control channel region eliminates the need for the base station to notify the terminal 102 of the subframe pattern.

In yet another example, the base station 101 may reconfigure the terminal 102 for the parameter related to a variety of uplink transmission power control in order to perform appropriate uplink transmission power control on the base station or the RRH 103. As described above, in order to perform the uplink transmission power control appropriate for the base station or the RRH, the base station 101 needs to switch between the path loss measurement by the first measurement target configuration and the path loss measurement by the second measurement target configuration. The terminal 102 may communicate with one of the base station and the RRH on the order of several tens to several hundreds of subframes, and may perform switching semi-statically. In such a case, the base station 101 may perform the appropriate uplink transmission power control by updating the measurement target configuration (the first measurement target configuration and the second measurement target configuration) and the configuration of one or more parameters related to the path loss reference resource. More specifically, if appropriate configuration is performed by configuring only the first path loss reference resource of FIG. 25 and FIG. 26, the appropriate transmission power may be configured on the base station 101 or the RRH 103.

Second Modification of Third Embodiment

In a second modification of the third embodiment, the terminal 102 may be configured with a plurality of parameters (e.g., parameter sets, parameter configurations) related to the uplink power control, and may calculate the uplink transmission power ($P_{PUSCH}$, $P_{PUCCH}$, and $P_{SRS}$) of a variety of uplink signals (PUSCH, PUCCH, and SRS) using the configuration of the parameters of the uplink power control.

In the second modification of the third embodiment, the base station 101 configures information related to the plurality of parameters of the uplink power control (for example, the configuration of one or more parameters for the first uplink power control and the configuration of one or more parameters for the second uplink power control), and then notifies the terminal 102 of the configured information. In accordance with the notified information, the terminal 102 configures the path loss on the basis of the information on the configuration of the parameter related to the first uplink power control, and sets the uplink transmission power on the basis of the path loss and the information on the configuration of one or more parameters for the first uplink power control. The terminal 102 configures the path loss on the basis of the information on the configuration of one or more parameters for the second uplink power control, and sets the uplink transmission power on the basis of the path loss and the information on the configuration of one or more parameters for the second uplink power control. The uplink transmission power based on the information on the configuration of one or more parameters for the first uplink power control is referred to first uplink transmission power, and the uplink transmission power based on the information on the configuration of one or more parameters for the second uplink power control is referred to second uplink transmission power.

The terminal 102 may perform control as to whether to transmit the uplink signal at the first uplink transmission power or at the second uplink transmission power, depending on the frequency resource or timing of the detection of the physical downlink control channel (or the uplink grant).

The base station 101 may individually configure an information element in the configuration of one or more parameters for the first uplink power control and an information element in the configuration of one or more parameters for the second uplink power control. For example, referring to FIG. 27 through FIG. 30, FIG. 27 illustrates an example of the configuration of one or more parameters for the second uplink power control in the present embodiment. The configuration of one or more parameters for the second uplink power control comprises a configuration-r11 of one or more parameters for the second cell-specific uplink power control (for the primary cell), a configuration-r11 of one or more parameters for the second cell-specific uplink power control for the secondary cell, a configuration-r11 of one or more parameters for the second terminal-specific uplink power control for the primary cell, and a configuration-r11 of one or more parameters for the second terminal-specific uplink power control for the secondary cell. Note that the configuration of one or more parameters for the first uplink power control remains the same as that illustrated in FIG. 22 and FIG. 24. In the present embodiment, the configuration of one or more parameters for the first uplink power control comprises a configuration-r11 of one or more parameters for the first cell-specific uplink power control for the primary cell, a configuration-r11 of one or more parameters for the first cell-specific uplink power control for the secondary cell, a configuration-r11 of one or more parameters for the first terminal-specific uplink power control for the primary cell, and a configuration-r11 of one or more parameters for the first terminal-specific uplink power control for the secondary cell.

FIG. 28 illustrates an example of the configuration of one or more parameters related to the first uplink power control and the configuration of one or more parameters related to the second uplink power control, comprised in each radio resource configuration. The (primary) cell-specific radio resource configuration comprises a configuration of one or more cell-specific parameters related to the first uplink power control for the primary cell and a configuration-r11 of one or more cell-specific parameters related to the second uplink power control for the primary cell. The (primary) cell-specific radio resource configuration may further comprise a configuration-r11 of one or more cell-specific parameters related to the uplink power control for the primary cell. The secondary-cell-specific radio resource configuration comprises a configuration of one or more cell-specific parameters related to the first uplink power control for the secondary cell and a configuration-r11 of one or more cell-specific parameters related to the second uplink power control for the secondary cell. The secondary-cell-specific radio resource configuration may further comprise configuration-r11 of one or more cell-specific parameters related to the uplink power control for the secondary cell. The (primary cell) terminal-specific physical configuration comprises a configuration of one or more terminal specific parameters related to the first uplink power control (for the primary cell) and a configuration-r11 of one or more terminal specific parameters related to the second uplink power control (for the primary cell).

The dedicated physical configuration for the secondary cell comprises a configuration of one or more terminal specific parameters related to the first uplink power control for the secondary cell and a configuration-r11 of one or more terminal specific parameters related to the second uplink power control for the secondary cell. The dedicated physical configuration (for the primary cell) is comprised in the dedicated radio resource configuration (for the primary cell) (RadioResourceCofigDedicated). The dedicated physical configuration for the secondary cell is comprised in the dedicated radio resource configuration for the secondary cell (RadioResourceConfigDedicatedSCell-r10). The common radio resource configuration and the dedicated radio resource configuration may be comprised in the RRC connection reconfiguration (RRCConnectionReconfiguration) or the RRC reestablishment (RRCConnectionReestablishment) described with reference to the second embodiment. The common radio resource configuration for the secondary cell and the dedicated radio resource configuration for the secondary cell may be comprised in the SCell addition or modification list described with reference to the second embodiment. The common radio resource configuration and the dedicated radio resource configuration may be configured on each terminal 102 using the RRC signal (e.g., dedicated signaling). The RRC connection reconfiguration and the RRC reestablishment may be configured on each terminal 102 using the RRC message.

FIG. 29 illustrates an example of a parameter configuration related to the second-cell-specific uplink power control. Information elements in the parameter configuration-r11 related to the second (primary) cell-specific uplink power control or the parameter configuration-r11 related to the second secondary-cell-specific uplink power control may be configured to comprise all the information elements of FIG. 29. The information elements in the configuration-r11 of one or more cell-specific parameters related to the second uplink power control (for the primary cell) or the configuration-r11 of one or more cell-specific parameters related to the second uplink power control for the secondary cell may be configured to comprise at least one of the information elements (i.e., one or more parameters) of FIG. 29. The information elements in the configuration-r11 of one or more cell-specific parameters related to the second uplink power control (for the primary cell) or the configuration-r11 of one or more cell-specific parameters related to the second uplink power control for the secondary cell may comprise none of the information elements of FIG. 29. In such a case, the base station 101 selects release, and then notifies the terminal 102 of the information related to the release. An information element not configured in the configuration of one or more cell-specific parameters related to the second uplink power control may be common to the one configured in the configuration of one or more cell-specific parameters related to the first uplink power control.

FIG. 30 illustrates an example of a configuration of one or more terminal specific parameters related to the first uplink power control and a configuration of one or more terminal specific parameters related to the second uplink power control. The path loss reference resource is configured in the configuration of one or more terminal specific parameters related to the first uplink power control for the primary cell and/or the secondary cell. The path loss reference resource in addition to the information elements of FIG. 22 is configured in the configuration of one or more terminal specific parameters related to the second uplink power control for the primary cell and/or the secondary cell. Information elements in the configuration-r11 of one or more terminal specific parameters related to the second uplink power control for the primary cell or the configuration-r11 of one or more terminal specific parameters related to the second uplink power control for the secondary cell may comprise all the information elements of FIG. 30.

The information elements in the configuration-r11 of one or more terminal specific parameters related to the second uplink power control for the primary cell or the configuration-r11 of one or more terminal specific parameters related to the second uplink power control for the secondary cell may comprise at least one of the information elements (i.e., one or more parameters) of FIG. 30. The information elements in the configuration-r11 of one or more terminal specific parameters related to the second uplink power control for the primary cell or the configuration-r11 of one or more terminal specific related to the second uplink power control for the secondary cell may comprise none of the information elements of FIG. 30. In such a case, the base station 101 selects release, and then notifies the terminal 102 of the information related to the release. An information element not configured in the configuration of one or more terminal specific parameters related to the second uplink power control may be common to the one configured in the configuration of one or more terminal specific parameters related to the first uplink power control. More specifically, if the path loss reference resource is not configured in the configuration of one or more terminal specific parameters related to the second uplink power control, the path loss is calculated based on the path loss reference resource configured in the configuration of one or more terminal specific parameters related to the first uplink power control.

Figure 32:
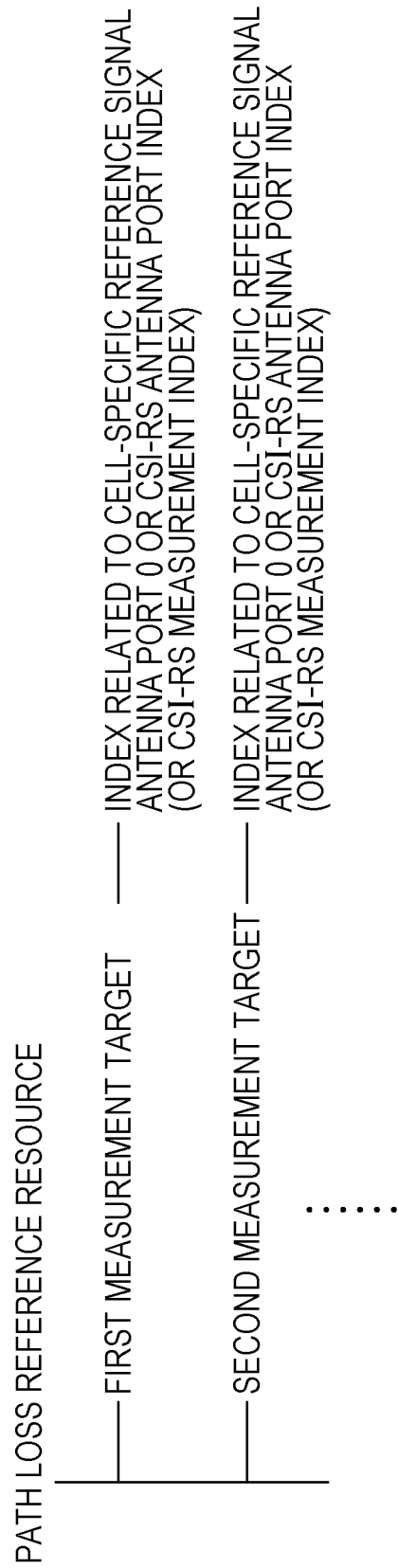
FIG. 32 illustrates another example (example 1) of the path loss reference resource.

The path loss reference resource may be the same as the one illustrated in the third embodiment (FIG. 24). In other words, the measurement target indicating the path loss reference resource may be related to an index related to the cell-specific reference signal antenna port 0 or the CSI-RS antenna port index (CSI-RS measurement index) (FIG. 31). The path loss reference resource may be the one illustrated in FIG. 32 or FIG. 33. FIG. 32 illustrates an example (first example) of the path loss reference resource. A plurality of measurement targets is configured as the path loss reference resource. The terminal 102 may calculate the path loss using at least one of the measurement targets.

Figure 33:
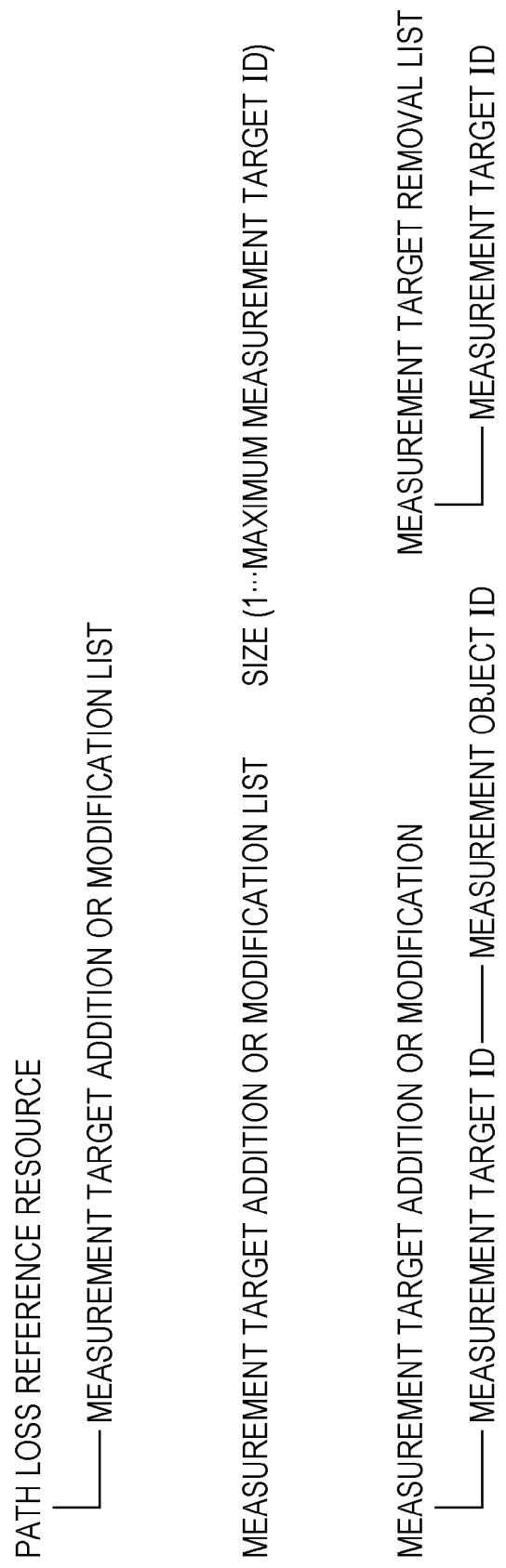
FIG. 33 illustrates another example (example 2) of the path loss reference resource.
Figure 34:
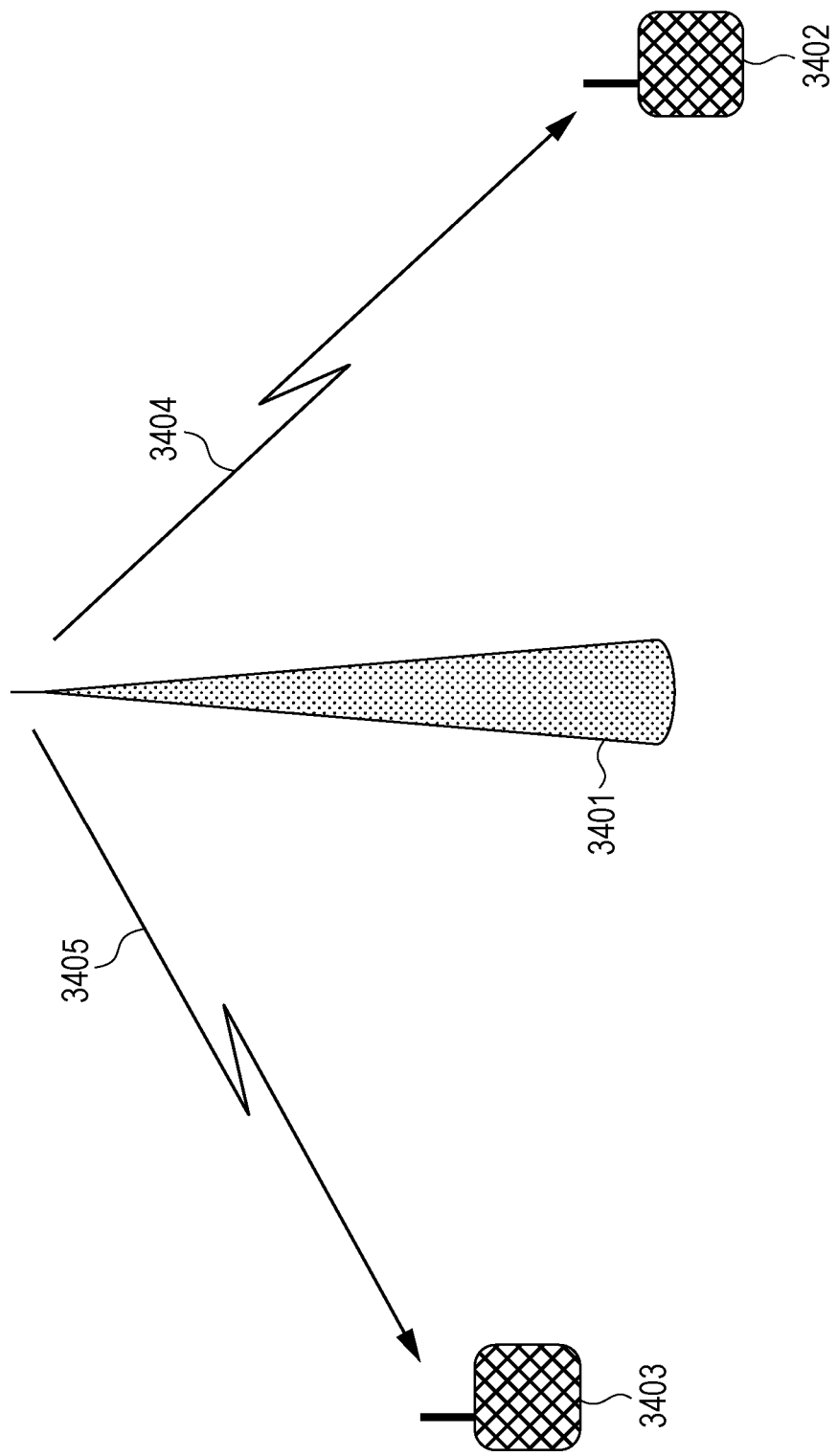
FIG. 34 illustrates an example of execution of a multi-user MIMO scheme.
Figure 35:
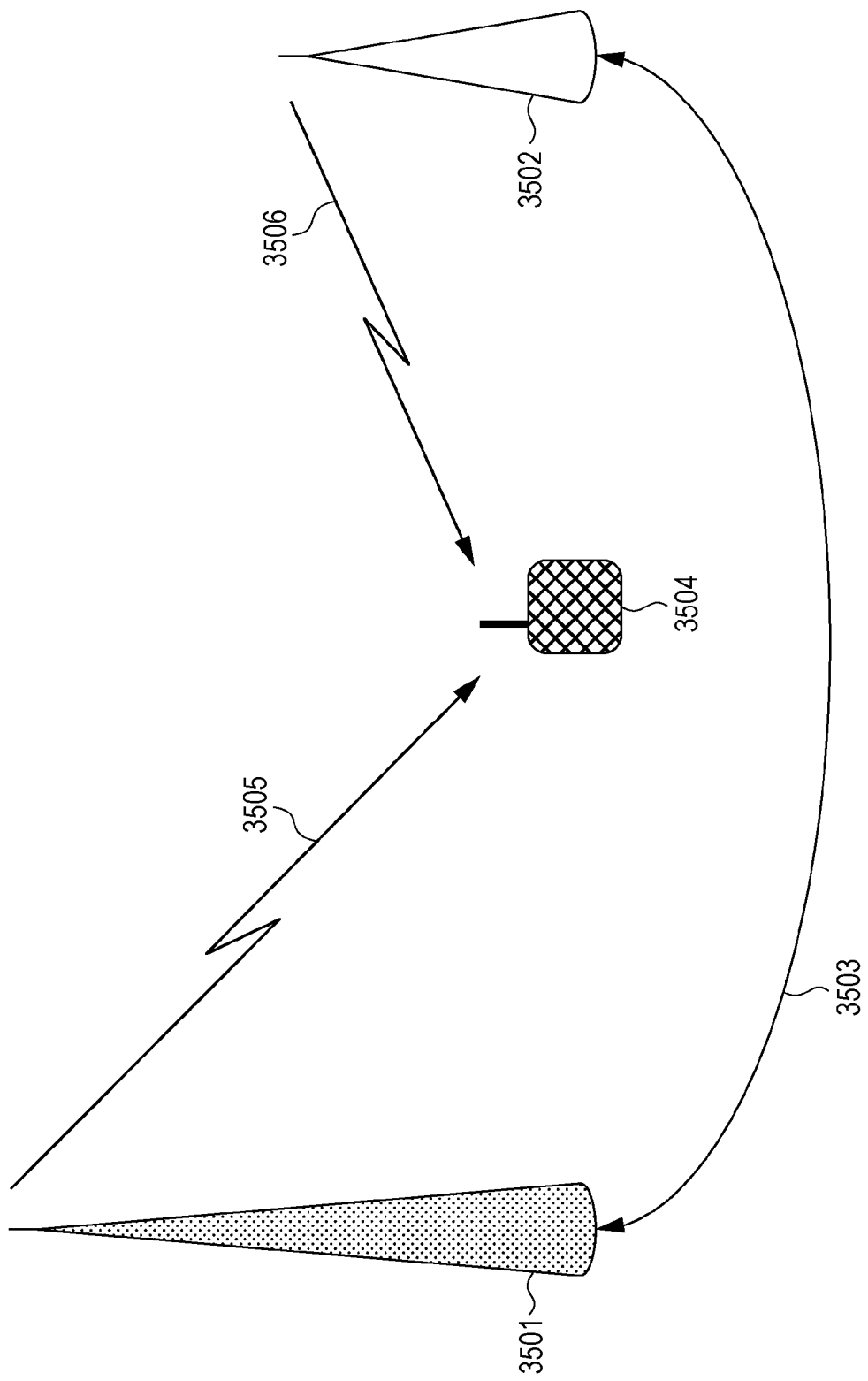
FIG. 35 illustrates an example of execution of a downlink CoMP scheme.

FIG. 33 illustrates another example (example 2) of the path loss reference resource. A measurement target to be added to the path loss reference resource may be added using the addition or modification list. The number of measurement targets to be added may be determined by a maximum measurement ID. The measurement target ID may be determined by a measurement object ID. In other words, the number of measurement target to be added may be the same as a measurement target configuration count. A measurement target that becomes unnecessary may be removed in accordance with the removal list. The operations described herein are applicable to the third embodiment and the first modification of the third embodiment. In a path loss calculation method described below, a plurality of first measurement target configurations and a plurality of second measurement target configurations are related to the path loss reference resource. The path loss reference resource may specify the plurality of first measurement target configurations and the plurality of second measurement target configurations, namely, the antenna ports 15 and 16 of the channel state information reference signal in the path loss reference resource addition or modification list. In such a case, the second path loss may be calculated in accordance with the received signal power of the antenna ports 15 and 16 for the channel state information reference signal.

In such a case, the path loss calculated from the antenna port 15 and the path loss calculated from the antenna port 16 are averaged to determine the second path loss. Alternatively, the second path loss may be one of the antenna losses whichever is smaller or whichever is greater. Alternatively, the two path losses may be linearly processed to obtain the second path loss. The antenna port 0 for the cell-specific reference signal and the antenna port 15 for the channel state information reference signal may be used. In yet another example, the second path loss reference resource may specify a plurality of second measurement target configurations, namely, the antenna ports 15 and 16 for the channel state information reference signal in the path loss reference resource addition or modification list. In such a case, the second path loss and third path loss may be calculated in accordance with the received signal power of the antenna ports 15 and 16 for the channel state information reference signal. In such a case, the first path loss, the second path loss, and the third path loss may be associated respectively with the first subframe subset, the second subframe subset, and the third subframe subset.

The base station 101 may configure a first value in the TPC command (transmission power control command) comprised in the uplink grant notified in the first subframe subset and a second value, different from the first value, in the TPC command comprised in the uplink grant notified in the first subframe subset. More specifically, the first value of the TPC command may be related to the first subframe subset and the second value of the TPC command may be related to the second subframe subset. The first value and the second value may be different from each other. The base station 101 may configure the first value to be higher than the second value. The first value and second value may be a power corrective value of the TPC command.

In one example considered, the downlink subframe may be divided into a first subset and a second subset. If the uplink grant is received in a subframe n (n is a natural number), it is naturally assumed that the downlink subframe is naturally divided into the first subset and the second subset for the terminal 102 to transmit the uplink signal in a subframe n+4. The first subset may be related to the parameter configuration related to the first uplink power control, and the second subset may be related to the parameter configuration related to the second uplink power control. More specifically, upon detecting the uplink grant in the downlink subframe comprised in the first subset, the terminal 102 calculates the path loss in accordance with a variety of information elements comprised in the parameter configuration related to the first uplink power control, and the path loss reference resource (the measurement target) comprised in the parameter configuration related to the first uplink power control, and then calculates the first uplink transmission power. Upon detecting the uplink grant in the downlink subframe comprised in the second subset, the terminal 102 calculates the path loss in accordance with a variety of information elements comprised in the parameter configuration related to the second uplink power control, and the path loss reference resource (the measurement target) comprised in the parameter configuration related to the second uplink power control, and then calculates the second uplink transmission power.

In one example, a control channel region comprising in the uplink grant is related to the parameter configuration related to uplink power control. More specifically, the base station 101 switches between the parameter configurations related to the uplink power control to be used in the calculation of the uplink transmission power depending on which control channel region (the first control channel region or the second control channel region) the terminal 102 has detected the uplink grant. More specifically, if the uplink grant is detected in the first control channel region, the terminal 102 calculates the path loss using the parameter configuration related to the first uplink power control and calculates the uplink transmission power. If the uplink grant is detected in the second control channel region, the terminal 102 calculates the path loss using the parameter configuration related to the second uplink power control, and calculates the uplink transmission power.

In the second modification of the third embodiment, the base station 101 notifies the terminal 102 of the configuration of one or more parameters related to each of first uplink power control and second uplink power control. In response to the notified information, the terminal 102 calculates the path loss (the first path loss) in accordance with the configuration of one or more parameters related to the first uplink power control, and calculates the first uplink transmission power in accordance with the first path loss and the configuration of one or more parameters related to the first uplink power control. The terminal 102 calculates the path loss (the second path loss) in accordance with the configuration of one or more parameters related to the second uplink power control, and calculates the second uplink transmission power in accordance with the second path loss and the configuration of one or more parameters related to the second uplink power control. In other words, the first uplink transmission power may always be calculated based on the measurement target notified in the configuration or one or more parameters related to the first uplink power control. The second uplink transmission power may always be calculated based on the measurement target notified in the configuration of one or more parameters related to the second uplink power control. Depending on the frequency resource and timing at which the uplink grant is detected, the terminal 102 performs control as to whether to transmit the uplink signal at the first uplink transmission power or at the second uplink transmission power.

Each of the first uplink transmission power and the second uplink transmission power may be associated in a fixed fashion with each of the configurations of one or more parameters related to the first uplink transmission power and the second uplink transmission power.

In the second modification of the third embodiment as well, the base station 101 notifies the terminal 102 of the radio resource control signal comprising the configuration of one or more parameters related to each of the first uplink power control and the second uplink power control, and also notifies the terminal 102 of the uplink grant. The terminal 102 calculates the first path loss and the first uplink transmission power on the basis of the configuration of one or more parameters related to the first uplink power control, calculates the second path loss and the second uplink transmission power on the basis of the configuration of one or more parameters related to the second uplink power control. Upon detecting the uplink grant, the terminal 102 transmits the uplink signal at the first or second uplink transmission power. To notify the uplink grant in the first subframe subset, the base station 101 configures the value of the TPC command to be the first value. To notify the uplink grant in the second subframe subset, the base station 101 configures the value of the TPC command to be the second value. The first value may be configured to be higher in power corrective value than the second value. In other words, the base station 101 may configure the values of the TPC command on the first subframe subset and the second subframe subset independently. The base station 101 performs a demodulation process in a manner such that the uplink signal transmitted in the uplink subframe in the first subframe subset is demodulated and that the uplink signal transmitted in the uplink subframe in the second subframe subset is not demodulated.

By configuring a plurality of parameters for the uplink power control, the terminal 102 may select the parameter configuration appropriate for the base station 101 or the RRH 103, and may transmit the uplink signal at the appropriate uplink transmission power to the base station 101 or the RRH 103. More specifically, at least one type of information element from among the information elements comprised in the configuration of one or more parameters related to each of the first uplink power control and the second uplink power control may be configured as a different value. For example, different attenuation coefficients α for use in fractional transmission power control in the cell may be applied to control between the base station 101 and the terminal 102 and control between the RRH 103 and the terminal 102. In such a case, the configuration of one or more parameters related to the first uplink power control is related to the transmission power control to the base station 101 and the configuration of one or more parameters related to the second uplink power control is related to the transmission power control to the RRH 103. The attenuation coefficient α comprised in each configuration may thus be configured to be appropriate. More specifically, the fractional transmission power control performed between the base station 101 and the terminal 102 is different from the fractional transmission power control performed between the RRH 103 and the terminal 102. Similarly, $P_{O\_NOMINAL\_PUSCH,c}$ and $P_{O\_UE\_PUSCH,c}$ may be configured to be different in value between the configuration of one or more parameters related to the first uplink power control and the configuration of one or more parameters related to the second uplink power control. In this way, the standard PUSCH power between the base station 101 and the terminal 102 is set to be different in value from the standard PUSCH power between the RRH 103 and the terminal 102. The same is true of other parameters.

Referring to FIG. 1, the terminal 102 may be controlled to calculate the path loss and the uplink transmission power in the uplink 106 using the parameter configuration related to the first uplink power control and to transmit the uplink signal at that transmission power. The terminal 102 may be controlled to calculate the path loss and the uplink transmission power in the uplink 108 using the parameter configuration related to the second uplink power control and to transmit the uplink signal at that transmission power.

Fourth Embodiment

A fourth embodiment is described below. The fourth embodiment relates to a configuration method of a parameter that the base station 101 needs to perform a connection process between the terminal 102 and one of the base station 101 and the RRH 103 as described below.

If the transmission of the uplink signal at the uplink transmission power to the base station (macro base station) 101 and the transmission of the uplink signal at the transmission power to the RRH 103 are performed on the same carrier component at the same timing (uplink subframe), there occur problems comprising inter-code interference, interference caused by out-of-band radiation, and expansion of desired dynamic range.

The base station 101 controls the terminal 102 so that the transmission of the uplink signal to the base station 101 is separated from the transmission of the uplink signal to the RRH 103 in the time domain. More specifically, the base station 101 configures the transmission timings of the uplink signals (PUSCH, PUCCH (CQI, PMI, SR, RI, and ACK/NACK), UL DMRS, SRS, and PRACH) so that the terminal 102 transmits the uplink signal to the base station 101 and the uplink signal to the RRH 103 at different timings. In other words, the base station 101 configures the uplink signals so that transmission to the base station 101 and the transmission to the RRH 103 do not occur at the same time. A variety of uplink physical channels comprises at least one of the uplink physical channels (uplink signals) (PUSCH, PUCCH (CQI, PMI, SR, RI, ACK/NACK), UL DMRS, SRS, and PRACH).

The base station 101 may configure a subset of the transmission timing (uplink subframe) of the uplink signal directed to the base station 101 and a subset of the transmission timing (uplink subframe) of the uplink signal directed to the RRH 103, and may configure each terminal 102 in accordance with the subsets.

The base station 101 performs the parameter configurations related to uplink power control appropriate for the base station 101 and the RRH 103 so that the transmission power is appropriate for the uplink signal to be transmitted to the base station 101 and the uplink signal to be transmitted to the RRH 103. In other words, the base station 101 performs the appropriate uplink transmission power control for the terminal 102.

The control of the base station 101 in the time domain is described below. The uplink subframe subset directed to the base station 101 may be set to be a first uplink subset, and the uplink subframe subset directed to the RRH 103 may be set to be a second uplink subset. The base station 101 configures a variety of parameters to be respective values so that each uplink signal is comprised in the first subset or the second subset depending on whether the terminal 102 is connected to the base station 101 or the RRH 103.

The configuration of the transmission subframe and the transmission period of each uplink signal is described below. The transmission subframe and the transmission period of CQI (Channel Quality Indicator) and PMI (Precoding Matrix Indicator) are configured by a CQI-PMI configuration index (cqi-pmi-ConfigIndex). The transmission subframe and the transmission period of RI (Rank Indicator) are configured by an RI configuration index. A cell-specific SRS transmission subframe (the transmission subframe and the transmission period) of the SRS (Sounding Reference signal) is configured in a cell-specific SRS subframe configuration (srs-SubframeConfig). A terminal-specific SRS transmission subframe as a subset of the cell-specific SRS transmission subframe is configured by a terminal-specific SRS configuration index (srs-ConfigIndex). The transmission subframe of PRACH is configured by a PRACH configuration index (prach-ConfigIndex). The transmission timing of SR (Scheduling Request) is configured in an SR configuration (sr-ConfigIndex).

The CQI-PMI configuration index and the RI configuration index are configured in a CQI report periodic (CQI-ReportPeriodic) comprised in a CQI report configuration (CQI-ReportConfig). The CQI report configuration is comprised in a physical configuration Dedicated.

The cell-specific SRS subframe configuration is configured in a cell-specific sounding RS UL configuration (SoundRS-UL-ConfigCommon). The terminal-specific SRS configuration index is configured in a terminal-specific sounding RS UL configuration (SoundingRS-UL-ConfigDedicated). The cell-specific sounding RS UL configuration is comprised in a cell-specific radio resource configuration SIB and a common radio resource configuration. The terminal-specific sounding RS UL configuration is comprised in a dedicated radio resource configuration.

The PRACH configuration index is configured in PRACH configuration information (PRACH-ConfigInfo). The PRACH configuration information is comprised in PRACH SIB (PRACH-ConfigSIB) and a PRACH configuration (PRACH-Config). The PRACH configuration SIB is comprised in common radio resource SIB, and the PRACH configuration is comprised in the common radio resource configuration.

The SR configuration index is comprised in a scheduling request configuration (SchedulingRequestConfig). The scheduling request configuration is comprised in the dedicated physical configuration.

The PUSCH, the aperiodic CSI and the aperiodic SRS are transmitted in the uplink subframe based on the downlink subframe where the uplink grant is detected. For this reason, the base station 101 can perform control as to whether to perform transmission to the terminal 102 in a first uplink subset or in a second uplink subset by controlling the notification timing of the uplink grant.

By configuring the index related to the transmission timing of each uplink signal in the first uplink subset or in the second uplink subset, the base station 101 performs the uplink transmission control for the terminal so that the uplink signal directed to the base station 101 and the uplink signal directed to the RRH 103 do not interfere with each other.

The resource allocation, the transmission timing and the transmission power control of each uplink signal are configurable for the secondary cell. More specifically, cell/terminal-specific SRS configuration is performed in a secondary-cell-specific manner. The transmission timing and the transmission resource of the PUSCH are indicated by the uplink grant.

As described with reference to the third embodiment, the parameter related to the uplink transmission power control is configurable for a secondary cell.

Control of the transmission power of PRACH is described. Initial transmission power of the PRACH is calculated based on preamble initial reception target power (preambleInitialReceivedTargetPower). If a random access fails between the base station and the terminal, the transmission power of PRACH is increased by a predetermined amount using a power ramping step (powerRampingStep). A random access where the transmission operation is performed with increased power in the PRACH (Physical Random Access Channel) may repeatedly fail, and maximum transmission power of the terminal 102 may be exceeded, or a maximum transmission count of PRACH may be exceeded. In such a case, the terminal 102 determines that the random access has failed, and notifies higher layer of the occurrence of a random access problem (RAP). Upon being notified of the random access problem, the higher layer determines that a radio link failure (RLF) has been detected.

The common resource configuration comprises P_MAX representing the maximum transmission power of the terminal 102. The common radio resource configuration for secondary cell also comprises P_MAX. The base station 101 may configure the terminal 102 for the maximum transmission power specific to the primary cell or the secondary cell.

The uplink transmission power of PUSCH, PUCCH and SRS has been described with reference to the third embodiment.

In one example, the base station 101 performs configuration so that the common/dedicated radio resource configuration notified using system information, and PUSCH/PUCCH/SRS/PRACH configuration (index) in the time domain comprised in the dedicated physical configuration are comprised in a first uplink subframe subset. Subsequent to the establishment of the RRC connection, the base station 101 learns which (the base station 101 or the RRH 103) is closer to the terminal 102 by performing the channel measurement on the terminal 102 connected to the base station 101 and the terminal 102 connected to the RRH 103. If the base station 101 determines that the measured terminal 102 is closer to the base station 101 than to the RRH 103, no particular change is performed on the configurations. If the base station 101 determines that the measured terminal 102 is closer to the RRH 103 than to the base station 101, the base station 101 notifies the terminal 102 of reconfiguration information appropriate for the connection with the RRH 103 (such as transmission power control information and transmission timing information).

The transmission power control information is a collective term representing transmission power control for each uplink signal. For example, the transmission power control information comprises a variety of information elements comprised in the parameter configuration related to uplink power control, and the TPC command. The transmission timing information is a collective term representing transmission timing of the uplink signal. For example, the transmission timing information comprises control information (such as the SRS subframe configuration and the CQI-PMI configuration index) related to the transmission timing.

The transmission control (the uplink transmission timing control) of the uplink signal to the base station 101 or the RRH 103 is described. The base station 101 determines in accordance with the measurement results on each terminal whether the terminal 102 is closer to the base station 101 or to the RRH 103. In a case that the base station 101 determines in accordance with the measurement results (measurement report) that the terminal 102 is closer to the base station 101 than to the RRH 103, the base station 101 configures the transmission timing information of each uplink signal to be comprised in the first uplink subset, and configures the transmission power information to be a value appropriate for the base station 101. In this case, there may be cases where the base station 101 does not notify the terminal 102 of the information for the reconfiguration.

There may also be cases where the initial configuration remains the same. Upon determining that the terminal 102 is closer to the RRH 103 than to the base station 101, the base station 101 configures the transmission timing information of each uplink signal to be comprised in the second uplink subset, and configures the transmission power information to be a value appropriate for the RRH 103. In this way, the base station 101 controls the terminal 102 to change the transmission timings to the base station 101 and the RRH 103 so that the uplink signal to the base station 101 and the uplink signal to the RRH 103 do not interfere with each other. Let terminal A represent a terminal 102 in communication with the base station 101, and terminal B represent a terminal 102 in communication with the RRH 103. The base station 101 may configure a variety of configuration indexes comprising a transmission timing so that the terminal B does not transmit at the same transmission timing as the transmission timing of the terminal A. For example, the terminal A may be configured to be different from the terminal B in the value of the terminal-specific SRS subframe configuration.

As described with reference to the third embodiment, the base station 101 may associate the first uplink subset and the second uplink subset with the measurement targets thereof.

The above procedure is described more in detail. The base station 101 and/or the RRH 103 broadcasts the terminal 102 of broadcast information that specifies the subframe in the first uplink subset as the PRACH configuration in the time domain. In accordance with the broadcast information, the terminal 102 prior to an initial access or the terminal 102 in an RRC idle state attempts an initial access using the PRACH resource in one of the subframes in the first uplink subset. The PRACH transmission power then is configured with reference to CRS transmitted by the base station 101 or both the base station 101 and the RRH 103. For this reason, the transmission power becomes relatively higher, thereby permitting the PRACH transmission to reach the base station 101.

Configured subsequent to the RRC connection establishment through the random access procedure or in the middle of the RRC connection establishment through the random access procedure are a semi-statically allocated PUCCH resource for the periodic CSI and ACK/NACK, a semi-statically allocated SRS resource, and a semi-statically allocated PUCCH for SR. All these resources are resources in the subframe in the first uplink subset. The base station 101 schedules (allocates) to the terminal 102 the PDSCH that allows ACK/NACK to be transmitted using the PUSCH in a subframe belonging to the first uplink subset or using the PUCCH in a subframe belonging to the first uplink subset. The transmission power for each of the PUSCH, the PUCCH and the SRS is configured with reference to the CRS transmitted by the base station 101 or by both the base station 101 and the RRH 103. For this reason, the transmission power becomes relatively higher, thereby permitting the PUSCH, PUCCH and SRS transmissions to reach the base station 101. In this way, the terminal 102 configured to perform the uplink transmission at relatively higher transmission power (the transmission power high enough to compensate for a loss between the base station 101 and the terminal 102) uses a subframe in the first uplink subset only.

The base station 101 determines (judges) whether the terminal 102 is to transmit the uplink signal to the base station 101 or the RRH 103. In other words, the base station 101 determines whether the terminal 102 is to transmit the uplink signal at the transmission power high enough to compensate for the loss between the base station 101 and the terminal 102 or at the transmission power high enough to compensate for the loss between the RRH 103 and the terminal 102. This determination criterion may be derived from calculating, from the measurement result, which of the base station 101 and the RRH 103 the terminal 102 is closer to, or another determination criterion may be used. For example, the RRH 103 may receive a signal such as the SRS signal transmitted by the terminal 102 in the subframe in the first uplink subset and may perform the determination based on the power of the received signal. If the base station 101 determines that the terminal 102 is to transmit the uplink signal to the base station 101, the terminal 102 continues the uplink communication using the subframe in the first uplink subset only.

If the base station 101 determines that the terminal 102 is to transmit the uplink signal to the RRH 103, the parameter related to uplink power control from among these parameters is configured so that the uplink transmission is to be performed on these resources at relatively lower transmission power (the transmission power high enough to compensate for the loss between the RRH 103 and the terminal 102). The configuration for lower transmission power may be performed in accordance with the method described with reference to each of the embodiments. Alternatively, other methods may be used, such as a method of gradually decreasing the transmission power by repeating closed loop transmission power control, or a method of updating the configuration of a CRS power value and a channel loss compensation coefficient $\alpha$ in the system information through a handover procedure.

Upon determining that the terminal 102 is to transmit the uplink signal to the RRH 103, the base station 101 reconfigures the semi-statically allocated PUCCH resource for the periodic CSI and ACK/NACK, the semi-statically allocated SRS resource, and the semi-statically allocated PUCCH for the SR. All these resources are resources in the subframe in the second uplink subset. The base station 101 updates the configuration of the PRACH resource in the system information through the handover procedure (mobility control procedure). All PRACH resources are resources in the subframe in the second uplink subset. The base station 101 schedules (allocates) to the terminal 102 the PDSCH that allows ACK/NACK to be transmitted using the PUSCH in a subframe belonging to the second uplink subset or using the PUCCH in a subframe belonging to the second uplink subset. The terminal 102 that performs uplink transmission at relatively lower transmission power (the transmission power high enough to compensate for the loss between the RRH 103 and the terminal 102) uses the subframes in the second uplink subset only.

The terminal 102 that performs uplink transmission at relatively higher transmission power (the transmission power high enough to compensate for the loss between the base station 101 and the terminal 102) uses the subframes in the first uplink subset while the terminal 102 that performs uplink transmission at relatively lower transmission power (the transmission power high enough to compensate for the loss between the RRH 103 and the terminal 102) uses the subframe in the second uplink subset only. In this way, the subframe received by the base station 101 is separated from the subframe received by the RRH 103 in the time domain. Since this arrangement eliminates the need to concurrently process the reception of the signal at the higher reception power and the signal at the lower reception power, interference is controlled. Also, required dynamic range is narrowed in the base station 101 and the RRH 103.

The transmission control (uplink transmission resource control) of the uplink signal to the base station 101 or the RRH 103 during carrier aggregation is described below. It is now assumed that the base station 101 configures the terminal 102 for the two carrier components (the first carrier component and the second carrier component) and that the first carrier component is configured to be in the primary cell, and that the second carrier component is configured to be in the secondary cell. Upon determining from the measurement results that the terminal 102 (terminal A) is closer to the base station 101 than to the RRH 103, the base station 101 configures the secondary cell to be deactivated. In other words, the terminal A performs communications using the primary cell only without using the secondary cell.

Upon determining that the terminal 102 (terminal B) is closer to the RRH 103 than to the base station 101, the base station 101 activates the secondary cell. In other words, the terminal B communicates with the base station 101 and the RRH 103 using not only the primary cell but also the secondary cell. The base station 101 assigns a resource appropriate for the transmission to the RRH 103 to the secondary cell configuration of the terminal B, thereby configuring the transmission power control. More specifically, the base station 101 performs control to calculate the path loss and the uplink transmission power on the assumption that the path loss measurement of the secondary cell is performed on the transmission from the RRH 103 to the terminal 102. The uplink signal transmitted by the terminal B in the secondary cell comprises the PUSCH, the UL DMRS for PUSCH demodulation, and the SRS signal. The PUCCH (CQI, PMI, and RI), the UL DMRS for the PUCCH demodulation, and the PRACH signal are transmitted in the primary cell.

In a case that the higher layer allows the terminal B to perform the concurrent PUSCH and PUCCH transmissions, control is performed so that the PUCCH transmission is performed in the primary cell and so that the PUSCH transmission is performed in the secondary cell. In this case, the base station 101 controls the terminal B so that the transmission power in the primary cell is appropriate for the base station 101 and so that the transmission power in the secondary cell is appropriate for the RRH 103. In a case that the higher layer allows the terminal A to perform the concurrent PUSCH and PUCCH transmissions, the base station 101 controls the terminal A so that both the PUSCH transmission and the PUCCH transmission are performed in the primary cell. More specifically, the base station 101 controls the uplink signal to the base station 101 and the uplink signal to the RRH 103 by changing the transmission resource, and thus controls the terminals 102 so that the signals do not interfere with each other.

Using the handover with the terminal B, the base station 101 may reconfigure the first carrier component to be in the secondary cell and the second carrier component to be in the primary cell. In this case, the terminal B performs the same process as the process of the terminal A described above. In other words, the terminal B deactivates the secondary cell. The terminal B performs communications with the RRH 103 in the primary cell only without using the secondary cell. The terminal B is controlled to transmit all the uplink signals in the primary cell. In this case, all the uplink transmission power to be performed is the uplink transmission power control directed to the RRH 103. More specifically, the PUSCH, PUCCH, PRACH, SRS signals are reconfigured to be transmission power directed to the RRH 103. The reconfiguration information in this case is comprised in the RRC connection reconfiguration.

The base station 101 may control the terminal not to communicate using the second carrier component at higher power by configuring an access (transmission) restriction (ac-BarringFactor) on uplink transmission power in the carrier component or in the cell.

As described with reference to the third embodiment, the base station 101 may associate measurement targets with the first carrier component and the second carrier component, or the primary cell and the secondary cell, respectively.

The above process is described below from a different viewpoint. The base station 101 and the RRH 103 perform communications using a combination of carrier components that is a subset of the two downlink carrier components (i.e., component carriers) and the two uplink carrier components (i.e., component carriers). The base station 101 and/or the RRH 103 broadcasts, in the second downlink carrier component, broadcast information that restricts initial access (that precludes the initial access). On the other hand, in the first downlink carrier component, the base station 101 and/or the RRH 103 broadcasts broadcast information that enables initial access (does not broadcast the broadcast information that precludes the initial access). In response to the acquired broadcast information, the terminal prior to the initial access or the terminal 102 in the RRC idle state attempts the initial access using the PRACH resource in the first uplink carrier component instead of the second uplink carrier component. The PRACH transmission power is configured with reference to CRS transmitted in the first downlink carrier component by the base station 101 or both the base station 101 and RRH 103. For this reason, the transmission power becomes relatively higher, thereby permitting the PRACH signal to reach the base station 101.

Configured subsequent to the RRC connection establishment through the random access procedure or in the middle of the RRC connection establishment through the random access procedure, one or more PUCCH resources are semi-statically allocated for the periodic CSI and ACK/NACK, the semi-statically allocated SRS resource, and the semi-statically allocated PUCCH for SR. These resources configured are resources in the subframe in the first uplink carrier component, namely, resources in the primary cell (PCell: a cell using the first downlink carrier component and the first uplink carrier component). The base station 101 schedules (allocates), for the terminal 102, the PUSCH in the first uplink carrier component. The terminal 102 transmits ACK/NACK for the PDSCH in the first downlink carrier component using the PUCCH in the first uplink carrier component. The transmission power for each of the PUSCH, the PUCCH and the SRS is configured with reference to the CRS transmitted by the base station 101 or by both the base station 101 and the RRH 103. For this reason, the transmission power becomes relatively higher, thereby permitting the PUSCH, PUCCH and SRS transmissions to reach the base station 101.

In a case that the carrier aggregation is to be performed, the secondary cell (SCell) is configured as a cell using the second downlink carrier component (and maybe using no uplink carrier component). A resource in the first uplink carrier component, namely, a resource in the PCell is configured as the semi-statically allocated PUCCH resource for the periodic CSI and ACK/NACK. The terminal 102 transmits ACK/NACK for the PDSCH in the second downlink carrier component (SCell) using the PUCCH in the first uplink carrier component (PCell). The transmission power for each of the PUSCH, the PUCCH and the SRS is configured with reference to the CRS transmitted by the base station 101 or by both the base station 101 and the RRH 103. For this reason, the transmission power becomes relatively higher, thereby permitting the PUSCH, PUCCH and SRS transmissions to reach the base station 101. Regardless of whether the carrier aggregation is to be performed or not, the terminal 102 that performs uplink transmission at relatively higher transmission power (the transmission power high enough to compensate for the loss between the base station 101 and the terminal 102) uses only the first uplink carrier component.

The base station 101 determines whether the terminal 102 is to transmit the uplink signal to the base station 101 or the RRH 103. In other words, the base station 101 determines whether the terminal 102 is to transmit the uplink signal at the transmission power high enough to compensate for the loss between the base station 101 and the terminal 102 or at the transmission power high enough to compensate for the loss between the RRH 103 and the terminal 102. This determination criterion may be derived in accordance with the methods described above. If the base station 101 determines that the terminal 102 is to transmit the uplink signal to the base station 101, the terminal 102 continues the uplink communication using only the first uplink carrier component, namely, the communication with the PCell as a cell using the first downlink carrier component and the first uplink carrier component.

If the base station 101 determines that the terminal 102 is to transmit the uplink signal to the RRH 103, the base station 101 changes the PCell using the handover procedure. More specifically, the base station 101 changes from the PCell using the first downlink carrier component and the first uplink carrier component to the PCell using the second downlink carrier component and the second uplink carrier component. During the handover procedure, the parameter related to uplink power control from among these parameters is configured so that the uplink transmission is to be performed at relatively lower transmission power (the transmission power high enough to compensate for the loss between the RRH 103 and the terminal 102). Other methods may be used, such as a method of updating the configuration of a CRS power value, a channel loss compensation coefficient α, and an initial value of the uplink transmission power in the system information. Also, the system information that does not restricts the initial access may be configured.

If the PCell is changed, a random access procedure is performed in the second uplink carrier component to establish the RRC connection. Reconfigured subsequent to the RRC connection establishment through the random access procedure or in the middle of the RRC connection establishment through the random access procedure are the semi-statically allocated PUCCH resource for the periodic CSI and ACK/NACK, the semi-statically allocated SRS resource, and the semi-statically allocated PUCCH for SR. All these resources configured are resources in the second uplink carrier component. The base station 101 schedules (allocates) to the terminal 102 the PDSCH to transmit ACK/NACK using the PUSCH in the second uplink carrier component or the PUCCH in the second uplink carrier component. The parameter related to the uplink power control is configured so that the transmission power of the PUSCH, the PUCCH, and the SRS becomes relatively lower power (the transmission power high enough to compensate for the loss between the RRH 103 and the terminal 102).

In a case that the carrier aggregation is to be performed, the SCell is configured as a cell using the first downlink carrier component (and maybe using no uplink carrier component). A resource in the second uplink carrier component, namely, a resource in the PCell is configured as the semi-statically allocated PUCCH resource for the periodic CSI and ACK/NACK in the SCell. The terminal 102 transmits ACK/NACK for the PDSCH in the SCell using the PUCCH in the second uplink carrier component. The parameter related to the uplink power control is configured so that the transmission power for the PUCCH becomes relatively lower power (the transmission power high enough to compensate for the loss between the RRH 103 and the terminal 102). Regardless of whether the carrier aggregation is to be performed or not, the terminal 102 that performs uplink transmission at relatively lower transmission power (the transmission power high enough to compensate for the loss between the RRH 103 and the terminal 102) uses only the second uplink carrier component.

As described above, the terminal 102 that performs uplink transmission at relatively higher transmission power (the transmission power high enough to compensate for the loss between the base station 101 and the terminal 102) uses the first uplink carrier component. The terminal 102 that performs uplink transmission at relatively lower transmission power (the transmission power high enough to compensate for the loss between the RRH 103 and the terminal 102) uses only the second uplink carrier component. In this way, the subframe received by the base station 101 and the subframe received by the RRH 103 are separated in the frequency domain. Since this arrangement eliminates the need to concurrently process the reception of the signal at the higher reception power and the signal at the lower reception power, interference is controlled. Also, required dynamic range is narrowed in the base station 101 and the RRH 103.

The transmission control (comprising in uplink signal transmission power control) for the uplink signal to the base station 101 or the RRH 103 in the control channel (PDCCH) region comprising the uplink grant is described below. Upon determining from the measurement results that a given terminal (terminal A) is closer to the base station 101 than to the RRH 103, the base station 101 performs dynamic transmission control for the uplink signal of the terminal A in the first control channel (PDCCH) region only. Upon determining from the measurement results that a given terminal (terminal B) is closer to the RRH 103 than to the base station 101, the base station 101 performs dynamic transmission control for the uplink signal of the terminal B in the second control channel (X-PDCCH) region only. In order to cause the terminal 102 to transmit the uplink signal to the base station 101, the base station 101 notifies the terminal 102 of the uplink grant comprised in the first control channel region. In order to cause the terminal 102 to transmit the uplink signal to the RRH 103, the base station 101 notifies the terminal 102 of the uplink grant comprised in the second control channel region.

The base station 101 may perform the transmission power control of the uplink signal to the base station 101 or the RRH 103 using the TPC command that is a corrective value of the transmission power control for the uplink signal comprised in the uplink grant. The base station 101 configures for the base station 101 or the RRH 103 the TPC command value comprised in the uplink grant using the control channel region that notifies the uplink grant. More specifically, to increase the uplink transmission power to the base station 101, the base station 101 configures the power corrective value of the TPC command in the first control channel region to be higher. To decrease the uplink transmission power to the RRH 103, the base station 101 configures the power corrective value of the TPC command in the second control channel region to be lower. The base station 101 performs, for the terminal A, the transmission of the uplink signal in the first control channel region and the uplink transmission power control, and performs, for the terminal B, the transmission of the uplink signal in the second control channel and the uplink transmission power control. More specifically, the base station 101 configures the TPC command to the base station 101 (the transmission power control command) to be a first value, and configures the TPC command to the RRH 103 (the transmission power control command) to be a second value. The base station 101 may configure the first value to be higher in power corrective value that the second value.

As described with reference to the third embodiment, the base station 101 may associate the first control channel region and the second control channel region with measurement targets thereof.

In accordance with the fourth embodiment, the base station 101 may configure transmission timing information of a physical random access channel comprised in the system information to be in a subframe in the first subframe subset, may configure transmission timing information of a variety of uplink physical channels to be in a subframe in the first subframe subset, and may reconfigure the radio resource control information in some terminals 102. In this case, the base station 101 configures the transmission timing information for the physical random access channel comprised in the radio resource control signal to be in a subframe in the second subframe subset different from the first subframe subset, and configures the transmission timing information of the variety of uplink physical channels to be in a subframe in the second subframe subset.

The base station 101 may configure the transmission power control information of the variety of uplink signals in association with the first subframe subset as first transmission power control information and may reconfigure the terminal 102 for the radio resource control information. In such a case, the base station 101 configures the transmission power control information of the variety of uplink signals in association with the second subframe subset as second transmission power control information.

The base station 101 configures the first transmission power control information for the terminal 102 that transmits the uplink signal in the first subframe subset. The base station 101 configures the second transmission power control information for the terminal 102 that transmits the uplink signal in the second subframe subset.

In accordance with the fourth embodiment, the base station 101 transmits a signal in the first downlink carrier component and the second downlink carrier component, and configures the first transmission power control information as primary-cell-specific transmission power control information for the terminal 102 where the first downlink carrier component is configured as the primary cell. The base station 101 configures the second transmission power control information as the primary-cell-specific transmission power control information for the terminal 102 where the second downlink carrier component is configured as a primary cell.

The base station 101 receives a signal in the first uplink carrier component and the second uplink carrier component, and configures the first transmission power control information for the terminal 102 that performs communications in the first uplink carrier component, and configures the second transmission power control information for the terminal 102 that performs communications in the second uplink carrier component.

The base station 101 controls a terminal 102 accessing the base station 101 and a terminal 102 accessing the RRH 103 in terms of the transmission of the uplink signal from each terminal 102 using the control channel region comprising time, frequency, and the uplink grant. The base station 101 appropriately performs transmission timing control, radio resource control, and uplink transmission power control.

The base station 101 configures a variety of parameters to appropriate values, the parameters related to the transmission power control information and the transmission timing information related to the uplink signal comprised in the system information. Subsequent to the initial connection establishment (RRC connection establishment), the base station 101 communicates with the terminal 102, and determines based on channel measurement results whether the terminal 102 is closer to the base station 101 or the RRH 103. Upon determining that the terminal 102 is closer to the base station 101, the base station 101 does not notify the terminal 102 of any particular configuration information, or alternatively, the base station 101 configures the transmission power control information, transmission timing control information, and transmission resource control information more appropriate for communications with the base station 101, and notifies the configuration information to the terminal 102 in RRC connection configuration. Upon determining that the terminal 102 is closer to the RRH 103, the base station 101 configures the transmission power control information, the transmission timing control information, and the transmission resource control information more appropriate for communications with the RRH 103, and notifies the configuration information to the terminal 102.

In the above discussion of each of the embodiments, the resource element and the resource block are used as a mapping unit of each of information data signal, control information signal, PDSCH, PDCCH, and reference signal, and the subframe and the radio frame are used as a transmission unit in the time domain. The present invention is not limited to this arrangement. If a region in the frequency domain and the time domain or a time unit is substituted for these units, the same advantages are provided. In the above discussion of each of the embodiments, demodulation is performed using a precoded RS, and the port supporting the precoded RS is a port equivalent to the MIMO layer. The present invention is not limited to this arrangement. Furthermore, the same advantages are provided by applying the present invention to ports supporting mutually different reference signals. For example, an unprecoded (nonprecoded) RS may be used in place of the precoded RS, and a port equivalent to an output terminal subsequent to the precoding process or a port equivalent to a physical antenna (or a combination of physical antennas) may be used.

In the description of the embodiments, uplink/downlink coordinated communication is performed in a network comprising the base station 101, the terminal 102 and the RRH 103. The present invention is applicable to a coordinated communication performed in a network comprising two or more base stations 101 and a terminal 102, applicable to a coordinated communication performed in a network comprising two or more base stations 101, an RRH 103, and a terminal 102, applicable to a coordinated communication performed in a network comprising two or more base stations 101 or the RRH 103 and the terminal 102, applicable to a coordinated communication performed in a network comprising two or more base stations 101, two or more RRHs 103, and a terminal 102, and applicable to a coordinated communication performed in a network comprising two or more transmit points/receive points. In the discussion of the embodiments, the base station 101 performs the uplink transmission power control appropriate for the base station 101 or the RRH 103 whichever is closer to the terminal 102 by referring to the path loss calculation. The base station 101 may perform the same uplink transmission power control appropriate for the base station 101 or the RRH 103 whichever is farther from the terminal 102.

(a) The present invention may be embodied as described below. More specifically, the present invention in one aspect relates to a terminal in communication with a base station. The terminal comprises a unit configured to receive information related to a configuration of one or more parameters of uplink power control using a radio resource control signal, a unit configured to receive information related to a first measurement target configuration and information related to a second measurement target configuration using the radio resource control signal, a unit configured to calculate a first path loss and first uplink transmission power on the basis of a first measurement target configured in the information related to the first measurement target configuration and the information related to the configuration of the parameter of the uplink power control, and a unit configured to calculate a second path loss and second uplink transmission power in accordance with a second measurement target configured in the information related to the second measurement target configuration and the information related to the configuration of one or more parameters of the uplink power control.

(b) In the terminal in one aspect of the present invention, the first measurement target comprises an index related to a cell-specific reference signal antenna port 0.

(c) In the terminal in one aspect of the present invention, the second measurement target comprises an index related to an antenna port index for a channel state information reference signal.

(d) In the terminal in one aspect of the present invention, the second measurement target comprises an index that is determined by a third reference signal configuration.

(e) The terminal in one aspect of the present invention receives an uplink grant, transmits an uplink signal at the first uplink transmission power in a case that the uplink grant is detected in a control channel region of a primary cell, and transmits the uplink signal at the second uplink transmission power in a case that the uplink grant is detected in a control channel region of a secondary cell.

(f) The terminal in one aspect of the present invention receives an uplink grant comprising a carrier indicator, transmits to the base station an uplink signal at the first uplink transmission power in a case that the carrier indicator comprised in the uplink grant indicates a primary cell, and transmits to the base station the uplink signal at the second uplink transmission power in a case that the carrier indicator comprised in the uplink grant indicates a secondary cell.

(g) The terminal in one aspect of the present invention receives an uplink grant, transmits to the base station an uplink signal at the first uplink transmission power in a case that the uplink grant is detected in a downlink subframe comprised in a first subframe subset, and transmits to the base station the uplink signal at the second uplink transmission power in a case that the uplink grant is detected in a downlink subframe comprised in a second subframe subset.

(h) The terminal in one aspect of the present invention receives an uplink grant, transmits an uplink signal at the first uplink transmission power in a case that the uplink grant is detected in a first control channel region, and transmits the uplink signal at the second uplink transmission power in a case that the uplink grant is detected in a second control channel region.

(i) A communication system in one aspect of the present invention comprises a base station and a terminal. The base station notifies the terminal of information related to a first measurement target configuration and information related to a second measurement target configuration using a radio resource control signal, and notifies the terminal of information related to a configuration of one or more parameters of uplink power control using the radio resource control signal. The terminal calculates a first path loss and first uplink transmission power in accordance with a first measurement target comprised in the information related to the first measurement target configuration and the information related to the configuration of one or more parameters of the uplink power control, and calculates a second path loss and second uplink transmission power in accordance with a second measurement target comprised in the information related to the second measurement target configuration and the information related to the configuration of one or more parameters of the uplink power control.

(j) In the communication system in one aspect of the present invention, the base station notifies the terminal of an uplink grant. The terminal transmits to the base station an uplink signal at the first uplink transmission power in a case that the uplink grant is detected in a control channel region of a primary cell, and transmits to the base station the uplink signal at the second uplink transmission power in a case that the uplink grant is detected in a control channel region of a secondary cell.

(k) In the communication system in one aspect of the present invention, the base station notifies the terminal of the uplink grant comprising a carrier indicator. The terminal transmits to the base station an uplink signal at the first uplink transmission power in a case that the carrier indicator comprised in the uplink grant indicates a primary cell, and transmits to the base station the uplink signal at the second uplink transmission power in a case that the carrier indicator comprised in the uplink grant indicates a secondary cell.

(l) In the communication system in one aspect of the present invention, the base station notifies the terminal of an uplink grant. The terminal transmits to the base station an uplink signal at the first uplink transmission power in a case that the uplink grant is detected in a downlink subframe comprised in a first subframe subset, and transmits to the base station the uplink signal at the second uplink transmission power in a case that the uplink grant is detected in a downlink subframe comprised in a second subframe subset different from the first subframe subset.

(m) In the communication system in one aspect of the present invention, the first subframe subset comprises a subframe that comprises at least one subframe comprising a first synchronization signal or a second synchronization signal, and a physical broadcast channel.

(n) In the communication system in one aspect of the present invention, the base station notifies the terminal of an uplink grant. The terminal transmits an uplink signal at the first uplink transmission power in a case that the uplink grant is detected in a first control channel region, and transmits the uplink signal at the second uplink transmission power in a case that the uplink grant is detected in a second control channel region.

(o) In one aspect of the present invention, a communication method of a terminal in communication with a base station, comprises a step of receiving information related to a configuration of one or more parameters of uplink power control comprised in a radio resource control signal, a step of receiving information related to a first measurement target configuration and information related to a second measurement target configuration comprised in the radio resource control signal, a step of calculating a first path loss and first uplink transmission power in accordance with a first measurement target comprised in the information related to the first measurement target configuration and the information related to the configuration of one or more parameters of the uplink power control, and a step of calculating a second path loss and second uplink transmission power in accordance with a second measurement target comprised in the information related to the second measurement target configuration and the information related to the configuration of one or more parameters of the uplink power control.

(p) The communication method in one aspect of the present invention comprises receiving an uplink grant, transmitting an uplink signal at the first uplink transmission power in a case that the uplink grant is detected in a control channel region of a primary cell, and transmitting the uplink signal at the second uplink transmission power in a case that the uplink grant is detected in a control channel region in a secondary cell.

(q) The communication method in one aspect of the present invention comprises receiving the uplink grant comprising a carrier indicator, transmitting to the base station an uplink signal at the first uplink transmission power in a case that the carrier indicator comprised in the uplink grant indicates a primary cell, and transmitting to the base station the uplink signal at the second uplink transmission power in a case that the carrier indicator comprised in the uplink grant indicates a secondary cell.

(r) The communication method in one aspect of the present invention comprises receiving an uplink grant, transmitting to the base station an uplink signal at the first uplink transmission power in a case that the uplink grant is detected in a downlink subframe comprised in a first subframe subset, and transmitting to the base station the uplink signal at the second uplink transmission power in a case that the uplink grant is detected in a downlink subframe comprised in a second subframe subset.

(s) The communication method in one aspect of the present invention comprises receiving an uplink grant, transmitting an uplink signal at the first uplink transmission power in a case that the uplink grant is detected in a first control channel region, and transmitting the uplink signal at the second uplink transmission power in a case that the uplink grant is detected in a second control channel region.

Transmission power values of the uplink signal and transmission timings are switched depending on the frequency resource and timing at which the uplink grant is detected. Even if terminals greatly different in uplink transmission power are configured, control process is thus performed so that one terminal is not to become an interference source to another terminal.

A program running on the base station 101 and the terminal 102 of the present invention is a program that controls a CPU (a program for causing a computer to function) in a manner such that the functions of the embodiments of the present invention are implemented. Information handled by the devices may be temporarily stored on a RAM during process, and then stored on a variety of ROMs or HDD. The information may be read, corrected, or written by the CPU as necessary. Recording media storing the program may comprise semiconductor memories (such as a ROM or a non-volatile memory card), optical recording media (such as DVD, MO, MD, CD, or BD), and magnetic recording media (such as a magnetic tape or a flexible disk). The functions of the embodiments are implemented by executing the loaded program. The functions of the invention may also be implemented in conjunction with an operating system or another application program in response to an instruction of the program.

To circulate the program in the market, the program may be supplied in a stored state on a portable recording medium, or is transferred to a server computer via a network such as the Internet. In such a case, a storage device in the server computer also falls within the scope of the present invention. Whole or part of the base station 101 and the terminal 102 may be implemented as LSI as a typical integrated circuit. Each function block in the base station 101 and the terminal 102 may be individually integrated into a chip. Alternatively, all or some of the function blocks may be integrated into a chip. The integrated form may not be limited to LSI. The integrated form may be a dedicated circuit, or a general-purpose processor. If a technique of circuit integration replacing the LSI appears with the advance of semiconductor technique, an integrated circuit resulting from the technique may also be used.

The embodiments of the present invention have been described in detail with reference to the drawings. A specific structure of each embodiment is not limited to the structures described above. A variety of design changes is possible without departing from the scope of the present invention. A variety of modification is possible without departing from the scope of the prevent invention defined by the claims. An embodiment resulting from combining technical means disclosed in the different embodiments may also fall within the scope of the present invention. The embodiments comprise elements that may have similar functions, and if an embodiment is constructed by interchanging the elements having the similar functions, such an embodiment may also fall within the scope of the present invention. The present invention finds applications in a radio base station apparatus, a radio terminal apparatus, a radio communication system, and a radio communication method.

REFERENCE SIGNS LIST 101 and 3401 Base stations
102, 3402, 3403, 3504, and 3604 Terminals 103, 3502, and 3602 RRHs
104, 3503, and 3603 Communication lines
105, 107, 3404, 3405, 3505, and 3506 Downlinks
106, 108, 3605, and 3606 Uplinks
501 Higher layer processor
503 Controller
505 Receiver
507 Transmitter
509 Channel measurement unit
511 Transmit and receive antenna
5011 Radio resource control unit
5013 SRS configurator
5015 Transmission power configurator
5051 Decoder
5053 Demodulator
5055 Demultiplexer
5057 Radio reception unit
5071 Encoder
5073 Modulator
5075 Multiplexer
5077 Radio transmission unit
5079 Downlink reference signal generator
601 Higher layer processor
603 Controller
605 Receiver
607 Transmitter
609 Channel measurement unit
611 Transmit and receive antenna
6011 Radio resource control unit
6013 SRS control unit
6015 Transmission power control unit
6051 Decoder
6053 Demodulator
6055 Demultiplexer
6057 Radio reception unit
6071 Encoder
6073 Modulator
6075 Multiplexer
6077 Radio transmission unit
6079 Uplink reference signal generator
3501 and 3601 Macro base stations

The invention claimed is:

1. A terminal apparatus configured to communicate with a base station apparatus, the terminal apparatus comprising:
   a receiving circuit configured to:
      receive a higher layer signal including an uplink power control configuration, and
      receive an uplink grant; and
   a transmitting circuit configured to:
      transmit a PUSCH (physical uplink shared channel) based on the uplink grant, wherein
      the uplink power control configuration includes first parameters for a first subframe set, second parameters for a second subframe set, and a third parameter for a pathloss reference configuration, the third parameter specifying a serving cell, the serving cell being either a primary cell or a secondary cell; and
   the transmitting circuit is further configured to:
      calculate a first pathloss for transmission to the primary cell based on a reference signal from the primary cell, and a second pathloss for transmission to the secondary cell based on a second reference signal from the serving cell specified by the third parameter, wherein an index of the second reference signal corresponds to the third parameter;
      set a first transmit power for the PUSCH on a first subframe belonging to the first subframe set and being after a configured number of subframes from reception of the uplink grant, the first transmit power being based on the first parameters, the first pathloss and a power correction value, the power correction value being included in the uplink grant, and
      set a second transmit power for the PUSCH on a second subframe belonging to the second subframe set and being after the configured number of subframes from reception of the uplink grant, the second transmit power being based on the second parameters, the second pathloss and the power correction value,
   and wherein
   the first transmit power is based on the first parameters for the primary cell in a first case that the uplink grant is an uplink grant from the primary cell,
   the first transmit power is based on the first parameters for the secondary cell in a second case that the uplink grant is an uplink grant from the secondary cell,
   the second transmit power is based on the second parameters for the primary cell in a third case that the uplink grant is an uplink grant from the primary cell, and
   the second transmit power is based on the second parameters for the secondary cell in a fourth case that the uplink grant is an uplink grant from the secondary cell.

2. The terminal apparatus according to claim 1, wherein
   the first parameters are a nominal PUSCH power and a user equipment specific PUSCH power for the first subframe set, and
   the second parameters are a nominal PUSCH power and a user equipment specific PUSCH power for the second subframe set.

3. A communication method for a terminal apparatus configured to communicate with a base station apparatus, the communication method comprising:
   receiving a higher layer signal including an uplink power control configuration, wherein
      the uplink power control configuration includes first parameters for a first subframe set, second parameters for a second subframe set and a third parameter for a pathloss reference configuration, and
      the third parameter specifies a serving cell, the serving cell being either a primary cell or a secondary cell;
   receiving an uplink grant;
   calculating a first pathloss for transmission to the primary cell based on a reference signal from the primary cell, and a second pathloss for transmission to the secondary cell based on a second reference signal from the serving cell specified by the third parameter, wherein an index of the second reference signal corresponds to the third parameter;
   setting a first transmit power for a physical uplink shared channel (PUSCH) on a first subframe belonging to the first subframe set and being after a configured number of subframes from reception of the uplink grant, the first transmit power being based on the first parameters, the first pathloss and a power correction value, the power correction value being included in the uplink grant
   setting a second transmit power for the PUSCH on a second subframe belonging to the second subframe set and being after the configured number of subframes from reception of the uplink grant, the second transmit power being based on second parameters, the second pathloss and the power correction value; and transmitting the PUSCH, wherein
the first transmit power is based on the first parameters for the primary cell in a first case that the uplink grant is an uplink grant from the primary cell,
the first transmit power is based on the first parameters for the secondary cell in a second case that the uplink grant is an uplink grant from the secondary cell,
the second transmit power is based on the second parameters for the primary cell in a third case that the uplink grant is an uplink grant from the primary cell, and
the second transmit power is based on the second parameters for the secondary cell in a fourth case that the uplink grant is an uplink grant from the secondary cell.

* * * * *